(12) United States Patent
Gupton et al.

(10) Patent No.: US 7,228,541 B2
(45) Date of Patent: Jun. 5, 2007

(54) CREATION OF APPLICATION SYSTEM INSTALLER

(75) Inventors: Kyle P. Gupton, Austin, TX (US);
David W Fuller, III, Austin, TX (US);
Brian H. Sierer, Austin, TX (US)

(73) Assignee: National Instruments Corporation, Austin, TX (US)

( * ) Notice: Subject to any disclaimer, the term of this patent is extended or adjusted under 35 U.S.C. 154(b) by 660 days.

(21) Appl. No.: 10/346,577

(22) Filed: Jan. 17, 2003

(65) Prior Publication Data

US 2004/0143830 A1 Jul. 22, 2004

(51) Int. Cl.
*G06F 9/445* (2006.01)
(52) U.S. Cl. ..................................... 717/175
(58) Field of Classification Search ......... 717/168–178
See application file for complete search history.

(56) References Cited

U.S. PATENT DOCUMENTS

| | | | |
|---|---|---|---|
| 6,381,742 B2 | 4/2002 | Forbes et al. | |
| 6,418,554 B1* | 7/2002 | Delo et al. ..................... | 717/11 |
| 6,442,754 B1 | 8/2002 | Curtis | |
| 6,986,135 B2* | 1/2006 | Leathers et al. ............ | 717/177 |
| 2002/0013939 A1 | 1/2002 | Daynes et al. | |
| 2002/0144248 A1 | 10/2002 | Forbes et al. | |
| 2003/0046681 A1* | 3/2003 | Barturen et al. ............ | 717/177 |
| 2003/0121024 A1 | 6/2003 | Hill et al. | |
| 2003/0172129 A1 | 9/2003 | Moses et al. | |
| 2003/0192031 A1* | 10/2003 | Srinivasan et al. ......... | 717/120 |
| 2004/0060035 A1* | 3/2004 | Ustaris ....................... | 717/177 |

OTHER PUBLICATIONS

Apache.org, Apache HTTP Server Version 2.0 Compiling and Installing, Oct. 2001, http://web.archive.org/web/20011017103355/httpd.apache.org/docs-2.0/.*
"Open specification License", JSR-38 v. 1.2, dated Aug. 15, 2002, 130 pgs.

* cited by examiner

*Primary Examiner*—Kakali Chaki
*Assistant Examiner*—Trenton J. Roche
(74) *Attorney, Agent, or Firm*—Meyertons Hood Kivlin Kowert & Goetzel, P.C.; Jeffrey C. Hood; Mark S. Williams

(57) ABSTRACT

System and method for creating an application system installer. A root deployable for an application system is received, and programmatically analyzed to determine a root deployer. The root deployer is programmatically analyzed to determine zero or more deployables, and one or more files-to-install. For each respective deployable, a respective deployer is programmatically determined that analyzes the respective deployable to determine any further deployables and files-to-install. This process is repeated for each of the further deployables for the respective deployable have been determined and analyzed, and all files-to-install have been determined. The application system installer is then generated using the determined files-to-install, where the installer is operable to programmatically deploy the application system onto a target system to perform the function. Determining zero or more deployables may also include determining one or more supporting sub-installers, where the installer is then generated using the determined files-to-install and supporting sub-installers.

27 Claims, 27 Drawing Sheets

| Step | Description | Execution Flow | Comment |
|---|---|---|---|
| Power On | Numeric Limit Test, 12 <= x <= 15, volt, Call P... | Precondition | |
| CPU | Call MainSequence in cpu.seq | | |
| ROM | Pass/Fail Test, Call ROMTest (computer.dll) | Precondition | |
| RAM | Pass/Fail Test, Call RAMTest (computer.dll) | Precondition | |
| Video | Numeric Limit Test, 70 <= x <= 75, hertz, Call ... | Precondition | |
| Keyboard | Pass/Fail Test, Call KeyboardTest (computer.dll) | Precondition | |
| ROM Diagnostics | Action, Call ROMDiagnostics (computer.dll) | Precondition | |
| RAM Diagnostics | Action, Call RAMDiagnostics (computer.dll) | Precondition | |
| Video Diagnostics | Action, Call VideoDiagnostics (computer.dll) | Precondition | |
| Keyboard Diagnostics | Action, Call KeyboardDiagnostics (computer.dll) | Precondition | |
| END | | | |

*Fig. 5*

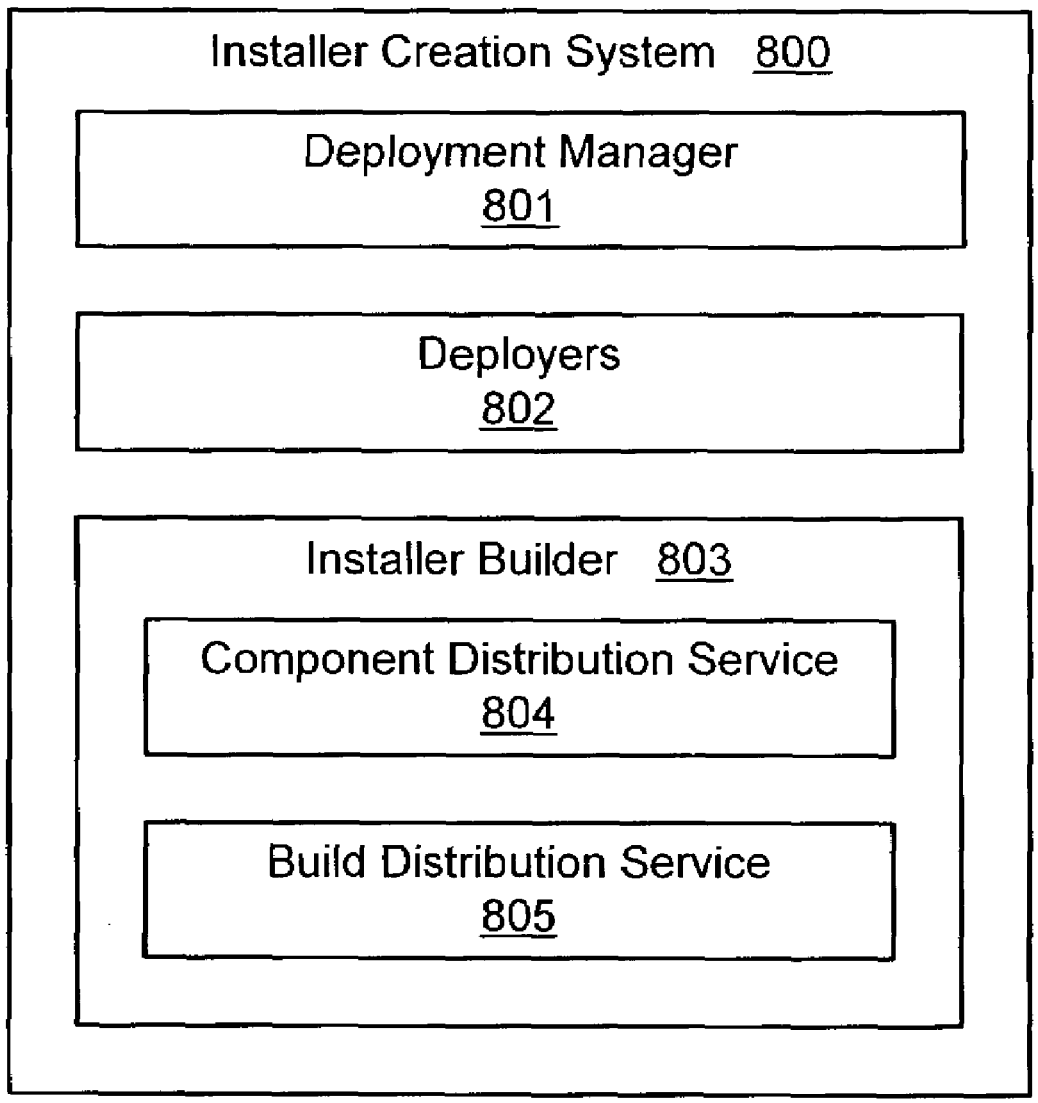
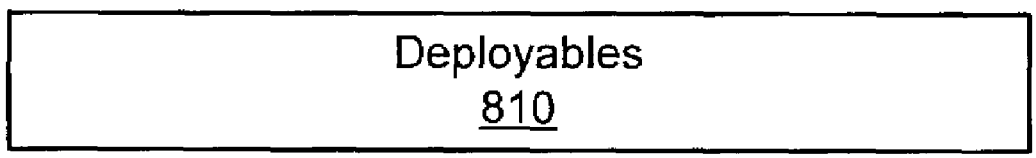
Fig. 8A

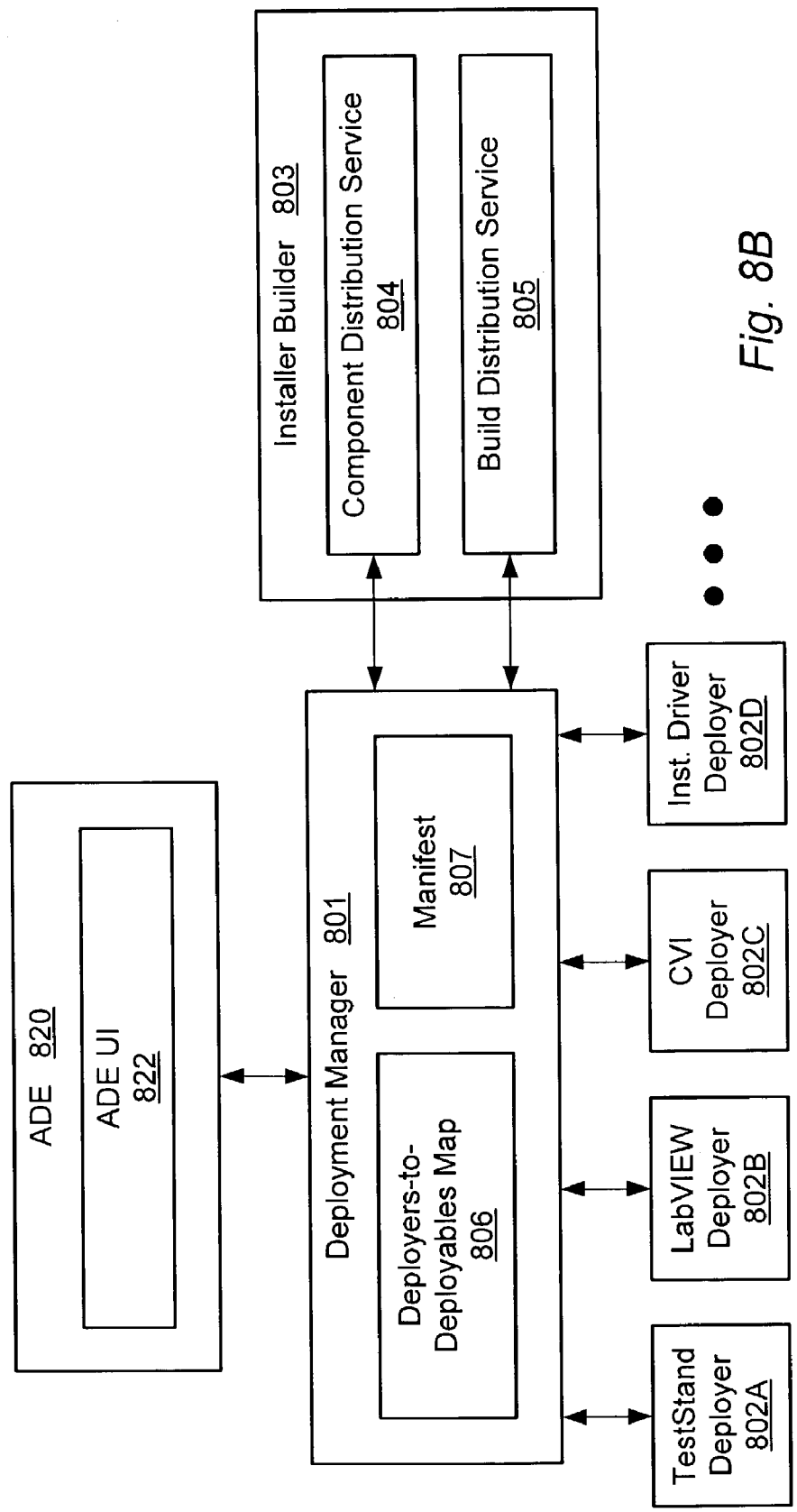

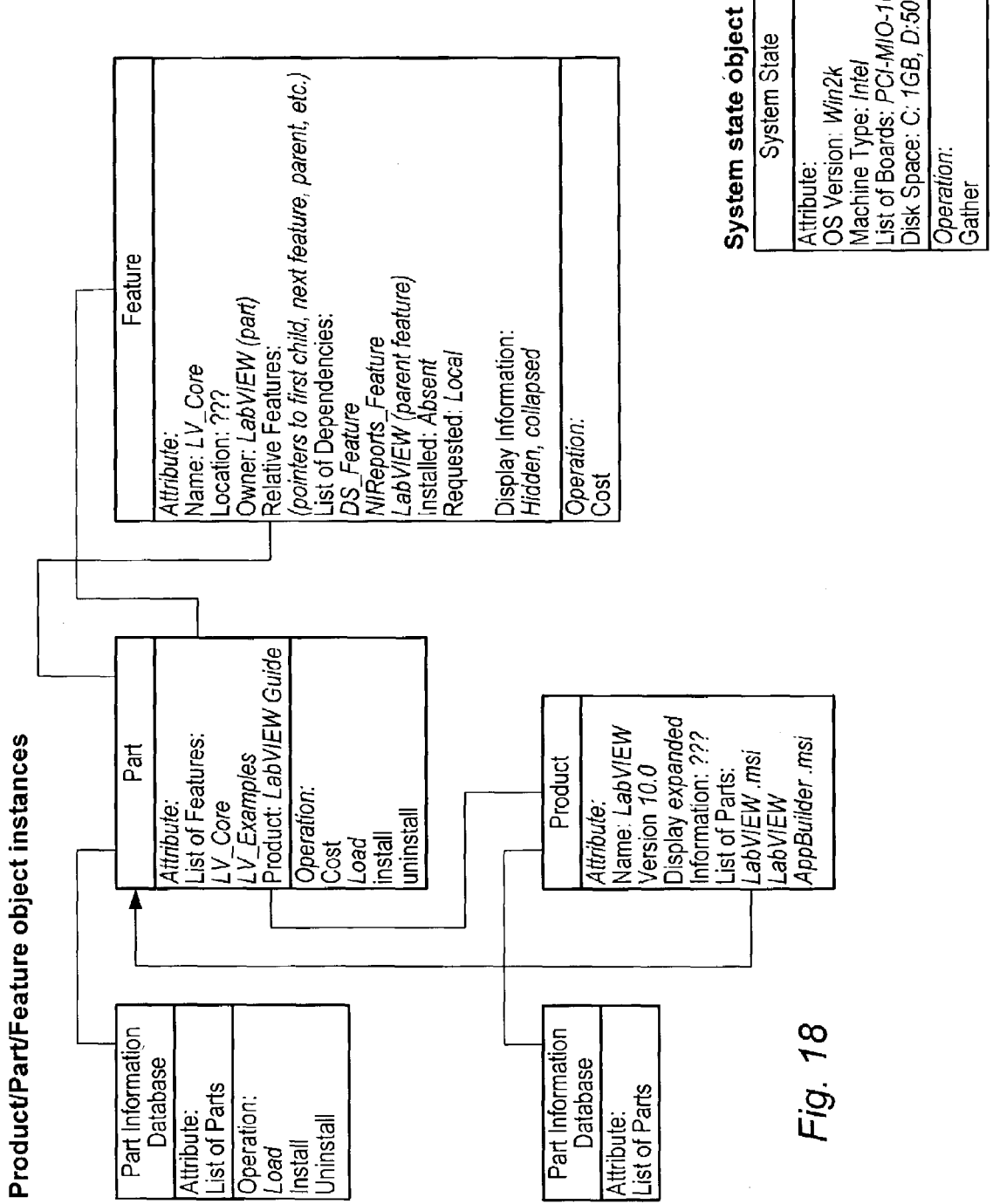

Flow chart for gather input

CREATION OF APPLICATION SYSTEM INSTALLER

FIELD OF THE INVENTION

The present invention relates to application system deployment software. In particular, the invention relates to a system and method for programmatically generating an application system installer, where the installer is operable to deploy an application system onto a target system to perform a desired function.

DESCRIPTION OF THE RELATED ART

Increasingly, scientific and engineering tasks are performed using computer-based systems, where a computer system e.g., a personal computer or workstation, performs much of the processing, analysis, or control for applications. In many of these systems, the computer system includes or couples to one or more devices, and executes software to perform a desired function using the one or more devices. Such computer-based systems include, but are not limited to, test and measurement systems, automation systems, network management systems, and simulation systems, among others. Such systems are also increasingly likely to be network-based or distributed systems, where a plurality of network-based devices operate together to perform a desired function. Various new intelligent devices are also starting to appear in such systems, such as smart sensors, smart cameras, smart motion control devices, smart distributed data acquisition devices, computer based instrument cards, PXI and VXI systems which may include intelligent controllers or reconfigurable devices, programmable logic controllers (PLCs), etc.

Computer-based systems which employ intelligent devices have become increasingly desirable in view of the increasing complexity of application tasks, and the variety of intelligent or programmable instruments and devices available for use. However, due to the wide variety of possible situations and environments, and also the wide array of instruments or devices available, it is often necessary for a user to develop custom programs and configuration data to control a desired system.

The user typically develops the custom programs using one or more development tools. For example, the user may develop an application in an application development environment (ADE), such as the LabVIEW graphical development system or the TestStand test development and management system, both provided by National Instruments Corporation. Applications so created often have a great many (e.g., tens or even hundreds) additional related components, such as, for example, dynamic linked libraries (DLLs), configuration files, operating system services, hardware and software drivers, and other files or modules used or called by the application to perform the function. The application and the additional components are together referred to as an application system. Some of the additional components may not be apparent or obvious to the user, and component dependencies may not be discoverable by the user, and so at least a portion of the necessary system components may be overlooked and omitted when the user collects or assembles the application system for deployment on a target system.

One example of a complex application system that uses or has a substantial number of additional components is a test executive system, such as may be developed using the TestStand system mentioned above. Test executive software is specialized software that allows a user to organize and execute sequences of reusable test modules to test units under test (UUTs). For example, the test modules may interact with one or more hardware instruments to test the UUT(s). The test modules often have a standard interface and typically can be created in a variety of programming environments. The test executive software operates as a control center for the automated test system. More specifically, the test executive software allows the user to create, configure, and/or control test sequence execution for various test applications, such as production and manufacturing test applications. Text executive software typically includes various features, such as test sequencing based on pass/fail results, logging of test results, and report generation, among others.

Test executives include various general concepts. The following comprises a glossary of test executive nomenclature, as used herein:

Code Module—A program module, such as a Windows Dynamic Link Library (.dll), LabVIEW VI (.vi), ActiveX component, or other type of program module or component, that implements one or more functions that perform a specific test or other action.

Test Module—A code module that performs a test of a UUT.

Step—An action that the user can include within a sequence of other actions. A step may call a test module to perform a specific test.

Step Module—The code module that a step calls.

Sequence—A series of steps that the user specifies for execution in a particular order. Whether and when a step is executed can depend on the results of previous steps.

Sequence File—A file that contains the definition of one or more sequences.

Sequence Editor—A program that provides a graphical user interface for creating, editing, and debugging sequences.

Run-time Operator Interface—A program that provides a graphical user interface for executing sequences on a production station. A sequence editor and run-time operator interface can be separate application programs or different aspects of the same program.

Test Executive Engine—A module or set of modules that provide an API for creating, editing, executing, and debugging sequences. A sequence editor or run-time execution operator interface uses the services of a test executive engine.

Application Development Environment (ADE)—A programming environment such as LabVIEW, LabWindows/CVI, Microsoft Visual C++, Microsoft Visual Basic, etc., in which the user can create test modules and run-time operator interfaces.

Unit Under Test (UUT)—The device or component that is being tested.

Thus, the user may use the sequence editor to construct a test executive sequence comprising a plurality of steps. The test executive sequence may then be executed to perform tests of a system or UUT.

Many executive test systems include a substantial number of components, referred to as deployables, e.g., application programs, execution engines, drivers, test sequence files, configuration files, dependencies, operating system components, libraries, and so on. A user desiring to use the test system must generally determine which aspects or deployables of the test system are required to perform the desired tests, and then must deploy those deployables (components), e.g., onto the user's hardware system, e.g., a target computer system and possibly one or more hardware devices coupled to the computer system. The proper determination of the required components may be difficult for some users depending upon their level of familiarity with the components, their own system, and the specific tests desired. The actual deployment of the test system is often even more difficult and complex, requiring the determination of component dependencies, hardware and/or software configurations, integration of custom or third party components, etc., and may entail significant effort and time on the part of the user, as well as high error rates and concomitant frustration.

Thus, as operating systems and interdependencies between various software applications become increasingly more complex, installation of software on a target computer system which is currently in use becomes more complicated and prone to failure, as compared to installation of software on a computer system which does not currently have any users (e.g., an installation on a computer system at the factory), e.g., a "clean system".

Integration among software applications that may share various features or components with other software applications is currently typically handled manually, on a case-by-case basis, often requiring the knowledge of an installation expert in order to smoothly and successfully complete the desired installations. It is desirable to reduce the need of a user for expert assistance during installation.

Software vendors who distribute major application software releases that are intended to be installed on a multitude of current customer or user computer systems and/or networks of computer systems typically do not and cannot exhaustively test the installation of the application software under every computer environment that represents their user base. Thus, upon distribution of a major release of a given software application, the software vendor customer support representatives are usually overwhelmed with a tremendous increase in call volume, regarding installation problems/failures.

Various off-the-shelf tools (e.g., Microsoft installer technology (MSI), Wise Solutions, among others) sometimes make the installation process easier, but these tools do not address more complicated integration among various software applications, nor do they scale well.

The issues discussed above relating to installing software also relate to updating, or removing one or more individual software components, or entire software applications, within a target computer system.

Therefore, it would be desirable to provide new systems and methods for installing, updating, or removing software that takes into account the various dependencies and inter-relatedness of software applications on a given target computer system in order to minimize failures of installations, updates, or removals of various software.

SUMMARY OF THE INVENTION

Various embodiments of a system and method for programmatically generating an application system installer for programmatic deployment of an application system onto a target system. It is noted that various embodiments of the present invention may be applied in a wide variety of fields. For example, the application system may comprise one or more of: a measurement system, a test system, an automation system, a control system, a simulation system, and a network system, among others.

As used herein, the term "system deployment" refers to the collection and/or generation of all software components, referred to as "files to install" and supporting components, necessary to operate a complete system, the placement of the components on a target computer system (e.g., a target system, optionally including one or more coupled devices), and any configuration necessary for the system to operate successfully. As used herein, the term "deployable" refers to any software component in the dependency hierarchy of an application system plus components or files generated from the components. A deployable may be used to generate a file to install, or may itself be a file to install. Additionally, various infrastructure components, referred to as supporting components, may be required for operation of the application system, such as, for example, execution engines and their components. Thus, in addition to the files to install, one or more supporting components may need to be deployed onto the target computer system. In one embodiment, these supporting components may include or be bundled with corresponding installer software to form a supporting sub-installer. A deployer generally refers to a program or system that knows how to deploy a deployable.

In a preferred embodiment, an installer creation system may include a deployment manager, a plurality of deployers, and an installer builder. The deployment manager may include a deployers-to-deployable map, indicating appropriate deployers for each deployable of the application system, as well as a manifest, whereby the analysis and determination of deployables, files to install, and supporting components may be tracked. In one embodiment, the installer builder may include a component distribution service and a build distribution service. The functionality of each of these components is described below.

In one embodiment, an application or an application system may be developed with an application development environment (ADE). The method may be initiated by launching a build/deploy utility included in the ADE, e.g., via a graphical user interface (GUI).

In one embodiment, a root deployable for an application system may be received, where the application system is operable to perform a function. The root deployable may be thought of as the top-level file, controlling or organizing agent, or application for the application system. As described above, a user may develop an application or project file in the ADE, and invoke a build/create installer utility or service. The ADE may pass the application or project file to the deployment manager as the root deployable of the application system. The root deployable may be added to the manifest, e.g., the "unanalyzed deployables list", i.e., the deployables list described above. The manifest may then be passed to the deployment manager for analysis.

The deployment manager may programmatically analyze the root deployable and determine a root deployer for the root deployable. In other words, a respective deployer for the root deployable may automatically be determined that knows how to deploy the root deployable. In one embodiment, the deployment manager may receive the manifest and retrieve the first deployable in the deployables list-in this case, the root deployable, for the analysis.

Once the root deployer has been programmatically determined, the root deployer may programmatically analyze the root deployable to programmatically determine zero or more deployables, where each of the zero or more deployables is operable to perform a respective portion of the function. In one embodiment, the deployment manager may pass the manifest to the root deployer. The root deployer may then add the root deployable to a "files to install" list in the manifest, remove the root deployable from the deployables list, and add the determined zero or more deployables to the deployables list of the manifest, e.g., for subsequent analysis.

In one embodiment, the root deployer may also programmatically analyze the root deployable to determine one or more supporting sub-installers, where, as described above, each supporting sub-installer includes one or more supporting components with corresponding installation software for deploying the supporting components onto a target system. Examples of supporting components include ADEs, run-time engines, such as the TestStand Run-Time Engine, the LabVIEW Run-Time Engine, NI-DAQ Run-Time, etc., or other infrastructure components necessary for operation of the application system. As also noted above, the supporting sub-installers are preferably pre-defined and known by the deployer, thus, the deployer may programmatically analyze the deployable, programmatically determine necessary supporting components, and programmatically determine the appropriate supporting sub-installer that contains those supporting components, adding the supporting sub-installer to the supporting sub-installer list of the manifest.

In one embodiment, prior to, during, or after the root deployer programmatically analyzes the root deployable to determine zero or more deployables, the root deployer may programmatically perform a build operation on the root deployable. For example, where the root deployable is a workspace or project file indicating a plurality of files for the application system, the root deployer may build, e.g., compile and link, the workspace or project file, thereby generating additional files, e.g., one or more executables and/or DLLs, etc., for the application system. In other words, the deployer may generate one or more additional files to install based on the analyzed deployable. These files may then be added to the files to install list of the manifest. Once the root deployer is done analyzing the root deployable and updating the manifest, the updated manifest may be passed back to the deployment manager for subsequent processing.

The deployment manager may then retrieve the next deployable from the deployables list of the manifest, and programmatically analyze the next deployable to determine a corresponding next deployer for that deployable. The deployment manager may then invoke the determined next deployer, passing the current manifest and the retrieved next deployable (e.g., the test sequence file) to the deployer for analysis.

The next deployer may programmatically analyze the next deployable to determine zero or more further deployables, and may determine zero or more further supporting sub-installers, as well. As described above, the next deployer may add the next deployable to the files to install list of the manifest, and may remove the next deployable from the deployables list. As also mentioned above, in one embodiment, the next deployer may perform a build operation on the next deployable, thereby generating one or more additional files to install, which may then be added to the files to install list as well. As before, once the analysis is done, the deployer may return the updated manifest to the deployment manager for further processing.

The deployment manager may determine whether there are further deployables to be analyzed, e.g., by checking for further deployables in the deployables list of the manifest. If there are further deployables to analyze, then the method may repeat the above process until there are no more deployables on the deployables list to be analyzed, and thus all of the files to be installed have been determined (as well as any supporting sub-installers). In other words, the deployment manager may retrieve a (new) next deployable from the deployables list, determine a (new) next deployer for that deployable, and pass the manifest and deployable to the deployer for analysis, as described above. The deployer may then determine zero or more further deployables, zero or more supporting sub-installers, and one or more files to install for each deployable on the deployables list, an update the manifest accordingly. Thus, the described programmatically determining and analyzing for each of the deployables may be performed until all deployables for application system have been determined and analyzed, and all files to install for the application system have been determined, as well as possibly one or more supporting sub-installers.

If the deployment manager determines that there are no more deployables to analyze, e.g., that the deployables list of the manifest is empty, then an application system installer may be programmatically generated based on the determined files to install indicated in the manifest, where the application system installer is operable to programmatically deploy the application system onto a target system to perform the function. In one embodiment, where the respective deployers also determine supporting sub-installers, then the application system installer may be programmatically generated based on the determined files to install and the determined supporting sub-installers indicated in the manifest. In one embodiment, this may be accomplished in two steps. First, the list of files to install indicated in the manifest may be analyzed, and the component distribution service may create one or more sub-installers for these files. Second, the list of sub-installers indicated in the manifest and the newly generated sub-installer may be analyzed by the distribution build service to create the application system installer. It should be noted that the application system installer, also referred to as a "distribution", preferably includes a superset of software components required for each of various installations of the application system. In other words, as is well known in the art, depending on the type and characteristics of the target system and the user's preferences, various versions of the application system may be deployed to the target system. Thus, the distribution preferably includes all of the software components that may be required for any particular installation of the application system.

In one embodiment, once the method determines that there are no more deployables to analyze, e.g., that the deployables list is empty, the user may be allowed to add any additional files desired to the files to install list, e.g., readme.txt or help files. For example, the ADE GUI may provide menu options or buttons allowing the user to specify or browse for additional files. In one embodiment, the deployment manager may request the ADE to prompt the user for input specifying such files.

In one embodiment, the user may be allowed to select between alternate supporting sub-installers for inclusion in the application system installer. For example, the deployment manager may request the ADE to provide options to the user for selecting between various supporting sub-installers, where each of the sub-installers may work, but where one may be more suitable for the user's purposes such as, for example, a full development system vs. a (minimal) run-time system. For example, the user may select between the TestStand Run-Time Engine and the TestStand Development System, or between the LabVIEW Run-Time Engine and the LabVIEW Development System, and so on.

In one embodiment, the method may further include executing the application system installer to programmatically deploy the application system onto a target system, where after the application system is deployed on the target system the target system is operable to perform the function. For example, in one embodiment, the target system may include a target computer and at least one device coupled to the target computer. Programmatically deploying the application system onto the target system may include one or more of:

programmatically deploying one or more programs onto the target computer, wherein the target computer is operable to execute the one or more programs to perform at least a portion of the function;

programmatically deploying at least one program onto the at least one device, wherein the at least one device is operable to execute the at least one program to perform at least another portion of the function;

programmatically configuring target computer hardware and/or the at least one device hardware in accordance with one or more hardware configuration files; and programmatically configuring a program on the target computer and/or a program on the at least one device in accordance with one or more program configuration files.

Thus, deploying the application system to a target system using the application system installer may include deploying programs to various hardware devices, including the target computer, as well as configuring one or more programs and/or hardware devices.

Thus, various embodiments of the systems and methods described herein may be used to create and/or execute an application system installer to deploy an application system onto a target system. The application system installer may be executed to deploy a new installation of the application system onto the target system, to update previously installed components of the application system, and/or to remove previously installed components of the application system, as desired.

BRIEF DESCRIPTION OF THE DRAWINGS

A better understanding of the present invention can be obtained when the following detailed description of the preferred embodiment is considered in conjunction with the following drawings, in which:

FIG. 5 illustrates one example of a test executive sequence, created according to one embodiment of a test executive application;

FIGS. 8A and 8B illustrate embodiments of an installer creation system;

FIGS. 17–27 illustrate an exemplary implementation of one embodiment of a system and method for deploying software to a target system using component dependency analysis.

Figure 1A:
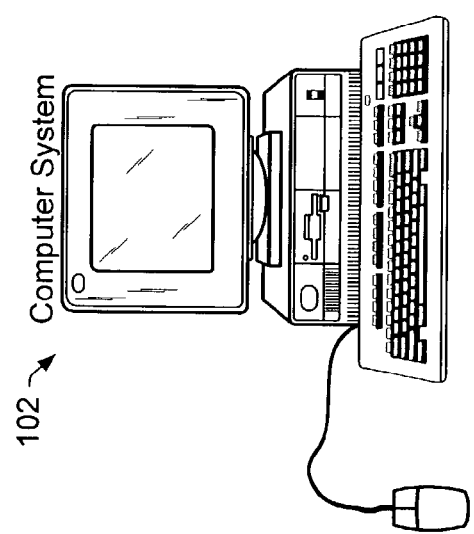
FIGS. 1A and 1B illustrate computer systems suitable for implementing various embodiments of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein.

U.S. patent application Ser. No. 09/259,162 titled "Test Executive System and Method Including Process Models for Improved Configurability," filed Feb. 26, 1999.

U.S. Pat. No. 6,401,220 titled "Test Executive System and Method Including Step Types for Improved Configurability," issued Jun. 4, 2002.

The LabVIEW graphical programming manuals, including the "LabVIEW User Manual", available from National Instruments Corporation, are hereby incorporated by reference in their entirety.

The TestStand user manual, available from National Instruments Corporation, is also hereby incorporated by reference in its entirety.

Fields of Application

Various embodiments of the present invention may be used to generate application system installers in a wide variety of fields, including, but not limited to, testing, measurement, automation, control, networks, and simulation, among others. An exemplary field of application is testing and measurement, e.g., for a manufacturing enterprise, and thus, various embodiments are described below with reference to a testing system, although it should be noted that the various embodiments described are not intended to limit the field or domain of application to any particular field or domain FIG. 1A—Computer System FIG. 1A illustrates a computer system 102 operable to execute various embodiments of the present invention. The computer system 102 may be any type of computer system, including a personal computer system, mainframe computer system, workstation, network appliance, Internet appliance, personal digital assistant (PDA), television system or other device. In general, the term "computer system" may be broadly defined to encompass any device having at least one processor that executes instructions from a memory medium.

As shown in FIG. 1A, the computer system 102 may include a display device operable to display operations associated with the methods described herein. For example, the display device may be operable to display a list of parts available for installation/update/removal. In one embodiment, the display device may be operable to display a graphical user interface which allows a user to specify one or more parts for installation/update/removal. The graphical user interface may comprise any type of graphical user interface, e.g., depending on the computing platform. As shown, the computer system 102 may include one or more input devices, such as a keyboard, mouse, etc. The computer system 102 may include one or more processors, e.g., CPUs and/or programmable hardware elements, which may be operable to execute program instructions according to various embodiments of the present invention.

The computer system 102 may include a memory medium(s) on which one or more computer programs or software components according to one embodiment of the present invention may be stored. For example, the memory medium may store one or more software programs which are executable to perform the methods described herein. The memory medium may also store operating system software, as well as other software for operation of the computer system.

The term "memory medium" is intended to include various types of memory or storage, including an installation medium, e.g., a CD-ROM, floppy disks, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory or storage as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. Such a distributed system is presented in FIG. 1B, and described below.

Figure 1B:
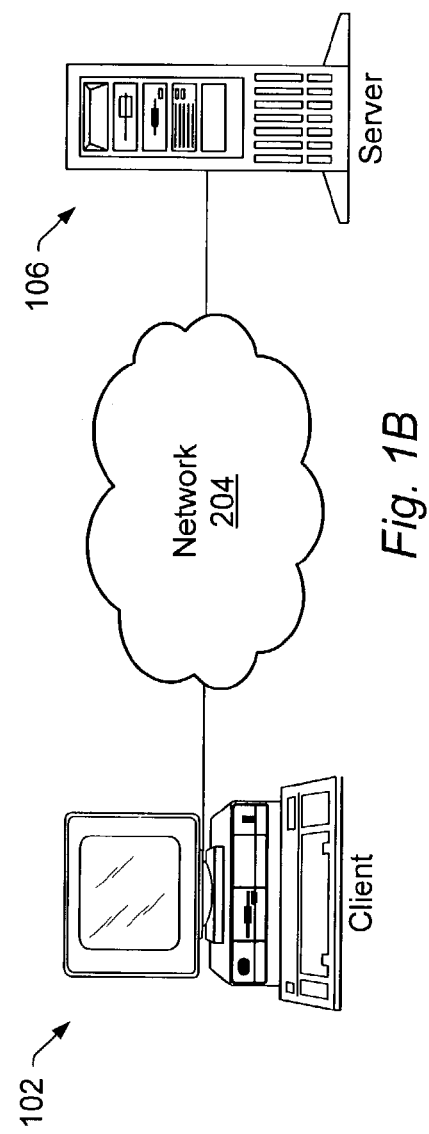

FIG. 1B—A Network System

FIG. 1B illustrates a simplified and exemplary network system that operates according to various embodiments of the present invention. In the system shown in FIG. 1B the computer system 102 of FIG. 1A is coupled to a second computer 106, such as a server computer system 106, over a network 204, such as the Internet, or a computer bus. Thus, FIG. 1B illustrates an exemplary distributed system which may be suitable for implementing various embodiments of the methods described herein. The computer systems 102 and 106 may each be any of various types as desired, as described above. Also, the network 204 can also be any of various types, including a LAN (local area network), WAN (wide area network), the Internet, or an Intranet, among others. The transmission medium coupling the systems may include any wired or wireless media, as are well known in the art. Thus, in one embodiment, the client computer 102 and the server computer 106 may comprise a distributed system.

As used herein, the term "distributed system" is intended to include a system comprising two or more interconnected or coupled devices, i.e., two or more devices that are coupled together in some fashion. The two or more devices may be coupled together via wired or wireless means. Wired means may include a network, such as a local area network (LAN) and/or a wide area network (WAN), such as the Internet, a computer bus, a serial or parallel bus, or other wired communication methods. Example local area networks include Ethernet networks, Token Ring networks, and various industrial communication networks such as fieldbus, DeviceNet, and CAN (Controller Area Network) networks. Example parallel buses include the PCI bus, PXI bus, GPIB, and VXI bus, among others. Example serial buses include USB (Universal Serial Bus), IEEE 1394, RS-242, and RS-485, among others. Wireless means may include wireless protocols such as IEEE 802.11 (wireless Ethernet), Bluetooth, and other types of wireless communication.

In one embodiment, the server 106 may store programs, applications, or data which may be accessed or retrieved by the client computer system 102. Thus, the server 106 may store software applications intended for installation on client or target computer systems, for example, in a database or library. The computer system 102 may access the server 106 to retrieve data or execute software to implement various embodiments of the system and method described herein.

Figure 2:
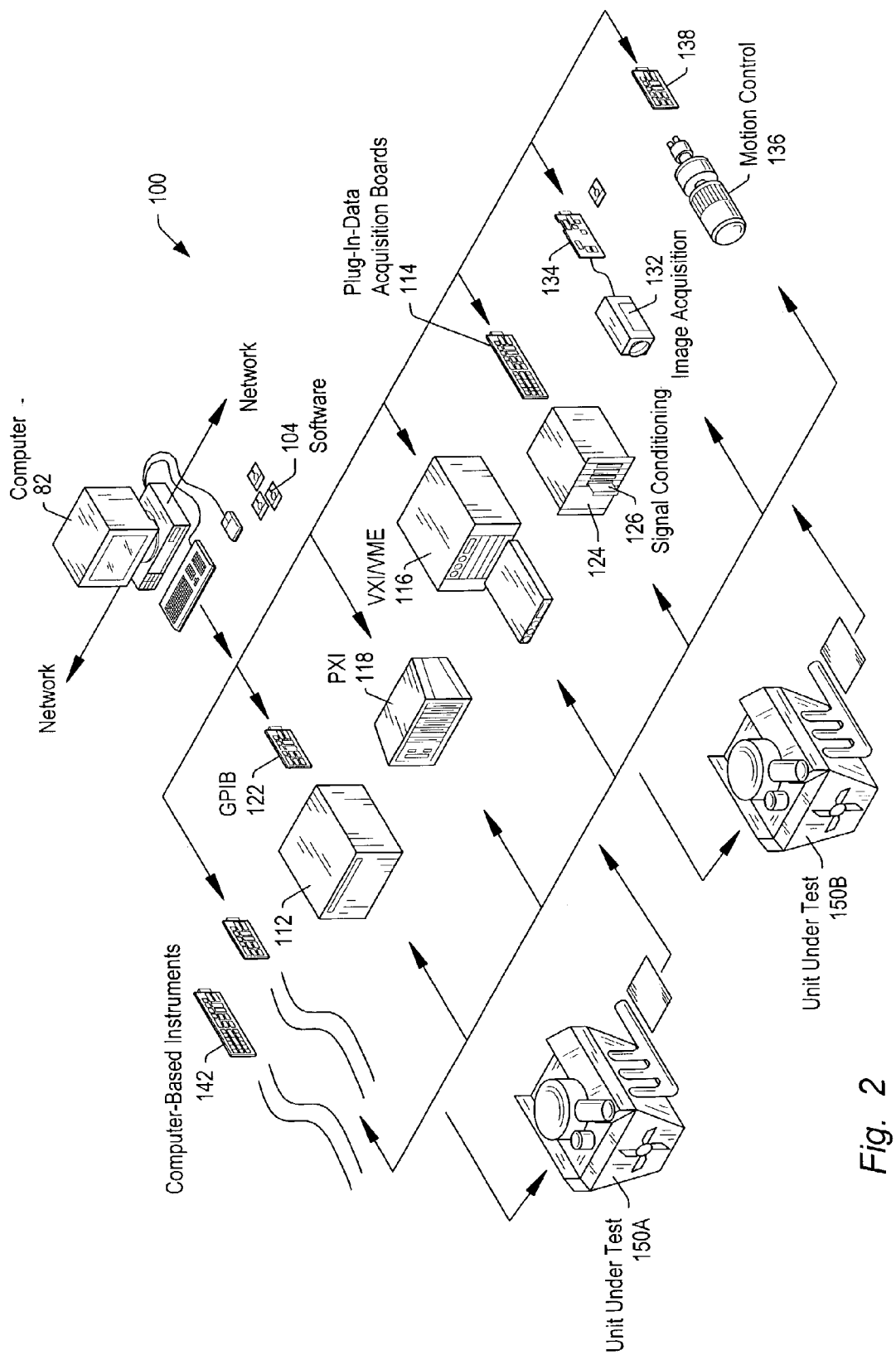
FIG. 2 illustrates an instrumentation control system according to one embodiment of the present invention.

FIG. 2—Instrumentation System

FIG. 2 illustrates an exemplary instrumentation control system 100. The system 100 comprises a host computer 102 that connects to one or more instruments. The host computer 102 comprises a CPU, a display screen, memory, and one or more input devices such as a mouse or keyboard as shown. The computer 102 may connect through the one or more instruments to analyze, measure or control one or more units under test (UUT) or processes 150, here represented by UUT 150A and UUT 150B. It is noted that FIG. 2 is exemplary only, and the present invention may be used in conjunction with any of various systems, as desired.

In one embodiment, the UUT may be a system comprising a plurality of sub-components, where respective tests are to be performed on each component. The computer 102 may execute a test executive sequence to perform automated tests of the system or portions of the system. The computer 102 may launch multiple execution threads to perform a plurality of tests, some of which may be performed substantially in parallel.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 102 via a GPIB interface card 122 provided by the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and optionally interfaces through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes. The cards 122, 134, 138 and 114 may also be implemented as external devices coupled to the computer 102, such as through a serial bus.

The VXI chassis or instrument 116 may be coupled to the computer 102 via a serial bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. Other types of instruments or devices may be connected to the system, as desired.

The computer system 102 may include a memory medium on which test executive software is stored and executed to perform various tests on the UUT 150. In one embodiment, software according to one embodiment of the present invention may also be stored that allows a user to create an application system installer for various applications, such as production and manufacturing test applications, automation applications, control applications, network applications, and so on.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The host computer CPU executing code and data from the memory medium may comprise a means for implementing the methods described below.

Figure 3:
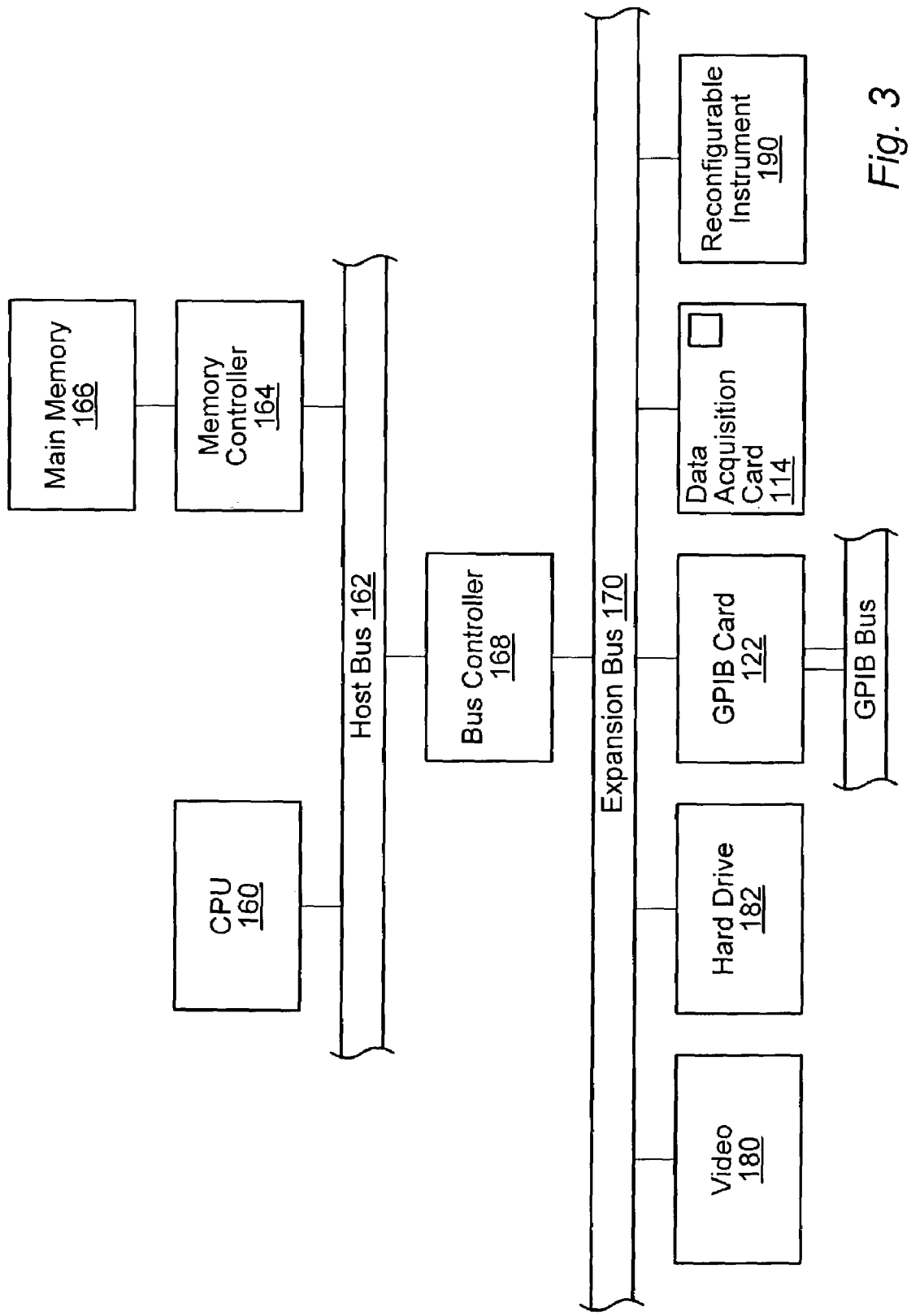
FIG. 3 is a block diagram of the computer system of FIGS. 1A, 1B, and 2.

FIG. 3—Computer System Block Diagram

FIG. 3 is a block diagram of the computer system illustrated in FIG. 2. It is noted that any type of computer system configuration or architecture can be used as desired, and FIG. 3 illustrates a representative PC embodiment. It is also noted that the computer system may be a general purpose computer system as shown in FIG. 2, a computer implemented on a VXI card installed in a VXI chassis, a computer implemented on a PXI card installed in a PXI chassis, or other types of embodiments. Elements of a computer not necessary to understand the present invention have been omitted for simplicity.

The computer 102 includes at least one central processing unit or CPU 160 that is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store software, such as test executive software with functionality as described above with reference to FIG. 2. As mentioned above, the main memory 166 may also store installer creation software according to one embodiment of the present invention, as described in detail below with reference to FIGS. 7–9. In one embodiment, the installer creation software may be stored and executed on another computer, and the resulting installer executed on the computer 102, thereby installing the application system, e.g., test executive software, onto the computer system 102. The main memory 166 may also store operating system software as well as other software for operation of the computer system, as well known to those skilled in the art.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 2) and a GPIB interface card 122 that provides a GPIB bus interface to the GPIB instrument 112 (of FIG. 2). The computer 102 further comprises a video display subsystem 180 and hard drive 182 coupled to the expansion bus 170.

As shown, a reconfigurable instrument 190 may also be connected to the computer 102. The reconfigurable instrument 190 may include a functional unit, also referred to as configurable logic, such as a programmable logic device (PLD), e.g., an FPGA, or a processor and memory, which may execute a real time operating system. Program instructions may be downloaded and executed on the reconfigurable instrument 190. In one embodiment, at least a portion of the application system software described herein may execute on the reconfigurable instrument 190. In various embodiments, the functional unit may be comprised on an instrument or device connected to the computer through means other than an expansion slot, e.g., the instrument or device may be connected via an IEEE 1394 bus, USB, or other type of port. Also, the functional unit may be comprised on a device such as the data acquisition board 114 or another device shown in FIG. 2.

Figure 4:
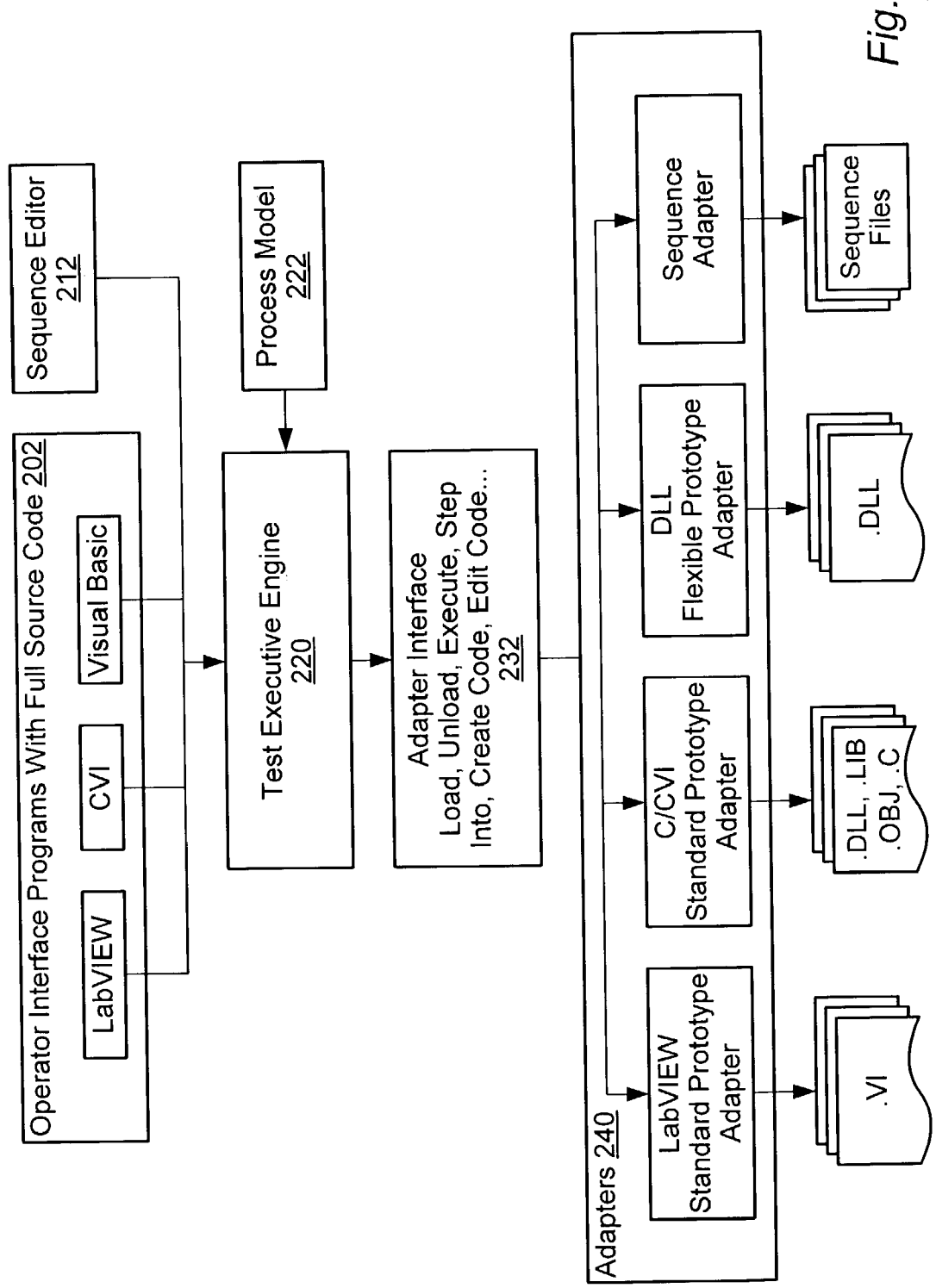
FIG. 4 illustrates a test executive application software architecture according to one embodiment of the present invention.

As mentioned above, manufacturing testing is an exemplary application domain for various embodiments of the present invention. FIGS. 4 and 5, described below, illustrate an example test executive system, according to one embodiment.

Test Executive Software Components

FIG. 4 is a block diagram illustrating high-level architectural relationships between elements of one embodiment of a test executive software application. It is noted that FIG. 4 is exemplary, and the present invention may be utilized in conjunction with any of various applications, architectures, and/or application development environments. In one embodiment, the elements of FIG. 4 are comprised in the TestStand test executive product from National Instruments. As shown, the test executive software of FIG. 4 includes operator interface programs 202 for interfacing to various software programs. The operator interface programs 202 shown in FIG. 4 are for creating operator interface programs using the LabVIEW, LabWindows/CVI, and Visual Basic application development environments. However, additional operator interface programs 202 may be included for development with other application development environments.

The test executive software of FIG. 4 also includes a sequence editor 212 for creating and editing test executive sequences. The sequence editor 212 and the operator interface programs 202 interface to the test executive engine 220. One or more process models 222 couple to the test executive engine 220. The test executive engine 220 interfaces through an adapter interface 232 to one or more adapters 240. The adapters shown in FIG. 4 include the LabVIEW standard prototype adapter, the C/CVI prototype adapter, the DLL flexible prototype adapter, and the sequence adapter. The LabVIEW standard prototype adapter interfaces to program modules having a VI extension, i.e., LabVIEW graphical programs. The C/CVI prototype adapter interfaces to program modules having a .dll, lib, .obj, or .c extension. The DLL flexible prototype adapter interfaces to program modules having a .dll extension. The sequence adapter interfaces to sequence files.

The test executive engine 220 manages the execution of test executive sequences. Sequences comprise steps that may call external code modules. By using module adapters 240 that have the standard adapter interface 232, the test executive engine 220 can load and execute different types of code modules. Thus, the test executive may be independent from particular application development environments (ADEs) used to create the code modules. In one embodiment, the test executive may use a special type of sequence called a process model to direct the high-level sequence flow. The test executive engine 220 may implement an API used by the sequence editor 212 and run-time operator interfaces 202.

Test Executive Sequence Editor

The sequence editor 212 may be an application program in which the user creates, modifies, and/or debugs test executive sequences. The sequence editor 212 may have a graphical user interface (GUI) enabling a user to efficiently create a test executive sequence for testing a system or unit under test. For example, the sequence editor 212 may provide the user with easy access to test executive features, such as step types, step properties, sequence parameters, step result collection, etc.

FIG. 5 illustrates one example of a test executive sequence, created according to one embodiment of a sequence editor 212. The exemplary sequence of FIG. 5 comprises a plurality of test executive steps operable to test various aspects of a computer system. For example, the sequence includes a "ROM" step to test the computer's read-only memory, a "RAM" step to test the computer's random access memory, etc. Each step may call an external code module that interacts with the computer system to perform the desired test. The user may also specify various properties for each step that affect the way the test executive software manages the execution of the step. For example, a "Run Options" property page may be selected by the user that enables the user to specify various options for the step, such as whether to record test results for the step, whether to break execution when the step is reached, whether to pre-load the step when opening the sequence file, etc.

In one embodiment, the sequence editor 212 may also include an execution window that provides debugging tools, e.g., those found in application development environments such as LabVIEW, LabWindows/CVI, Microsoft Visual C/C++, Microsoft Visual Basic, etc. These may include features such as breakpoints, single stepping, tracing, a variable display, and a watch window.

In one embodiment, in the sequence editor 212, the user may start multiple concurrent executions. Multiple instances of the same sequence can be executed, and different sequences can be executed at the same time, e.g., as separate threads in a multi-threaded system. Executing multiple instances of the same sequence on different execution threads enables parallel testing of multiple UUTs, as described herein. In one embodiment, each execution instance may have its own execution window. In trace mode, the execution window may display the steps in the currently executing sequence. When execution is suspended, the execution window may display the next step to execute and provide single-stepping options.

Test Executive Engine

The test executive engine 220 may be used when creating, editing, executing, and debugging test executive sequences. The test executive engine 220 may also provide a test executive engine application programming interface (API) that enables another program to interface with the test executive engine 220 in order to perform these actions. In one embodiment, the test executive engine 220 may export an object-based or component-based API, which in one embodiment may be an ActiveX Automation API. The sequence editor 212 and run-time operator interfaces 202 may use the test executive engine API. The engine API may be called from any programming environment able to use the API. For example, where the API comprises an ActiveX Automation API, the engine API may be called from any programming environment that supports access to ActiveX Automation servers. Thus, in various embodiments, the engine API may be called from test modules written in various programming environments, including test modules that are written in LabVIEW, LabWindows/CVI, Microsoft Visual C++, Microsoft Visual Basic, Java, etc.

One task performed by the test executive engine 220 is to manage the execution of test executive sequences. Executing a sequence may comprise executing steps included in the sequence. Not all steps in the sequence are necessarily executed. For example, the user may configure some steps to be skipped, e.g., depending on execution results of previous steps. For a step that references a user-supplied code module, executing the step may comprise executing the respective code module. In addition to these user-supplied code modules being executed, for each step, additional program instructions may be executed, wherein these additional program instructions implement additional functionality specified for the step. These additional program instructions may be specified by the test executive software, rather than being defined by the respective user-supplied code module for the step. As one example, when including a step in a sequence, the user may configure execution results of the step to be collected. In this example, when the step is executed, program instructions to store the step results accordingly may be executed in addition to the program instructions of a user-supplied code module that the step references. It is noted that not all steps may reference a user-supplied code module. For example, the test executive may provide some step types that primarily affect various aspects of sequence execution and are not designed to reference user-supplied code modules.

Once the user has developed an application, e.g., the test executive application described above, a graphical user interface (GUI), e.g., provided by the application development environment, may allow the user to invoke programmatic creation of an application system installer, e.g., for deploying the test executive application to a target system, e.g., to computer 102 and possibly devices coupled to the computer 102. An exemplary GUI for this purpose is described below with reference to FIGS. 6A and 6B.

As used herein, the term "sub-installer" refers to the smallest unit or software component tracked by version number (including installation software for that component). A sub-installer may contain one or more features. For example, the LabVIEW FDS distribution contains sub-installers representing the following features: core LabVIEW, LabVIEW advanced analysis, core DAQ, LabVIEW DAQ, VISA, IVI, GPIB, DataSocket, among others. In some cases, certain sub-installers may not be visible (i.e., selectable) by the user. These types of sub-installers may be chosen automatically by the installer manager 1109 when other sub-installers or products are chosen by the user.

As used herein, a "feature" is the smallest user selectable option. For installations, a feature may be selected by a user from a distribution. For updates or removals, a feature may be selected by a user from a listing or database of features currently installed on a computer system.

As used herein, a "distribution" is the entire software contents delivered to a user or customer. Typically, a distribution is installed as if it were one software product. A distribution may include one or more software products and may be delivered via CD or the Internet, among other methods. For example, the National Instruments LabVIEW CD distribution contains numerous applications (e.g., DAQ, VISA, IVI, IMAQ, Motion, DataSocket, NI Reports), in addition to the LabVIEW application.

As used herein, a "software product" is a designation of one or more sub-installers grouped into a sellable unit. This unit is often equivalent to a distribution, but a distribution may also contain multiple products. For example, the National Instruments LabVIEW FDS distribution contains the LabVIEW FDS product, the DAQ product, the GPIB product, among others. The term "product" is used synonymously with the term "software product" herein. The existence of a sub-installer may be required to install a portion of an application with other products.

Figure 6A:
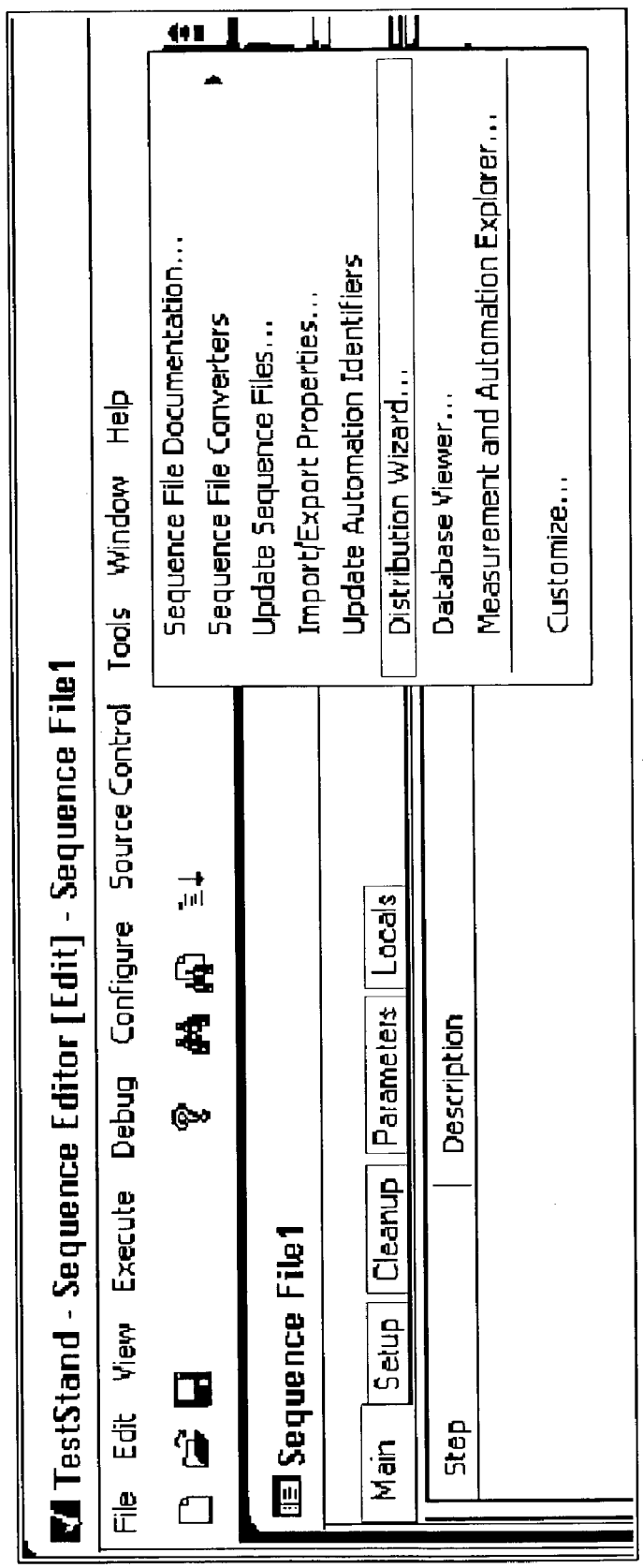
FIGS. 6A and 6B illustrate an exemplary GUI for invoking creation of an application system installer.
Figure 6B:
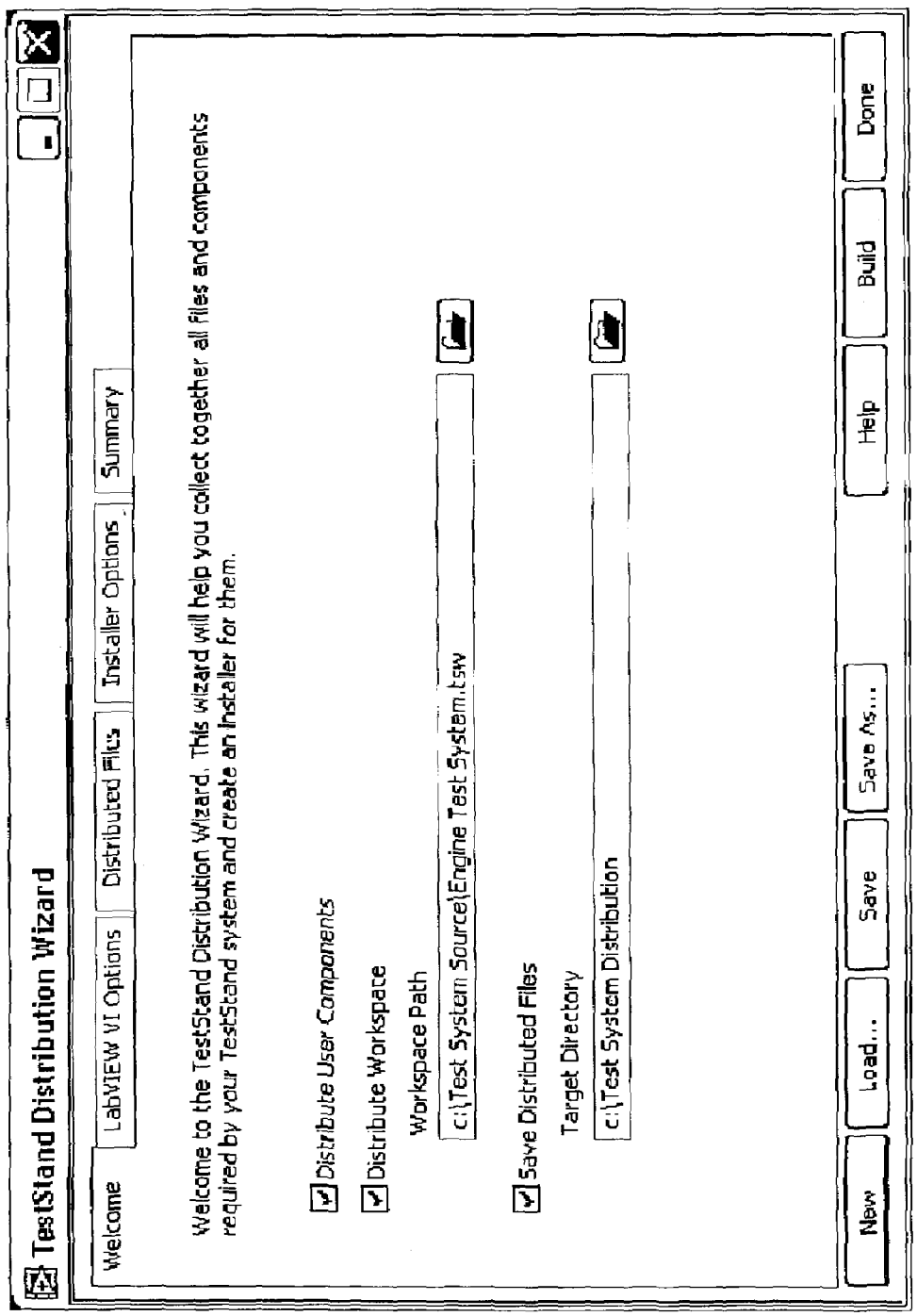

FIGS. 6A and 6B—A GUI for Invoking Creation of an Application System Installer

As mentioned above, complex applications are generally developed using one or more development tools, such as an application development environment (ADE), e.g., National Instruments Corporation's LabVIEW graphical development system or TestStand test development and management system. In one embodiment, the user's ADE may not only facilitate development of the user's application, but may also allow the user to invoke programmatic creation of an application system installer. The created installer may then be used to deploy the application system onto a target system.

FIG. 6A illustrates one embodiment of an example GUI for the TestStand ADE. As FIG. 6A shows, in this example, a variety of menus are provided for creating, building, storing, configuring, and/or executing test executive systems. More particularly, in the embodiment shown, the 'tools' menu provides an option, shown selected, that invokes another GUI, e.g., a dialog, for specifying a build/create installer operation for the user's application, as shown in FIG. 6B, described below. Of course, other types of user interfaces are also contemplated, including command line, pop-up dialogs, text-entry fields, etc.

FIG. 6B illustrates one embodiment of a GUI for specifying and launching the build/create installer operation mentioned above with reference to FIG. 6A. As FIG. 6B shows, in this example, a number of tabs are presented to the user for specifying various build and installer creation options, including LabVIEW VI options, distributed files, and installer options. Additionally, in the example shown, a control is provided allowing the user specify a top level deployable for the application system, shown here as a "Workspace Path" control which may invoke a dialog for the user to browse the computer system to locate the top level deployable. As FIG. 6B shows, a file named "Engine Test System" has been specified as the root deployable for the application system, here shown in the "Workspace Path" control.

Other controls (buttons) are also shown for adding and removing other files such as, for example, user-defined programs and/or supporting files or components. Further information regarding deployables and supporting components is provided below. As also shown, in this GUI a control is provided for launching the build/create installer process, specifically, the "Build" button at the bottom right of the GUI. Thus, in this example, clicking on the "Build" button would start the process of building the application system and creating the installer.

In other words, once the user has created (or acquired) the necessary application programs and files, selection of the build option may build, e.g., collect, compile, and/or link, the application programs and files into an application system, and may invoke programmatic creation of an application system installer for the application system. Thus, in this example, invocation of the build process automatically launches a utility for building the application system and creating an installer for the built application system.

Figure 7:
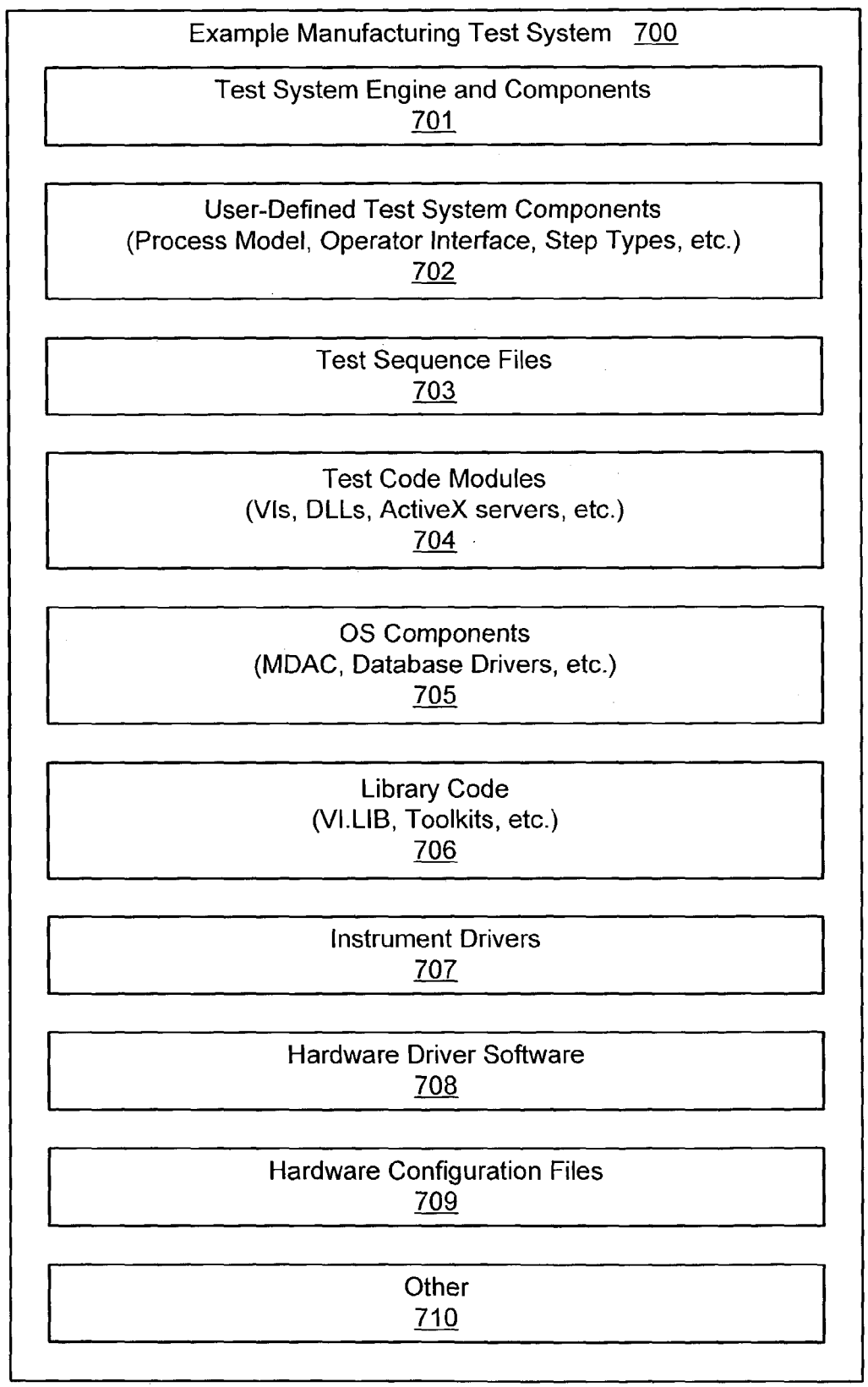
FIG. 7 illustrates components in an exemplary manufacturing test system, according to one embodiment.

FIG. 7—Example Manufacturing Test System

FIG. 7 illustrates an exemplary manufacturing test system 700. As used herein, the term "system deployment" refers to the collection and/or generation of all software components, referred to as "files to install", necessary to operate a complete system, the placement of the components on a target computer system (e.g., a target system, optionally including one or more coupled devices), and any configuration necessary for the system to operate successfully. As used herein, the term "deployable" refers to any software component in the dependency hierarchy of an application system plus components or files generated from the components. A deployable may be used to generate a file to install, or may itself be a file to install. Additionally, various infrastructure components, referred to as supporting components, may be required for operation of the application system, such as, for example, execution engines and their components. Thus, in addition to the files to install, one or more supporting components may need to be deployed onto the target computer system. In one embodiment, these supporting components may include or be bundled with corresponding installer software to form a supporting sub-installer, described in more detail below.

Thus, in deploying the test system 700, all of the components necessary for operation of the test system 700 may be deployed onto the target system. FIG. 7 illustrates a broad variety of deployables and supporting components that may be included in a manufacturing test system 700.

As FIG. 7 shows, the test system 700 may include a test system engine and components 701 such as, for example, the TestStand execution engine. The test system engine generally provides the core infrastructure for operating or executing the users application system, as is well known in the art. The test system 700 may also include user-defined test system components 702, such as, for example, the user's application, a process model, operator interface, test sequence step types, etc. A process model in this context is part of the testing sequence infrastructure and may include user-specified functionality such as prompting for serial numbers (of system hardware or software), logging data to files, and so on. In one embodiment, the process model may be implemented as a type of "meta-test sequence" for controlling the user's test sequence. In many situations, the end user of the deployed testing system 700 may be different from the developer of the system. As mentioned above, the end user may be an engineer or technician with limited computer or software experience, thus, the operator interface may be a user-defined or user-modified user interface (UI) for the test system designed specifically to facilitate operation of the test system by the end user.

As FIG. 7 also indicates, the test system components may also include test sequence files 703 specifying or implementing the particular testing sequences to be performed by the test system, as described above with reference to FIG. 5, as well as test code modules 704, such as VIs (virtual instruments), DLLs (dynamic linked libraries), ActiveX servers, etc., that may implement various functions used in performing the specified tests.

The test system 700 may also include various operating system (OS) components or services that may be required by the test system 700, but which may not already be included on the target system, such as, for example, MDAC (Microsoft Data Access Components), database drivers, and so on. In the embodiment shown, the test system 700 also includes library code 706, such as VI.LIB (virtual instrument code library), toolkits, etc. In other words, the test system 700 may also include various libraries, e.g., for providing further infrastructure functionality in support of user specification and/or operation of the system and/or the user's application code. Examples of library code include, but are not limited to, analysis libraries, data acquisition (DAQ) libraries, etc., that may be called by the user's test code modules to perform tests or related functions.

In one embodiment, the test system 700 may include various drivers and configuration files. For example, as FIG. 7 shows, the system may include instrument drivers 706, such as drivers for GPIB instruments, VXI instruments, etc., such as, for example, oscilloscopes, multi-meters, etc., coupled to the target computer via buses. As is known by those skilled in the art, the instrument drivers may be executed on the target computer system to communicate with and control the instruments via message-based communications. Hardware driver software 708 may also be included for providing low-level communication between the target computer system and hardware comprised in the system. As is well-known, hardware driver software may operate in conjunction with instrument drivers to facilitate communication between the target computer system, e.g., the user's application executing on the target computer, and hardware devices or instruments coupled to the target computer.

In addition to the various programs and libraries mentioned above, the components for the test system 700 may further include one or more data files. For example, hardware configuration files 709 may be included for configuring one or more hardware devices included in, or coupled to, the target computer. Of course, configuration files for software programs in the system may also be included. As FIG. 7 also indicates, various other components 710 may also be included in the test system as desired. For example, in one embodiment, the test system 700 may include various software constructs for operations with hardware drivers, such as named channels, aliases, and so forth.

Thus, a wide variety of supporting components and deployables may be included in a deployable test system, including not only the actual operational components of the system, but also various supporting components facilitating deployment, configuration, and/or support operations of the test system. As noted above, the example described with reference to FIG. 7 (the manufacturing test system) is meant to be exemplary only, and is not intended to limit the actual application system to any particular field or domain of application. Similarly, the deployables and supporting components listed are not intended to limit the components contemplated to any particular set or type of components. For example, the deployables and supporting components may include one or more of: an execution engine and one or more associated components, one or more user-defined application system components, one or more code modules, one or more libraries, one or more operating system components, one or more instrument drivers, one or more hardware drivers, one or more project files, one or more workspace files, and one or more data files, among others.

FIGS. 8A and 8B—Installer Creation System

FIGS. 8A and 8B illustrate embodiments of an installer creation system 800. The installer creation system 800 may be invoked by a developer or user to analyze an application system and programmatically generate an installer for automatic deployment of the application system onto a target computer system. The installer may then be used to programmatically deploy the application system onto a target system, where after deployment the target system may be operable to perform a specified function via operation of the deployed application system.

FIG. 8A is a block diagram of the components of the installer creation system 800, according to one embodiment. As FIG. 8A illustrates, in one embodiment, the installer creation system 800 may include a deployment manager 801, a plurality of deployers 802, and an installer builder 803. As shown, in one embodiment, the installer builder 803 may comprise a component distribution service 804 and a build distribution service 805, described below. Although not generally part of the installer creation system proper, operation of the installer creation system 800 may require one or more deployables 810 and/or supporting components, examples of which are described above with reference to FIG. 7.

In one embodiment, the deployment manager 801 may operate to manage the installer creation process. In other words, the deployment manager (or its equivalent) 801 may be operable to perform various functions in the creation process, and may also be operable to invoke the other components of the installer creation system 800 to perform various other functions in the creation process. For example, in one embodiment, the deployment manager 801 may be operable to analyze each deployable 810 for an application system and invoke appropriate respective deployers 802 to analyze each deployable to determine corresponding files to install, as well as further deployables 810, in effect, tracing respective dependencies in each deployable to determine all of the deployables 810 for the application system, from which a complete set of files to install may be determined. The deployment manager 801 may then invoke the installer builder 803 to programmatically generate an application system installer for the application system.

In one embodiment, one or more of the deployables may include deployment information indicating how to deploy that deployable. For example, the deployable may include a published deployment specification indicating deployment information such as dependencies, platform, or other information useful for a deployer to deploy the deployable. In one embodiment, the deployment information may be stored separately from the deployable, e.g., in a database, where the deployment manager 801 and/or a deployer 802 may access the information as needed. In one embodiment, each deployable may have a default deployer for deploying that deployable. However, in one embodiment, a deployable may also specify a different deployer, e.g., over-riding the default deployer.

In one embodiment, each of the deployers 802 knows how to deploy one or more related deployables, possibly via the use of the deployment information mentioned above. A deployer 802 may be simple, e.g., a text file describing dependencies for the deployable, or complex. For example, the deployer may be operable to perform one or more functions to analyze and/or deploy the deployable, where deploying the deployable may be as simple as copying files to a target location, or may include more complex functions, such as building, e.g., compiling and linking, the deployables to generate one or more files to install. Typically, although not always, a deployer is a development environment associated with a respective deployable. For example, for deployables such as a TestStand workspace or test sequence file, the deployer may be the TestStand development system, e.g., a deployment service in the TestStand system.

Thus, the various components of the installer creation system 800 may operate together to determine a complete set of files to install for an application system, and may use the determined files to install to generate an installer for deploying the application system onto a target system.

FIG. 8B is a block diagram of a more detailed embodiment of the installer creation system of FIG. 8A. In the embodiment of FIG. 8B, the installer creation system 800 is integrated into or coupled to an application development environment (ADE) 820, such as National Instruments Corporation's LabVIEW or TestStand systems, as mentioned above. The ADE includes a user interface 822, preferably a graphical user interface, whereby the user may specify and invoke the installer creation process. An example of an ADE UI 822 is described above with reference to FIGS. 6A and 6B.

Thus, as FIG. 8B shows, the ADE UI 822 may couple to the deployment manager 801, and may facilitate invocation of the installer creation system 800 by the user. As mentioned above, the deployment manager 801 may couple to a plurality of deployers 802. In the embodiment shown in FIG. 8B, the deployers 802 include a TestStand deployer 802A, a LabVIEW deployer 802B, a CVI (C-Language Virtual Instrument) deployer 802C, and an Instrument Driver deployer 802D, among others. One or more of these deployers 802 may be comprised as deployment services in respective ADEs, e.g., TestStand and LabVIEW systems. In other words, the development environments may include deployment services, e.g., deployers, which are invocable by the deployment manager to analyze respective deployables to determine one or more files to install, as well as further deployables.

In one embodiment, the deployment manager 801 may include a deployers-to-deployables map 806 and a manifest 807, as shown. The deployers-to-deployables map 806 may include information indicating respective deployers for each of a plurality of deployables, and may facilitate the deployment manager 801 in determining appropriate deployers 802 for the deployables 810 of an application system. The manifest 807 (or its equivalent) may provide means for keeping track of which deployables 810 have been determined, but not yet analyzed, as well as determined files to install and supporting sub-installers. For example, a root deployable may be placed on the manifest 807, e.g., on an "unanalyzed deployables list", referred to herein as the deployables list. The deployment manager 801 may retrieve the first deployable in the manifest (on the deployables list), in this case, the root deployable, and may invoke a respective deployer 802, in this case, the root deployer, e.g., the TestStand deployer 802A, which may then analyze the first deployable and determine zero or more further deployables, e.g., based on determined dependencies of that deployable. The zero or more further deployables may then be added to the deployables list of the manifest. The deployable may be added to a "files to install list" of the manifest 807, and removed from the deployables list. The deployment manager 801 may then proceed with the next deployable in the manifest 807, repeating the process until all of the deployables for the application system have been determined (and analyzed), and the complete list of files to install has been generated.

As noted above, in one embodiment, the manifest may also include information indicating one or more pre-defined supporting sub-installers determined by the deployers to be necessary for deployment and/or operation of their respective deployables, e.g., in the form of a supporting sub-installers list. As mentioned above, supporting sub-installers are typically pre-existing infrastructure components, referred to as supporting components, such as, for example, TestStand Run-Time System, LabVIEW Run-Time Engine, NI-DAQ Run-Time Distribution package, etc., combined with respective installation software for installing the supporting components. These supporting sub-installers may include supporting components packaged with respective installation software for installing the supporting components. As will be described below, these supporting sub-installers may be combined with a sub-installer generated from the files to install to form the application system installer.

As FIG. 8B also shows, the deployment manager 801 may couple to the installer builder 803 and may be operable to invoke the installer builder 803 to programmatically generate an application system installer using the determined files to install (and possibly supporting sub-installers).

In one embodiment, the installer builder 803, e.g., the component distribution service 804 of the installer builder, may be operable to generate one or more sub-installers based on the determined files to install (e.g., user files) in the manifest, referred to as user-files sub-installers. The installer builder 803, e.g., the build distribution service 805 of the installer builder, may be further operable to combine the generated user-files sub-installers with the pre-existing supporting sub-installers to generate the application system installer. The generated application system installer may then be operable to programmatically install the application system, including user files and supporting components, onto a target system.

It is noted that in one embodiment, the sub-installers may themselves have dependencies with respect to other sub-installers, and thus, in some embodiments, the sub-installers may each be analyzed to determine further sub-installers, e.g., by the build distribution service 805, until all of the sub-installers have been determined, similar to the determination of deployables, described above, and as described in more detail below with reference to FIG. 9. The build distribution service 805 may then combine the one or more user files sub-installers with all of the determined supporting sub-installers to generate the application system installer. Further information regarding the determination and generation of installers using sub-installer dependencies is presented below with reference to FIGS. 11–16.

In one embodiment, the installer builder 803, e.g., the build distribution service 805, may be operable to include a user interface for the installer as part of the installer. In other words, the installer builder 803 may include an installer interface, e.g., a GUI, with the installer for use by a client or end user in installing the application system. The interface may be of any type desired. For example, the interface may simple, e.g., a pop-up dialog with an install button and a cancel button, or may be more complex, e.g., an installation wizard that leads the client through the installation process. In one embodiment, the installer interface may allow the client to select or specify installation options at the time of installation. For example, the client may specify that only a portion of the installation be performed, or that particular components of the application system be configured in a particular way.

Thus, the installer creation system 800 may be operable to analyze components of an application or application system and programmatically generate an installer for deploying the application system to a target system, including a target computer system and hardware comprised therein or coupled thereto. Further details of the installer creation process are provided below with reference to FIG. 9.

Figure 9:
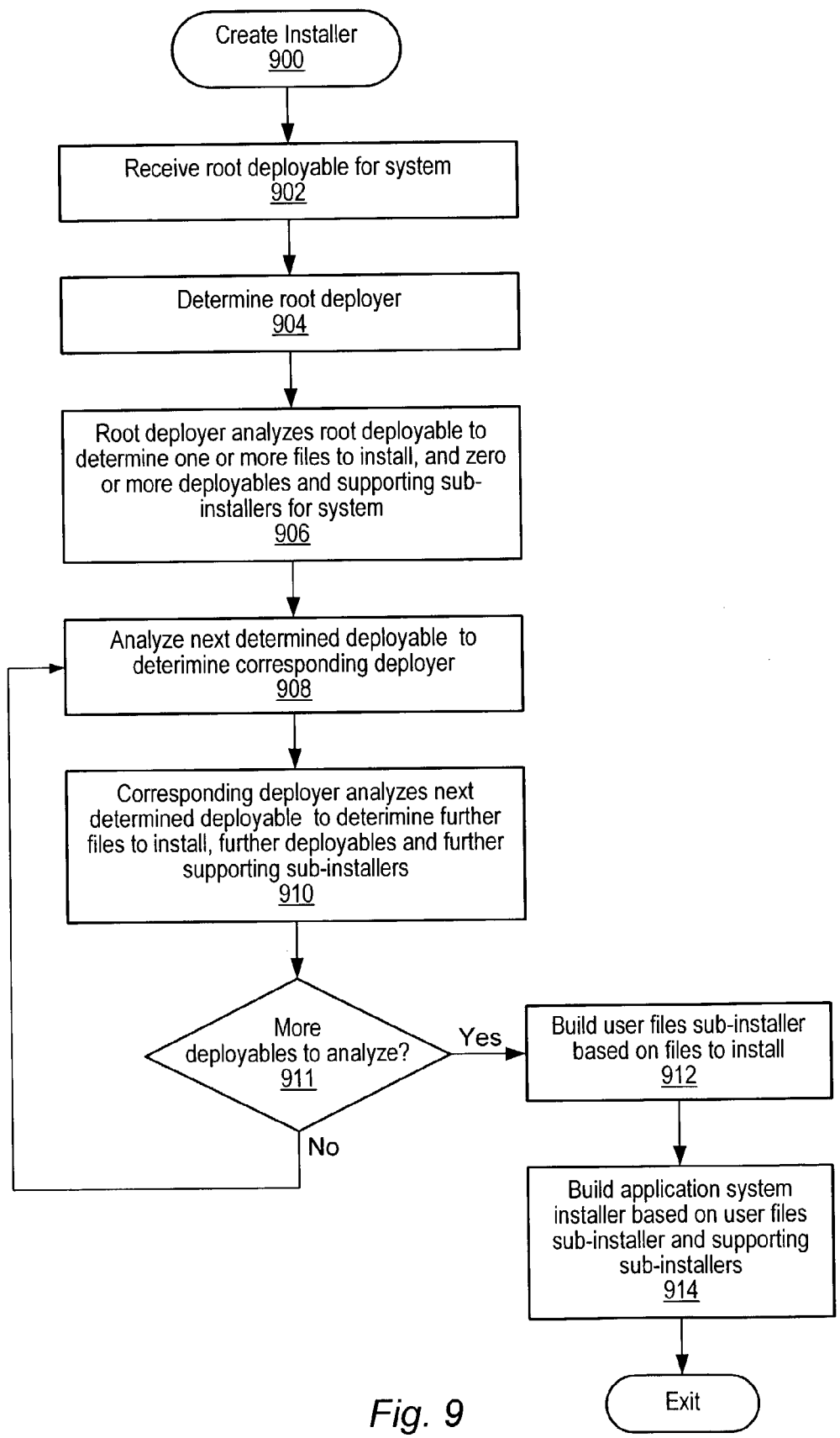
FIG. 9 flowcharts one embodiment of a method for creating an application system installer.

FIG. 9—Creating An Application System Installer

FIG. 9 is a flowchart of one embodiment of a method for programmatically creating an application system installer. As mentioned above, in various embodiments, the method may be initiated by launching a build/deploy utility included in an ADE, where the utility performs an embodiment of the method on an application or an application system developed with the ADE. It should be noted that in various embodiments, some of the steps described below may be performed in a different order than shown, or may be omitted. Additional steps may also be performed as desired. It is further noted that particular terms used to describe process steps or components are not intended to limit the described method to any particular implementation, but rather the method is contemplated as being broadly applicable and implementable using a wide variety of techniques and approaches. Additionally, it is noted that various embodiments of the present invention may be applied in a wide variety of fields. For example, the application system may comprise one or more of: a measurement system, a test system, an automation system, a control system, a simulation system, and a network system, among others.

As FIG. 9 shows, in 902 a root deployable for an application system may be received, where the application system is operable to perform a function. The root deployable may be thought of as the top-level file, controlling or organizing agent, or application for the application system. As described above, a user may develop an application or project file in the ADE, and invoke a build/create installer utility or service. For example, the user may develop a TestStand workspace using the TestStand development system, and select a build option from the ADE GUI. The ADE may pass the application or project file to the deployment manager as the root deployable of the application system. As noted above, in one embodiment, the root deployable may be added to the manifest 807, e.g., the "unanalyzed deployables list", i.e., the deployables list described above. The manifest 807 may then be passed to the deployment manager 801 for analysis, described below.

In 904, a root deployer for the root deployable may be programmatically determined by the deployment manager 801. In other words, a respective deployer 802 for the root deployable may automatically be determined that knows how to deploy the root deployable. In one embodiment, the deployment manager 801 may receive the manifest 807 and retrieve the first deployable in the deployables list—in this case, the root deployable, for the analysis.

Once the root deployer has been programmatically determined in 904, then in 906, the root deployer may programmatically analyze the root deployable to programmatically determine zero or more deployables, where each of the zero or more deployables is operable to perform a respective portion of the function. In one embodiment, the deployment manager 801 may pass the manifest to the root deployer. The root deployer may then add the root deployable to a "files to install" list, e.g., in the manifest, remove the root deployable from the deployables list, and add the determined zero or more deployables to the deployables list of the manifest, e.g., for subsequent analysis, as described below.

In one embodiment, the root deployer may also programmatically analyze the root deployable to determine zero or more supporting sub-installers, where, as described above, each supporting sub-installer includes one or more supporting components with corresponding installation software for deploying the supporting components onto a target system. Examples of supporting components include ADEs, runtime engines, such as the TestStand Run-Time Engine, the LabVIEW Run-Time Engine, NI-DAQ Run-Time, etc., or other infrastructure components necessary for operation of the application system. As also noted above, the supporting sub-installers are preferably pre-defined and known by the deployer, thus, the deployer may programmatically analyze the deployable, programmatically determine necessary supporting components, and programmatically determine the appropriate supporting sub-installers that contain those supporting components, adding the supporting sub-installers to the supporting sub-installers list of the manifest 807.

In one embodiment, prior to, during, or after the root deployer programmatically analyzes the root deployable to determine zero or more deployables, the root deployer may programmatically perform a build operation on the root deployable. For example, where the root deployable is a workspace or project file indicating a plurality of files for the application system, the root deployer may build, e.g., compile and link, the workspace or project file, thereby generating additional files, e.g., one or more executables and/or DLLs, etc., for the application system. In other words, the deployer may generate one or more additional files to install based on the analyzed deployable. These files may then be added to the files to install list of the manifest.

Once the root deployer is done analyzing the root deployable and updating the manifest 807, the updated manifest 807 may be passed back to the deployment manager 801 for subsequent processing.

As indicated in 908, the deployment manager 801 may retrieve the next deployable from the deployables list of the manifest 807, and programmatically analyze the next deployable to determine a corresponding next deployer for that deployable. The deployment manager 801 may then invoke the determined next deployer, passing the current manifest 807 and the retrieved next deployable (e.g., the test sequence file) to the deployer for analysis.

In 910, the next deployer may programmatically analyze the next deployable to determine zero or more further deployables, and may determine zero or more further supporting sub-installers, as well. As described above, the next deployer may add the next deployable to the files to install list of the manifest 807, and may remove the next deployable from the deployables list. As also mentioned above, in one embodiment, the next deployer may perform a build operation on the next deployable, thereby generating one or more additional files to install, which may then be added to the files to install list as well. As before, once the analysis is done, the deployer may return the updated manifest to the deployment manager 801 for further processing.

In 911, the deployment manager 801 may determine whether there are further deployables to be analyzed, e.g., by checking for further deployables in the deployables list of the manifest 807. If there are further deployables to analyze, then the method may proceed to step 908 above, and continue as described. In other words, the deployment manager 801 may retrieve a (new) next deployable from the deployables list, determine a (new) next deployer for that deployable, and pass the manifest and deployable to the deployer for analysis, as described above. The deployer may then determine zero or more further deployables, zero or more supporting sub-installers, and one or more files to install for each deployable on the deployables list, and update the manifest accordingly. Thus, the described programmatically determining and analyzing for each of the deployables may be performed until all deployables for application system have been determined and analyzed, and all files to install for the application system have been determined, as well as possibly one or more supporting sub-installers.

If in 911 the deployment manager 801 determines that there are no more deployables to analyze, e.g., that the deployables list of the manifest 807 is empty, then in 912, one or more user files sub-installers may be built or generated based on the determined files to install indicated in the manifest 807. Then, as indicated in 914, an application system installer may be programmatically generated based on the generated one or more user files sub-installers and the determined supporting sub-installers, where the application system installer is operable to programmatically deploy the application system onto a target system to perform the function.

It should be noted that the application system installer, also referred to as a "distribution", preferably includes a superset of software components required for each of various installations of the application system. In other words, as is well known in the art, depending on the type and characteristics of the target system and the user's preferences, various versions of the application system may be deployed to the target system. Thus, the distribution preferably includes all of the software components that may be required for any particular installation of the application system. The distribution or application system installer may be delivered to end users via a wide variety of means, such as, for example, by storing the distribution on a CD (compact disc) and delivering the CD to the user, or by transmitting the distribution to a user (e.g., the user's computer system) over a network, e.g., the Internet, among others.

In one embodiment, the determined supporting sub-installers may be analyzed, e.g., using sub-installer dependency information, to determine additional supporting sub-installers. The generation of the application system installer may then also be based on these additional supporting sub-installers. Further details regarding the determination of additional supporting sub-installers based on sub-installer dependencies is provided below with reference to FIGS. 11–16.

In one embodiment, once the method determines that there are no more deployables to analyze, e.g., that the deployables list is empty, the user may be allowed to add any additional files desired to the files to install list, e.g., readme.txt, help files, or any other desired files which are not in the application system's dependency hierarchy. For example, the ADE GUI may provide menu options or buttons allowing the use to specify or browse for additional files. In one embodiment, the deployment manager 801 may request the ADE to prompt the user for input specifying such files.

In one embodiment, the user may be allowed to select between alternate supporting sub-installers for inclusion in the application system installer. For example, the deployment manager 801 may request the ADE to provide options to the user for selecting between various supporting sub-installers, where each of the sub-installers may work, but where one may be more suitable for the user's purposes such as, for example, a full development system vs. a (minimal) run-time system. For example, the user may select between the TestStand Run-Time Engine and the TestStand Development System, or between the LabVIEW Run-Time Engine and the LabVIEW Development System, and so on.

Another embodiment of the above method may also be described thusly:

A root deployable for an application system may be received, where the application system is operable to perform a function, and the root deployable added to a deployables list, e.g., in the manifest for the application system. The manifest may then be provided to a deployment manager 801.

A next deployable may be retrieved from the deployables list, e.g., by the deployment manager 801. The deployment manager 801 may programmatically analyze the next deployable to determine a respective deployer for the next deployable, and invoke the respective deployer to programmatically analyze the next deployable to determine zero or more further deployables, where each of the zero or more deployables is operable to perform a respective portion of the function. The deployer may also determine one or more files to install based on the analysis. In one embodiment, the deployer may further programmatically analyze the next deployable to determine zero or more supporting sub-installers, as described above.

The determined zero or more deployables may be added to the deployables list, the determined one or more files to install may be added to a files to install list, e.g., in the manifest 807, and the next deployable may be removed from the deployables list. Any determined supporting sub-installers may be added to a supporting sub-installers list, as well.

The retrieving a next deployable, programmatically analyzing the next deployable, invoking the next deployer, adding deployables, and adding files to install, and removing the next deployable, (and optionally determining and adding sub-installers) may be repeated until all deployables on the deployables list have been analyzed, e.g., until the deployables list is empty, thereby determining all of the files to install for the application system.

The application system installer may then be programmatically generated using the determined files to install, and optionally, the determined supporting sub-installers, where the application system installer is operable to programmatically deploy the application system onto a target system to perform the function.

In one embodiment, the method may further include executing the application system installer to programmatically deploy the application system onto a target system, where after the application system is deployed on the target system the target system is operable to perform the function. For example, in one embodiment, the target system may include a target computer and at least one device coupled to the target computer. Programmatically deploying the application system onto the target system may include one or more of:

programmatically deploying one or more programs onto the target computer, wherein the target computer is operable to execute the one or more programs to perform at least a portion of the function;

programmatically deploying at least one program onto the at least one device, wherein the at least one device is operable to execute the at least one program to perform at least another portion of the function;

programmatically configuring target computer hardware and/or the at least one device hardware in accordance with one or more hardware configuration files; and programmatically configuring a program on the target computer and/or a program on the at least one device in accordance with one or more program configuration files.

Thus, deploying the application system to a target system using the application system installer may include deploying programs to various hardware devices, including the target computer, as well as configuring one or more programs and/or hardware devices.

Figure 10:
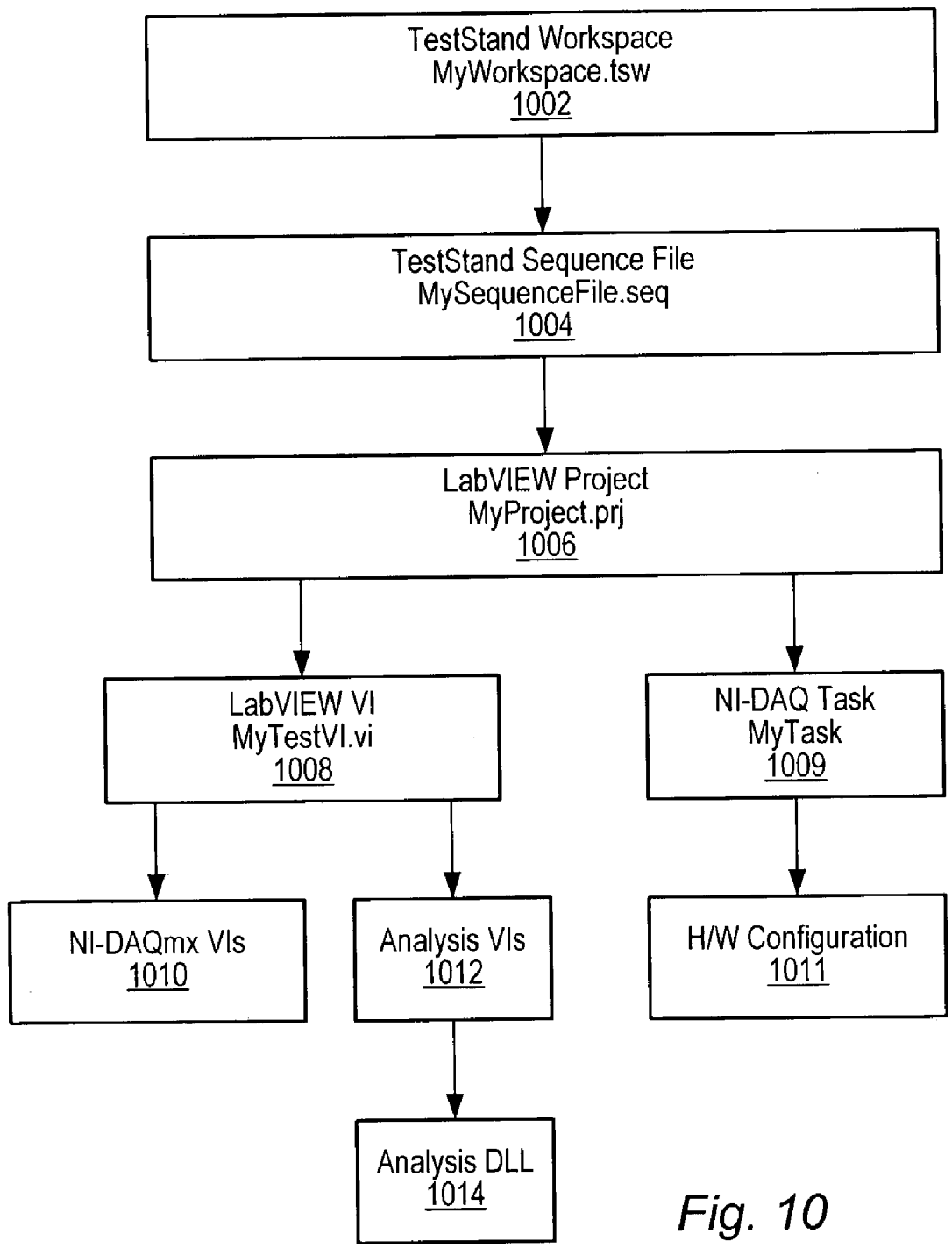
FIG. 10 illustrates an example application system, according to one embodiment.

A detailed example application of one embodiment of the above method is presented below FIG. 10—TestStand Example FIG. 10 illustrates an example application system, more specifically, an example TestStand system, used to illustrate various portions of the example use of the method of FIG. 9. As FIG. 10 shows, the top level file (root deployable) for the application system is a TestStand workspace file, MyWorkspace.tsw 1002. This root deployable has a dependency on (uses) a TestStand Sequence File, MySequenceFile.seq 1004, which itself depends on a LabVIEW Project, MyProject.prj 1006, as shown. As FIG. 10 also indicates, in this example system, the project file 1006 uses a LabVIEW VI, MyTestVI.vi 1008, and an NI-DAQ Task, MyTask 1009. The LabVIEW VI 1008 has sub-components NI-DAQ VIs 1010 and Analysis VIs 1012. The Analysis VIs 1012 have sub-component Analysis DLL 1014. The NI-DAQ Task 1009 has or uses a hardware configuration file, H/W Configuration 1011. Thus, the TestStand system shown includes a variety of deployables, many of which include further deployables.

The following example describes one embodiment of the method of FIG. 9 as applied to the example TestStand system of FIG. 10.

1. User chooses to deploy MyWorkspace.tsw 1002 from within TestStand.
2. TestStand passes MyWorkspace.tsw 1002 to the Deployment Manager (DM) 801 as the root deployable.
3. DM 801 determines that TestStand is the correct deployer for MyWorkspace.tsw 1002.
4. DM 801 invokes the TestStand Deployer Service (DS) with MyWorkspace.tsw 1002 and the current Manifest.
5. TestStand DS analyzes MyWorkspace.tsw 1002 and adds the following items to the Manifest:
Supporting Sub-installers: TestStand Run-Time Engine or TestStand Development System
Files to Install: MyWorkspace.tsw 1002
Unanalyzed Deployables: MySequenceFile.seq 1004
6. TestStand returns updated Manifest to DM 801.
7. DM 801 determines that TestStand is the correct deployer for MySequenceFile.seq 1004.
8. DM 801 invokes TestStand DS with MySequenceFile.seq 1004 and the current Manifest.
9. TestStand DS analyzes MySequenceFile.seq 1004 and adds the following items to the Manifest:
Files to Install: MySequenceFile.seq 1004
Unanalyzed Deployables: MyProject.prj 1006
TestStand DS returns updated Manifest to DM 801.
10. DM 801 determines that LabVIEW is the correct Deployer for MyProject.prj 1006.
11. DM 801 invokes the LabVIEW DS with MyProject.prj 1006 and the current Manifest.
12. LabVIEW DS analyzes MyProject.prj 1006 and adds the following items to the Manifest:
Supporting Sub-installers: LabVIEW Run-Time Engine or LabVIEW Development System
Unanalyzed Deployables: MyTestVI.vi 1008, MyTask 1009
13. LabVIEW DS returns updated Manifest to DM 801.
14. DM 801 determines that LabVIEW is the correct deployer for MyTestVI.vi 1008.
15. DM 801 invokes LabVIEW DS with MyTestVI.vi 1008 and the current Manifest.
16. LabVIEW DS analyzes MyTestVI.vi 1008 and adds the following items to the Manifest:
Files to Install: New VI library containing MyTestVI.vi hierarchy, including NI-DAQ VIs 1010 and Analysis VIs 1012, and Analysis DLL 1014.
17. LabVIEW DS packages MyTestVI.vi hierarchy into VI library, compiling and re-linking as necessary, and returns updated Manifest to DM 801.
18. DM 801 determines that NI-DAQ is the correct deployer for MyTask 1009.
19. DM 801 invokes NI-DAQ DS with MyTask 1009 and the current Manifest.
20. NI-DAQ DS analyzes MyTask 1009 and adds the following items to the Manifest:
Supporting Sub-installers: NI-DAQ Minimal or Full Distribution
Files to Install: New .cfg file containing all configuration information for MyTask 1009 (both software and hardware)
21. NI-DAQ DS creates configuration file and returns updated Manifest to DM 801.

The Unanalyzed Deployables list is now empty.
22. DM 801 asks TestStand to prompt user to add any additional files to Files to Install list.
23. DM 801 uses Create Distribution Service to create new User Files sub-installer containing all files in Files to Install list.
24. DM 801 asks TestStand to allow user to choose between any alternate supporting sub-installers:
TestStand Run-Time Engine or Development System
LabVIEW Run-Time Engine or Development System
NI-DAQ Minimal or Full Distribution
25. DM 801 asks TestStand to allow user to set any necessary configuration information for the installer (name, default installation directory, and so on).
26. DM 801 uses Build Distribution Service to create new Application System Installer containing new Sub-installer, all Supporting Sub-installers, and their dependents.

Thus, various embodiments of the system and method described above may be used to programmatically generate an application system installer for an application system, where the application system is operable to perform a function. The generated application system installer may be executable to deploy the application system on a target system, where after deployment, the target system is operable to perform the function.

As mentioned above, in one embodiment, the supporting sub-installers determined by the respective deployers may be analyzed, e.g., using sub-installer dependency information, to determine additional supporting sub-installers. The generation of the application system installer may then also be based on these additional supporting sub-installers. FIGS. 11–16, described below, illustrate further details of the process of generating the application system installer, as well as the use of the application system installer to deploy the application system onto a target system.

Figure 11:
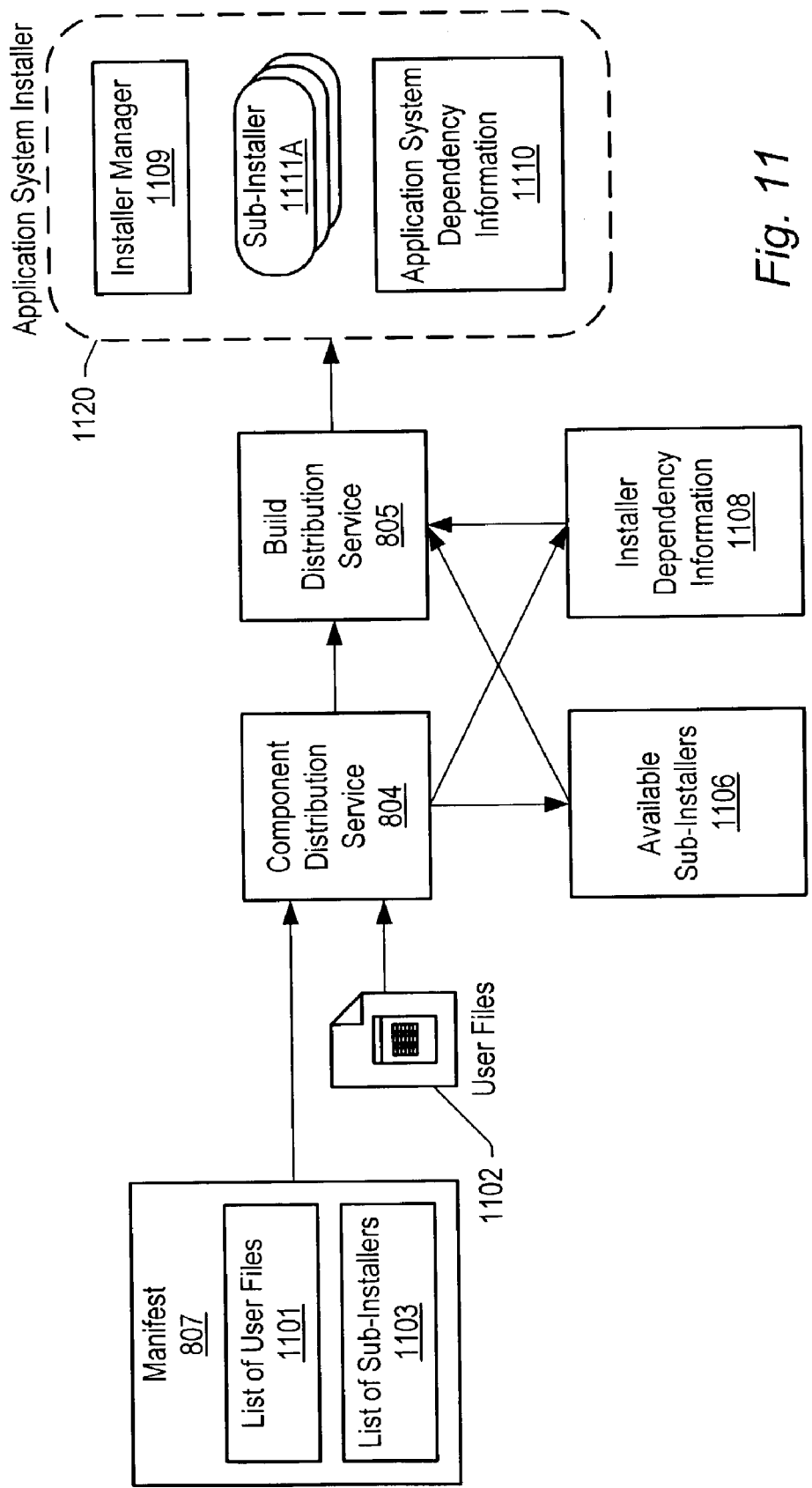
FIG. 11 is a block diagram illustrating the generation of an application system installer, according to one embodiment.

FIG. 11—Generation of the Application System Installer

FIG. 11 is a high level block diagram illustrating one embodiment of the generation of an application system installer 1120, e.g., by the installer builder 803. More specifically, FIG. 11 illustrates an embodiment of the application system installer 1120 by the component distribution service 804 and the build distribution service 805.

As FIG. 11 shows, (and as described above), a plurality of user files 1102 may be received or retrieved by the component distribution service 804 (or its equivalent). For example, as also described above, the component distribution service 804 may receive a manifest 807 that includes a list of user files and a list of supporting sub-installers, where the user files and supporting sub-installers may be usable to deploy the application system onto a target system. The component distribution service 804 may retrieve the user files indicated by the user files list, and generate one or more user files sub-installers, where the user files sub-installers may be operable to deploy the user files onto a target system.

As also indicated in FIG. 11, the component distribution service 804 may have access to available sub-installers 1106, e.g., in the form of a sub-installers database or other type of repository. In one embodiment, the component distribution service 804 may add the generated user files sub-installer to the available sub-installers 1106, thereby making the user files sub-installer available for other systems or components. In one embodiment, the component distribution service 804 may also add the generated user files sub-installer to the list of sub-installers in the manifest. In one embodiment, the component distribution service 804 may also add dependency information for the one or more user files sub-installers to installer dependency information 1108, including, for example, user file dependencies, features, and costing (disk space requirements), etc. The installer dependency information 1108 may include dependency information for each of the available sub-installers. In one embodiment, the installer dependency information 1108 may be included in the sub-installers themselves, e.g., each sub-installer may include its own dependency information. In another embodiment, the installer dependency information 1108 may be stored in a dependency database.

The component distribution service 804 may pass the list of supporting sub-installers 1103, including the one or more user files sub-installers, to the build distribution service 805, as shown. The build distribution service 805 may analyze each of the sub-installers, e.g., may analyze the dependency information for each sub-installer, and may determine additional sub-installers based on the analysis. In other words, the build distribution service 805 may determine additional sub-installers that contain software components which may be required by the application system.

In one embodiment, the build distribution service 805 may determine dependency information for all of the determined and generated sub-installers for the application system, referred to as application system dependency information 1110, and may generate an application system dependency file 1110 containing this information. In other words, the build distribution service 805 may consolidate all of the dependency information for the application system sub-installers 1111, including, for example, sub-installer feature sets and costing (in terms of disk space needed) information, into one place. Further information related to the application system dependency file 1110 is provided below.

The build distribution service 805 may then generate the application system installer 1120. The generated application system installer 1120 may include an installer manager 1109, all of the determined and generated sub-installers 1111, including all of the determined supporting sub-installers and the one or more user files sub-installers, and application system dependency information 1110 (the application system dependency file 1110), as shown in FIG. 11. The installer manager 1109 may use this information at run-time to determine the total cost of selected features for the application system installation. The generated application system installer 1120 may then be operable to deploy the application system to a target system. Further details regarding the generation of the application system installer are provided below.

Figure 12:
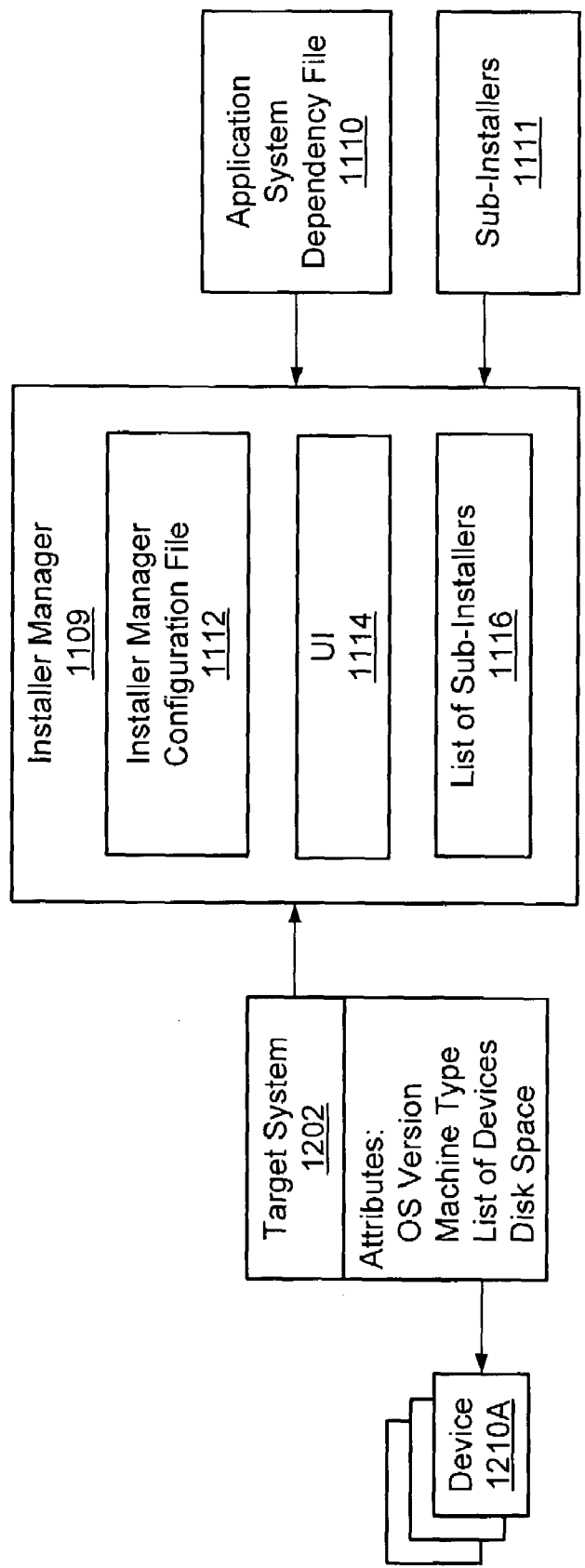
FIG. 12 is a block diagram illustrating an installer manager, according to one embodiment.

FIG. 12—Installer Manager

FIG. 12 is a block diagram illustrating one embodiment of the installer manager 1109. The installer manager 1109 may be operable to manage the installation of the application system onto the target system. In other words, when an end user executes the application system installer 1120, the installer manager 1109 may operate to execute one or more of the sub-installers 1111 in the application system installer 1120 to deploy the application system to the target system. In one embodiment, the installer manager 1109 may also facilitate the determination of the particular installation or version of the application system to deploy to the target system, as described below.

As FIG. 12 shows, in this embodiment, the installer manager 1109 may include an installer manager configuration file 1112 that contains configuration information for the installer manager 1109. In another embodiment, the installer manager configuration file 1112 may be included in the application system installer 1120 as a separate component from the installer manager 1109, i.e., the configuration file 1112 may be used by the installer manager 1109, but may not actually be a part of the installer manager 1109. The installer manager configuration file 1112 is preferably determined or generated by a developer as part of the application system installer creation, and may specify various aspects of the installer manager's behavior and/or appearance. For example, in some situations, the application system installer 1120 may be targeted for use by particular types of users, e.g., plant floor managers or engineers, computer system administrators, etc., with varying degrees of familiarity with computer systems. Thus, in one embodiment, the installer manager configuration file 1112 may specify a particular user interface (UI) for the deployment process, where the UI is designed specifically with the particular user type in mind.

As FIG. 12 also shows, in one embodiment, the installer manager 1109 may include a UI 1114 (or possibly a plurality of UIs 1114). In various embodiments, the UI may be a graphical user interface (GUI), a text based interface, e.g., a command line interface, or any other type of user interface, as desired. The UI may be presented to the user by the installer manager 1109, and may facilitate interactions with the user to specify, monitor, and/or control the installation or deployment process. In one embodiment, the UI (or UIs) 1114 may be included in the application system installer 1120 as a separate component, i.e., the UI 1114 may be invocable by the installer manager 1109, but may not actually be a part of the installer manager 1109.

In one embodiment, the installer manager 1109 may include a list of sub-installers 1116. More specifically, the installer manager 1109 may include a list of the sub-installers included in the application system installer 1120, and may use the list of sub-installers 1116 to analyze and deploy various of the sub-installers 1111 to the target system.

As indicated in FIG. 12, the installer manager 1109 may access other components or devices in managing the installation process. For example, the installer manager 1109 may be operable to determine state information for a target system 1202, which, as noted above, may include a target computer and possibly one or more devices coupled to the target computer. The state information for the target system may include, but is not limited to, such attributes as: operating system (OS), including OS version information, machine type, a list of any devices or boards 1210 comprised in or coupled to the target computer, RAM (random access memory), and disk space, among others. In one embodiment, the installer manager may determine the state information for the target system by querying the target computer. Alternatively, the installer manager may access state information directly to determine the various attributes of the target system. The state information may be analyzed (in conjunction with other information) to determine which of the sub-installers to invoke to deploy the application system to the target system, as discussed in more detail below. In one embodiment, the installer manager 1109 may maintain a data structure for storing the target system state information.

In one embodiment, the installer manager 1109 may be operable to access the application system dependency file 1110 for the application system. As mentioned above, the application system dependency file 1110 contains information regarding the dependencies of the sub-installers 1111 for the application system, and may be used by the installer manager 1109 in determining which sub-installers to invoke to deploy the application system.

As also indicated, the installer manager 1109 may be operable to retrieve various of the sub-installers 1111, e.g., based on analysis of the target system, the application system dependency information, and possibly user input, and may execute the retrieved sub-installers to deploy respective components of the application system onto the target system, as described in more detail below.

In various embodiments, the installer manager 1109 may be operable to perform a variety of functions related to the deployment of the application system. For example, the installer manager 1109 may perform functions such as gathering input, running an install sequence, building feature trees, e.g., based on features for the current installation, installing/uninstalling, determining and/or managing install dependencies, gathering, merging, and analyzing dependency information, and so on. The installer manager 1109 may also include directory information, e.g., a list of directories, that may be used and/or modified by the user and/or the sub-installer as needed for the deployment process.

Additionally, as mentioned above, in some embodiments, some or all of the sub-installers may be grouped into products, e.g., TestStand or LabVIEW products. Thus, in one embodiment, the installer manager 1109 may include or may be able to access product related information, such as, for example, a product list for the system application, product/installer dependencies, and so forth. A detailed block diagram of one embodiment of a sub-installer and its relationship with features and products is provided below with reference to FIG. 13.

Figure 13:
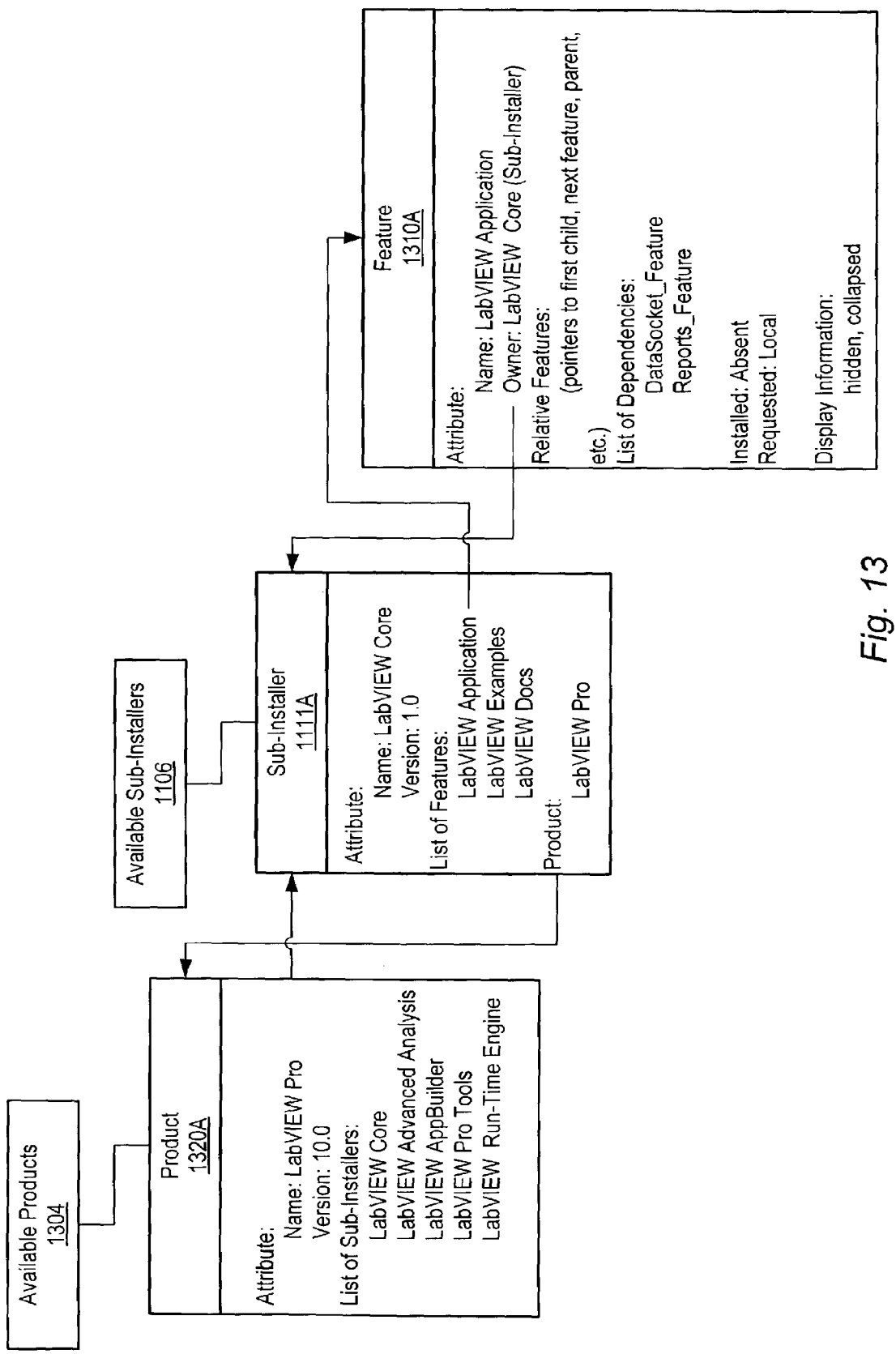
FIG. 13 illustrates relationships between products, sub-installers, and features, according to one embodiment.

FIG. 13—Products, Sub-Installer, and Features

FIG. 13 is a block diagram illustrating the relationship between sub-installers 1111, products 1320, and features 1310, according to one embodiment. More specifically, FIG. 13 illustrates the relationship between an example Lab-VIEW Core sub-installer 1111A, and a related product, LabVIEW Pro 1320A, as well as between the sub-installer 1111A and a related feature 1310, specifically, a LabVIEW Application feature 1310A. The information shown is based loosely on possible class definitions for each entity, although it is noted that the embodiments shown are exemplary only, and are not intended to limit the architecture, functionality, or form to any particular type.

As FIG. 13 shows, the sub-installer 1111A (the LabVIEW Core sub-installer) may be included in the available sub-installers 1106, e.g., in a sub-installers list or database, as mentioned above. As also mentioned above, the LabVIEW Core sub-installer 1111A may include not only the core software modules for LabVIEW, but preferably also includes installation software that is executable to deploy the LabVIEW Core onto the target system 1202. The sub-installer may include identification information, such as a name (LabVIEW Core) and a version number (1.0). As shown, the sub-installer may also include a list of one or more features included in the sub-installer, e.g., LabVIEW Application 1310 and LabVIEW Examples, and LabVIEW Documentation. As also shown, the sub-installer may include a product identification or reference indicating the product 1320 of which this sub-installer is a part, in this case, LabVIEW Pro 1320A. It is noted than in various embodiments, the sub-installer 1111 may include any other type of information deemed necessary or useful for the deployment process, such as, for example, costing information (disk space requirements), etc.

As indicated in FIG. 13, the product 1320 may be included in an available products list or database 1304, and may itself include identification information, such as a name (LabVIEW Pro) and a version number (10.0). As shown, the product 1320A may also include a list of one or more sub-installers included in the product 1320, e.g., the Lab-VIEW Core sub-installer 1111A, as well as LabVIEW Advanced Analysis, LabVIEW AppBuilder, LabVIEW Pro Tools, and LabVIEW Run-Time Engine. Thus, each product 1320 may know the sub-installers required to deploy the product. It is also noted than in various embodiments, the product 1320 may include any other type of information deemed necessary or useful for the deployment process, such as costing information (disk space requirements), etc.

The feature 1310 shown in FIG. 13, specifically the LabVIEW Application feature 1310A, is included in the LabVIEW Core sub-installer 1111A, as indicated. In this example, the feature 1310A includes identification information, such as a name (LabVIEW Application) and an owner, in this case, the LabVIEW Core sub-installer 1111A. In one embodiment, the feature 1310 may also include references to related features, e.g., a pointer to a first child feature, a next feature pointer, a parent feature pointer, etc. As also indicated, the feature 1310 may also include dependency information for the feature, e.g., a list of dependencies. In the example shown, the dependencies include such features as a DataSocket Feature and a Reports Feature. As noted above with respect to the sub-installer and product, in various embodiments, the feature 1310 may include any other type of information deemed necessary or useful for the deployment process, such as state information (e.g., whether the feature is already installed on the target system), costing information (disk space requirements), etc. The example feature shown also includes information specifying how and whether to display information related to the feature, e.g., by the UI 1114. For example, display information may indicate whether to hide or collapse some or all of the displayable information for the feature 1310, as shown.

Further information related to one embodiment of the UI 1114 is presented below with reference to FIG. 14.

Figure 14:
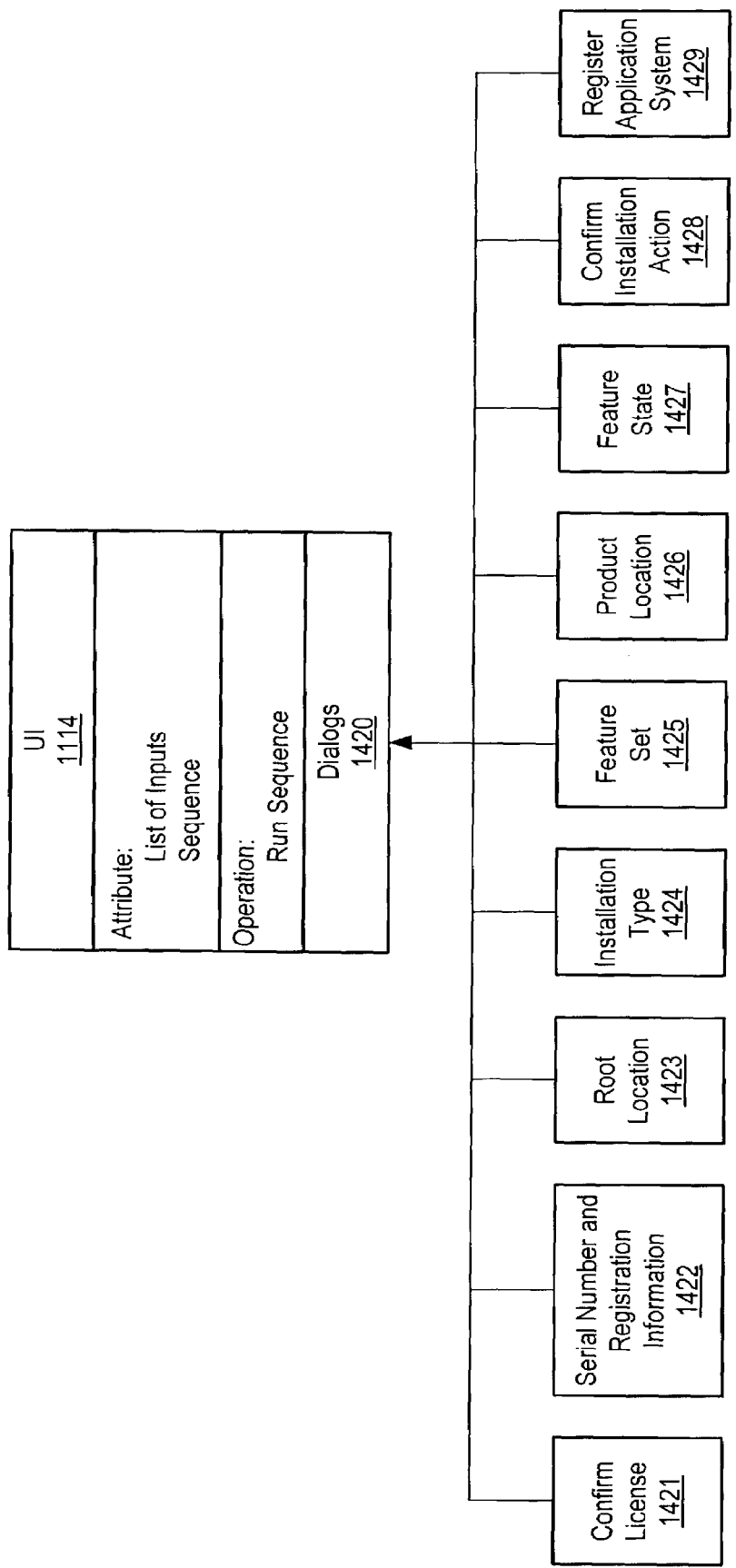
FIG. 14 is a block diagram of a user interface for the installer manager, according to one embodiment.

FIG. 14—User Interface

FIG. 14 is a high level block diagram illustrating an example UI 1114 for the installer manager 1109, according to one embodiment. In different embodiments, the UI 1114 may be included in the installer manager 1109, or may be included in the application system installer 1120 as a separate component which may be invoked by the installer manager 1109. The UI 1114 may thus provide an interface for the user to interact with the installer manager 1109 to specify and/or control the installation/deployment of the application system. As with FIG. 13, described above, the embodiment shown is exemplary only, and is not intended to limit the architecture, functionality, or form to any particular type.

As FIG. 14 shows, in this embodiment, the UI 1114 may include, or may utilize or invoke, a plurality of dialogs 1420 (or their equivalent), through which the installer manager 1109 may manage the acquisition of user inputs specifying and/or controlling the installation/deployment process. For example, in one embodiment, each dialog 1420 may correspond to an input, e.g., a particular datum or set of data, related to the deployment of the application system. In one embodiment, the UI 1114 may also include an input sequence, e.g., an order in which the various inputs are to be received from the user, e.g., the order in which the dialogs 1420 may be presented to the user. Thus, as FIG. 14 indicates, the UI 1114 may be operable to run or execute the sequence to acquire the user inputs needed to deploy the application system.

As FIG. 14 also shows, the plurality of dialogs 1420 may be operable to prompt the user for respective inputs. In other words, there may be specific dialogs for different inputs related to the application system deployment process. For example, the dialogs may include, but are not limited to, a confirm license dialog 1421 which may present a license agreement to the user and receive user input indicating acceptance or rejection of the agreement; a serial number and registration information dialog 1422 for receiving and/or confirming the serial number and registration information (e.g., user or company name, etc.) for the application system; a root location dialog 1423 for specifying a top level installation directory for the application system; an installation type dialog 1424 for specifying high level installation options, e.g., allowing the user to select between "Typical", "Complete", or "Custom", as is common in the art; a feature set dialog 1425, possibly contingent on selection of the Custom installation option, which may present a feature list to the user whereby the user may specify particular features to install, update, or remove; a product location dialog 1426 for specifying, e.g., relative to the root location, an installation directory for a specified product, e.g., LabVIEW or TestStand; a feature state dialog 1427 for presenting and specifying or modifying current and desired states of respective features, such as, for example, absent, installed, or installed but older version, etc.; a confirm installation action dialog 1428 which may be displayed to the user after the installation has been specified, and which presents the specified installation, e.g., features to be installed, updated, or removed, and requests confirmation from the user before proceeding with the specified installation; and a register application system dialog 1429 allowing the user to register the application system, e.g., via online registration.

Thus, the UI may include a variety of dialogs 1420 for presenting and receiving information related to the application system deployment/installation. In one embodiment, the UI (or the installer manager 1109) may provide default values for at least a portion of the inputs. As indicated above, the display of some of the dialogs 1420 may be contingent upon various parameters of the system, such as, for example, received user input from other dialogs, e.g., the feature set dialog 1425 being contingent upon user selection of the custom installation option of the installation type dialog 1424.

It is noted that some of the dialogs may have associated functionality, e.g., as part of the UI 1114 and/or the installer manager 1109, in addition to, or instead of, receiving user input. For example, the feature set dialog 1425 may be associated with (and may interact with) program functions which may programmatically analyze the target system 1202 and the application system dependency file 1110 to determine an initial feature list to display to the user. In doing so, the feature states of at least a portion of the features may be determined and/or set. In one embodiment, the feature states of each feature may be indicated, e.g., graphically or otherwise, in the feature set dialog 1425. In other embodiment, the feature states may be presented and/or modified via the feature state dialog 1428 for each feature. In yet another embodiment, the user may right-click on a feature to access that feature's state. Additionally, once the feature set dialog 1425 has received user input selecting or modifying the state of various features, the target system 1202, the application system dependency file 1110, and the user input may be programmatically analyzed to determine an updated feature list, which may then be displayed to the user.

In addition to determining current states of the selected features, the analysis may also determine desired states of the features. For example, if a particular feature is determined to already be installed on the target system, but is an older version than that included in the distribution, and the user has specified that an update is desired, e.g., via the feature state dialog 1428 for that feature, then the current state may be "installed but older version", while the desired state may be "installed". The two states may then be compared (programmatically analyzed) to determine an install mode for the feature. For example, the install modes may include "install", indicating that a new install or an upgrade is to be performed, "uninstall", indicating that the feature (or product) is to be uninstalled, and "maintenance", indicating that an interface, e.g., a dialog or other means is to be displayed allowing the user to add/remove features. The install mode may thus indicate an installation action, e.g., removing the old version of the feature and installing the distribution version. This process may be performed for each of the features, resulting in a list of actions, which, upon confirmation by the user, e.g., via the confirm installation action dialog 1428, may be executed to deploy the application system to the target system. Thus, in one embodiment, as a consequence of the above analyses, a list of actions may be determined whose execution deploys the application system to the target system.

Of course, as noted above, based on the analysis and/or user input, "deploying" may include any or all of installing, updating, or uninstalling some or all of the application system features or software components. In one embodiment, prior to, during, or after the deployment of the application system to the target system, the UI 1114 may allow the user to register the deployed application system, e.g., via the register application system dialog 1429, as indicated above. The dialog 1429 may provide a number of registration options to the user, including, for example, printing a registration document which may then be mailed to register the application system, or registering the application system over a network, e.g., the Internet.

It should be noted that the above dialogs are meant to be exemplary only, and that in various embodiments, the actual dialogs used may differ substantially from the examples given. For example, the functionality of two or more of the dialogs may be implemented as a single dialog, or, functionality of one of the dialogs may be implemented in two or more dialogs, and so on. It is further noted that in other embodiments, other means besides dialogs may be used to the same end. For example, a series of menus may be used to specify and implement the deployment process. As another example, a large configuration panel may be presented to the user whereby all of the above user inputs may be received. Thus, any interface means are contemplated for use in specifying and implementing the deployment process for the application system.

Figure 15:
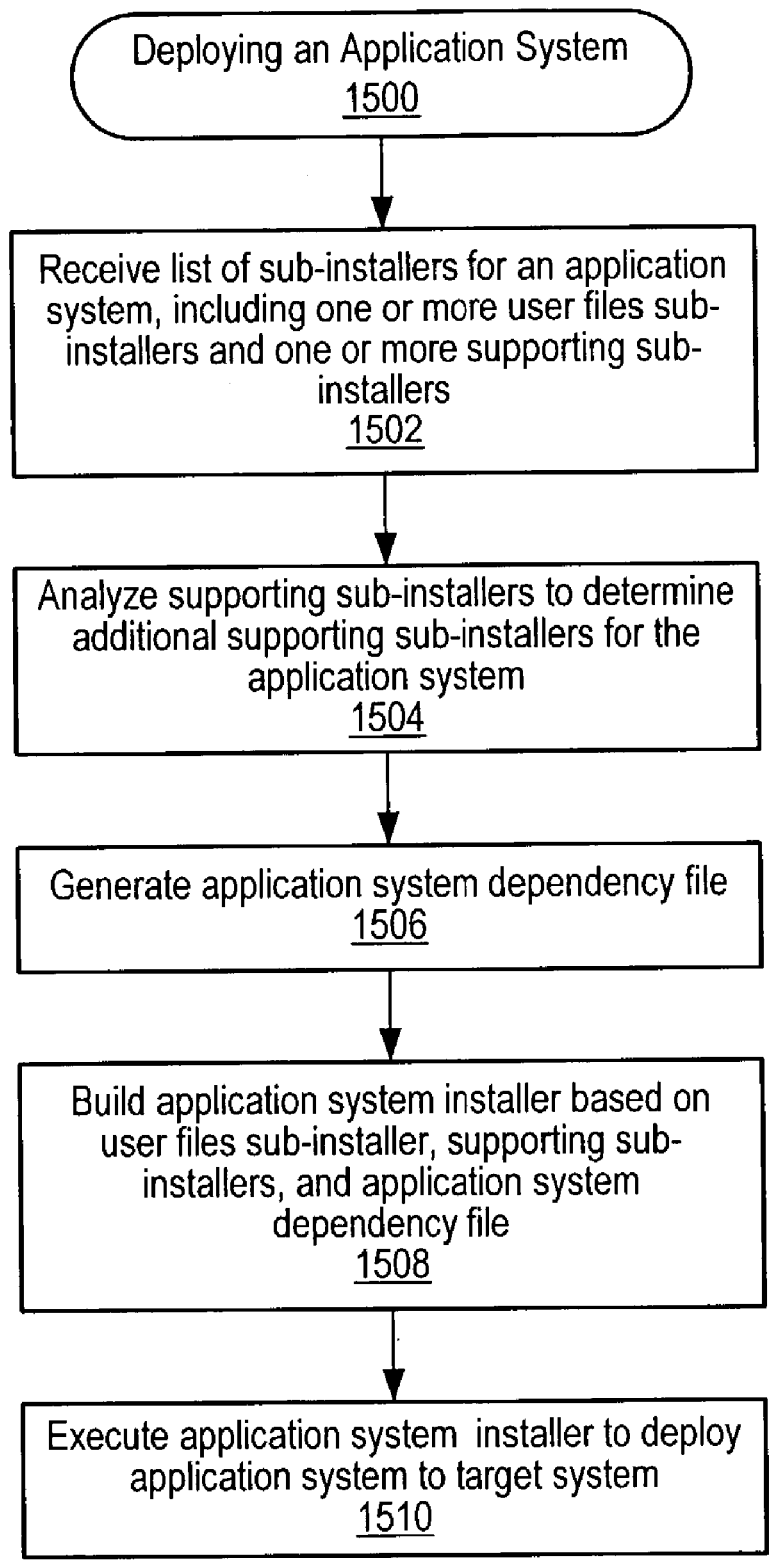
FIG. 15 flowcharts a method for deploying an application system using an application system installer, according to one embodiment.

FIG. 15—Creating An Application System Installer From Sub-Installers

FIG. 15 flowcharts one embodiment of a method for creating an application system installer from a plurality of sub-installers, where the application system installer is operable to programmatically deploy an application system onto a target system, e.g., a target computer and possibly one or more devices or boards included in or coupled to the target computer. It should be noted that in various embodiments, some of the steps described may be performed concurrently, in a different order than shown, or may be omitted. Additional steps may also be performed as desired.

As FIG. 15 shows, in 1502, a list may be received indicating an initial set of sub-installers, where each sub-installer includes one or more software components and installation software operable to deploy the one or more software components onto the target system. The initial set of sub-installers preferably includes one or more user-files sub-installers and one or more supporting sub-installers, as described in detail above. In one embodiment, a manifest of the application system may be received, where the manifest includes the list of the initial set of sub-installers, as also described in detail above.

In 1504, at least one of the initial set of sub-installers may be programmatically analyzed to determine one or more additional sub-installers. For example, dependency information for the at least one of the initial set of sub-installers may be programmatically analyzed to determine the one or more additional sub-installers. In one embodiment, the dependency information for the at least one of the initial set of sub-installers may be included in the respective sub-installer. Alternatively, in another embodiment, the dependency information for the at least one of the initial set of sub-installers may be included in a dependency database. Thus, in various embodiments, the dependency information for each of the sub-installers may be part of the sub-installer, or may be stored and accessed in a dependency database (or both).

In one embodiment, programmatically analyzing dependency information for the at least one of the initial set of sub-installers to determine the one or more additional sub-installers may include walking a dependency hierarchy for the at least one of the initial set of sub-installers to determine the one or more additional sub-installers. In other words, the method may analyze each of the sub-installers to determine further sub-installers, then analyze each of the further sub-installers, and so on, until all of the sub-installers for the application system have been determined. The initial set of sub-installers and the one or more additional sub-installers may comprise a plurality of sub-installers.

In 1506, an application system dependency file 1110 (or its equivalent) may be generated based on the analysis of 1504. Said another way, the collective dependencies of all of the sub-installers may be collected or consolidated into a substantially comprehensive set of dependencies for the application system. In one embodiment, the one or more software components for at least a subset of the plurality of sub-installers may include one or more features. In this embodiment, the dependency information may include sub-installer dependencies and/or feature dependencies. Thus, generating an application system dependency file based on said analyzing may include determining the sub-installer dependencies and the feature dependencies for each of the at least a subset of the plurality of sub-installers, and storing the determined sub-installer dependencies and feature dependencies in the application system dependency file. In another embodiment, the dependency information may also include other information, including, for example, one or more of: version information for each sub-installer, and compatibility information for each sub-installer. For example, in some cases, compatible versions of various of the sub-installers may be required for the corresponding software components to operate together correctly. As another example, it may be the case that certain sub-installers, or their respective software components, are mutually exclusive, i.e., one of the sub-installers or software components may not operate correctly if the other sub-installer or software components are installed on the system. Thus, the sub-installer and feature dependencies, as well as compatibility constraints and/or exclusions may be stored in the application system dependency file 1110.

As indicated in 1508, once the application system dependencies have been determined, e.g., in the form of the application system dependency file 1110, an application system installer 1120 may be generated based on the plurality of sub-installers and the application system dependency file 1110, where the application system installer may be operable to programmatically deploy the application system onto the target system. In one embodiment, generating an application system installer based on the plurality of sub-installers and the application system dependency file may include combining the installer manager program 1109, described above, with the plurality of sub-installers and the application system dependency file to generate the application system installer.

In an embodiment where the respective deployers also determine supporting sub-installers, then the application system installer 1120 may be programmatically generated based on the determined files to install and the determined supporting sub-installers indicated in the manifest. In one embodiment, this may be accomplished in two steps. First, the list of files to install indicated in the manifest may be analyzed, and the component distribution service may create one or more sub-installers for these files. Second, the list of sub-installers indicated in the manifest and the newly generated sub-installer may be analyzed by the distribution build service to create the application system installer.

In one embodiment, the installer manager 1109 may be configured, where configuring the installer manager 1109 includes generating an installer manager configuration file. In various embodiments, this configuration may be performed prior to, during, or after the generation of the application system installer 1120. In one embodiment, the installer manager program may include the installer manager configuration file. In another embodiment, the installer manager configuration file may be included in the application system installer 1120 as a separate component, i.e., may not be included in the installer manager program 1109. The installer manager configuration file may be used to specify various aspects of the installer manager 1109, such as, for example, which UI 11114 to invoke when the end user deploys the application system, and so forth. In one embodiment, the installer manager 1109 may be pre-configured, e.g., the installer manager configuration file may already be generated or determined, e.g., with default values, and so further configuration may not be required.

Finally, once the application system installer 1120 has been generated (and optionally configured), the application system installer 1120 may be executed to programmatically deploy the application system onto the target system. For example, once the application system installer 1120 has been generated, it may be provided to an end user, who may then execute the application system installer 1120 to deploy the application system. The application system installer 1120 may be provided to the end user in any of a variety of ways. For example, the application system installer 1120 may be stored (burned) on a CD (compact disc) and mailed (or otherwise delivered) to the end user. Alternatively, the application system installer 1120 may be delivered to a computer system over a network, e.g., the Internet. For example, the end user may access a server computer 106 over the network 204 and may download the application system installer 1120 to a client computer system, i.e., the target computer system. In one embodiment, the server 106 may comprise an e-commerce system, and may be operable to receive payment information from the end user, or an associate of the end user, such as credit card information or a billing account. Once payment is received or determined, then the application system installer 1120 may be provided by any available means, as desired.

Further details of the actual deployment/installation process, e.g., step 1510, are provided below with reference to FIG. 16.

Figure 16:
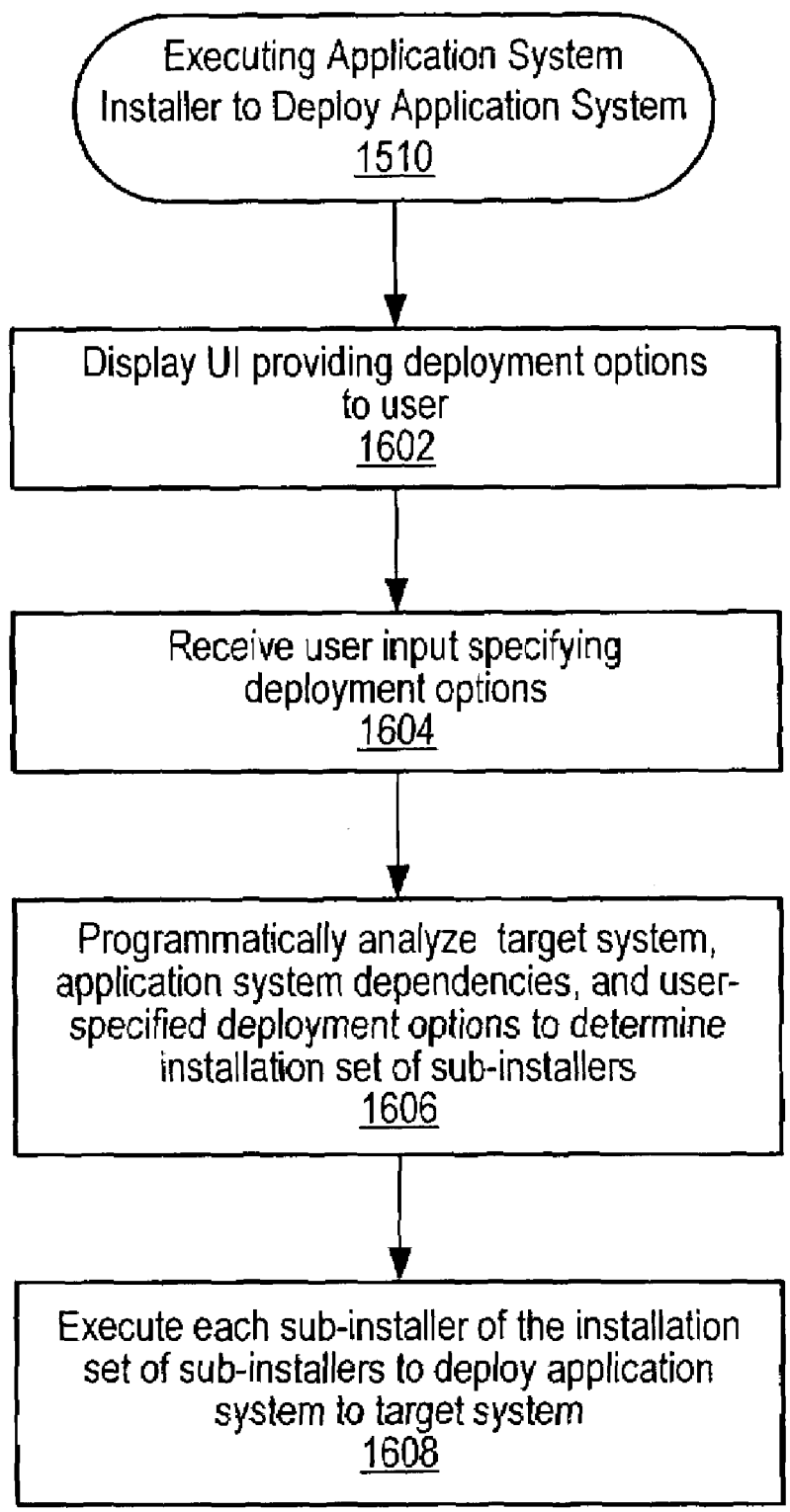
FIG. 16 flowcharts execution of an application system installer to deploy an application system to a target system, according to one embodiment.

FIG. 16—Executing the Application System Installer To Deploy the Application System FIG. 16 flowcharts one embodiment of a method for programmatically deploying the application system to a target system 1202 using the application system installer 1120, i.e., by executing the application system installer 1120. As noted above, in various embodiments, some of the steps described may be performed concurrently, in a different order than shown, or may be omitted. Additional steps may also be performed as desired.

As FIG. 16 shows, in 1602, a user interface (UI) may optionally be displayed to a user, e.g., the end user mentioned above with reference to FIG. 15. In other words, executing the application system installer 1110 may include presenting a UI 1114 to the user. In a preferred embodiment, the UI 1114 comprises a graphical user interface GUI. Various embodiments of the UI 1114 are described above with reference to FIGS. 6A and 6B, as well as FIG. 14, although the embodiments described are exemplary only, and are not intended to limit the UI 1114 to any particular form or functionality.

As described above, the UI 1114 may provide a plurality of deployment options to the user. The deployment options may be as simple as proceed/cancel options, or may provide substantial flexibility as to the deployment process. For example, as shown in FIG. 6A, the UI 1114 may be an installation wizard that may lead the user through the deployment process, including specifying, controlling, and/or monitoring the process. Thus, a plurality of deployment options may be provided to the user, where the deployment options may be used to programmatically deploy the application system to the target system 1202.

As indicated in 1604, in an embodiment where deployment options are presented to the user, user input may be received specifying one or more of the deployment options. For example, as described above with reference to FIG. 14, a plurality of dialogs 1420 may prompt the user for respective inputs, where respective dialogs may be presented for inputs related to the application system deployment process, including, for example, one or more of: a confirm license dialog 1421 which may present a license agreement to the user and receive user input indicating acceptance or rejection of the agreement; a serial number and registration information dialog 1422 for receiving and/or confirming the serial number and registration information (e.g., user or company name, etc.) for the application system; a root location dialog 1423 for specifying a top level installation directory for the application system; an installation type dialog 1424 for specifying high level installation options, e.g., allowing the user to select between "Typical", "Complete", or "Custom", as is common in the art; a feature set dialog 1425, possibly contingent on selection of the Custom installation option, which may present a feature list to the user whereby the user may specify particular features to install, update, or remove; a product location dialog 1426 for specifying, e.g., relative to the root location, an installation directory for a specified product, e.g., LabVIEW or TestStand; a feature state dialog 1427 for presenting and specifying or modifying current and desired states of respective features, such as, for example, absent, installed, or installed but older version, etc.; and a confirm installation action dialog 1428 which may be displayed to the user after the installation has been specified, and which presents the specified installation, e.g., features to be installed, updated, or removed, and requests confirmation from the user before proceeding with the specified installation.

Thus, in one embodiment, presenting a plurality of deployment options to the user may include displaying a feature list to the user, e.g., via the feature set dialog 1425, where the feature list includes a plurality of selectable, e.g., available, features for the application system. In this embodiment, user input may be received (e.g., by the dialog 1425) specifying one or more of the plurality of selectable features for the application system. In one embodiment, the feature list may change depending upon the user input. For example, based on feature dependencies stored in the application system dependency file 1110, user selection of a first feature may preclude another feature, and so the excluded feature may be removed from the list. As another example, in one embodiment, if the user has selected a deployment option indicating a typical installation, then the feature list may not be presented at all. In yet another embodiment, user selection of a typical, or complete, installation may cause a feature list corresponding to the selection to be displayed, after which the user may modify the list as desired. In other words, the user may be allowed to start with a given, pre-defined feature list, and then may add or remove features as desired.

As 1606 indicates, executing the application system installer to programmatically deploy the application system onto the target system may include programmatically analyzing the target system and application system dependencies, e.g., the application system dependency file 1110, to determine an installation set of sub-installers, where the installation set of sub-installers includes at least a subset of the plurality of sub-installers. As used herein the term "installation set of sub-installers" refers to those sub-installers that are collectively operable to deploy the version of the application system desired and/or specified by the user. For example, if the user specified a typical install, then the installation set would include any sub-installers required to install the typical version of the application system, and so on.

As described above with reference to FIG. 14, the determination of the installation set of sub-installers may involve not only the programmatic analysis of the target system and application system dependencies, but may also include programmatic analysis of the user specified deployment options, e.g., such as those described above in 1604. In other words, determining the installation set of sub-installers may include programmatically analyzing the target system, the application system dependency file, and the specified one or more deployment options. For example, if the method determines that a feature, i.e., a set of software components, of the application system already exists in the target system, but the set of software components (the feature) is an older version than that of the distribution, then if the user has selected a deployment option specifying an update or upgrade for that feature, the method may remove the old version from the target system and install the new version, or may simply install the new version over the old version. As another example, if the user has specified that the feature is not desired in the deployment, then if the feature is determined to already be installed, the feature (the software components related to the feature) may be removed, e.g., uninstalled.

In one embodiment, programmatically analyzing the target system and the application system dependency file (an optionally, the user selected deployment options) to determine an installation set of sub-installers may also include determining an execution order of the installation set of sub-installers based on the analysis. In a preferred embodiment, the order of sub-installers to be executed is a "bottom up" order, where the lowest sub-installers in the application system dependency chain or hierarchy are executed first, followed by those that directly depend on them, i.e., followed by the next lowest sub-installers in the dependency hierarchy, and so on.

Finally, in 1608, each sub-installer in the determined installation set of sub-installers may be executed to deploy the respective software components of the installation set of sub-installers to the target system, e.g., to deploy the application system to the target system. In an embodiment where the execution order was determined, the sub-installers may be executed in accordance with the determined execution order, e.g., in a bottom up order.

As noted above, executing the application system installer to programmatically deploy the application system onto the target system may include one or more of: deploying software components of the application system onto the target system, removing or uninstalling software components of the application system from the target system, and updating software components of the application system on the target system. Said another way, in one embodiment, executing the application system installer to programmatically deploy the application system onto the target system may include executing the application system installer to programmatically update a prior installation of the application system on the target system. In another embodiment, the method may include executing the application system installer to programmatically remove all, or a portion of, a prior installation of the application system on the target system.

As noted above with reference to FIG. 9, in one embodiment, the target system may include a target computer and at least one device coupled to or included in the target computer. Thus, programmatically deploying the application system onto the target system may include one or more of:

programmatically deploying one or more programs onto the target computer, wherein the target computer is operable to execute the one or more programs to perform at least a portion of the function;

programmatically deploying at least one program onto the at least one device, wherein the at least one device is operable to execute the at least one program to perform at least another portion of the function;

programmatically configuring target computer hardware and/or the at least one device's hardware in accordance with one or more hardware configuration files; and programmatically configuring a program on the target computer and/or a program on the at least one device in accordance with one or more program configuration files.

Thus, deploying the application system to a target system using the application system installer may include deploying programs to various hardware devices, including the target computer, as well as configuring one or more programs and/or hardware devices. For example, in an embodiment where the hardware device includes an FPGA or other type of programmable hardware, the method may deploy a hardware configuration file, e.g., a netlist, etc., onto the FPGA, thereby configuring the FPGA to perform at least a portion of the functionality of the application system.

In one embodiment, once the installation is complete, a register application system dialog 1429 may be presented, e.g., by the UI 1114, allowing the user to register the application system, e.g., via online registration or mail, as described above. Of course, once the application system is deployed to the target system, the target system may operate to perform the functions implemented in or by the application system.

Thus, various embodiments of the above systems and methods may be used to create and/or execute an application system installer to deploy an application system onto a target system. The application system installer may be executed to deploy a new installation of the application system onto the target system, to update previously installed components of the application system, and/or to remove previously installed components of the application system, as desired. It should be noted that various combinations of the methods described above are also contemplated for creating and/or executing the application system installer to deploy the application system onto the target system.

FIGS. 17–27—Example Implementation

Figure 19:
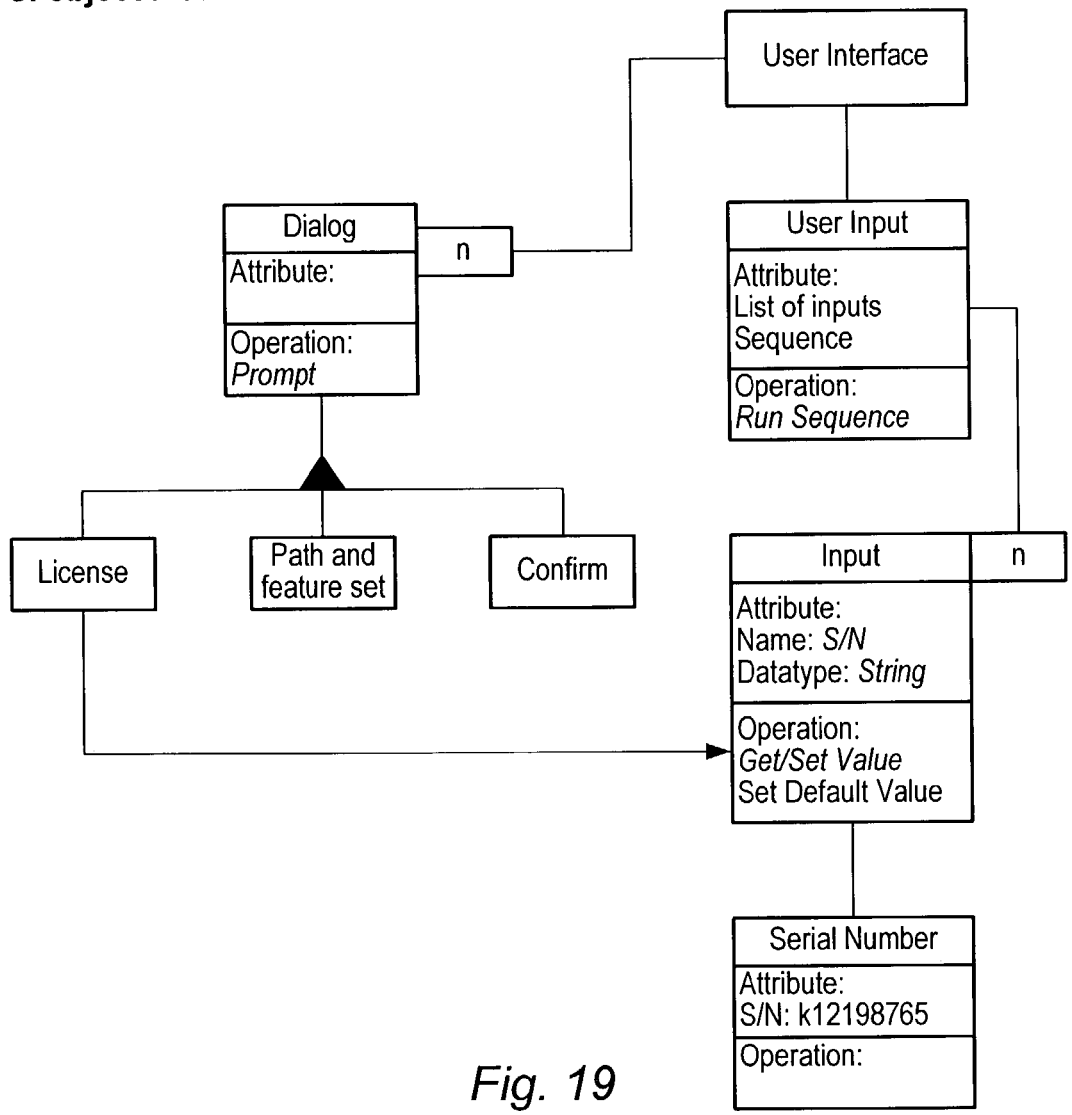
Figure 20:
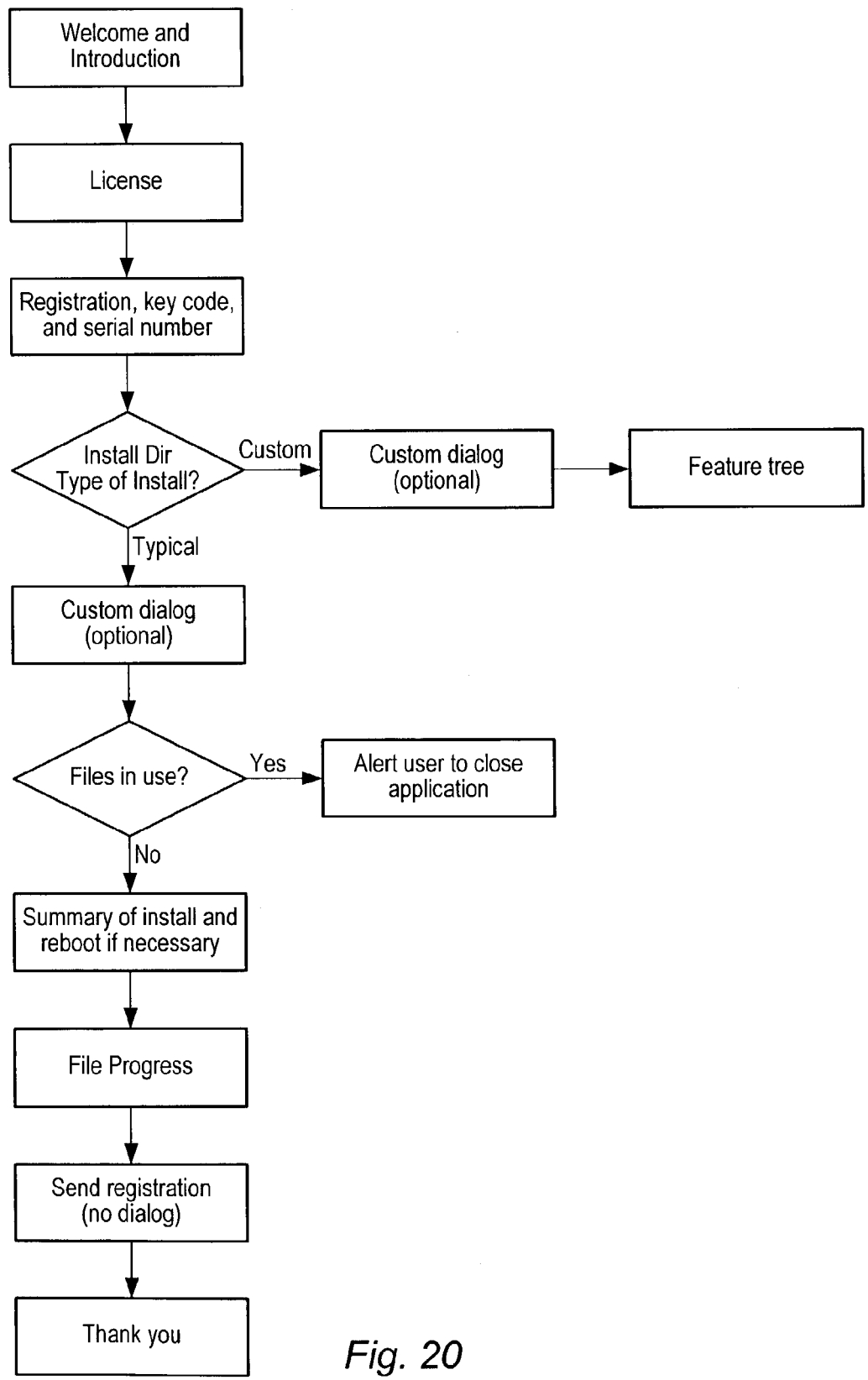
Figure 21:
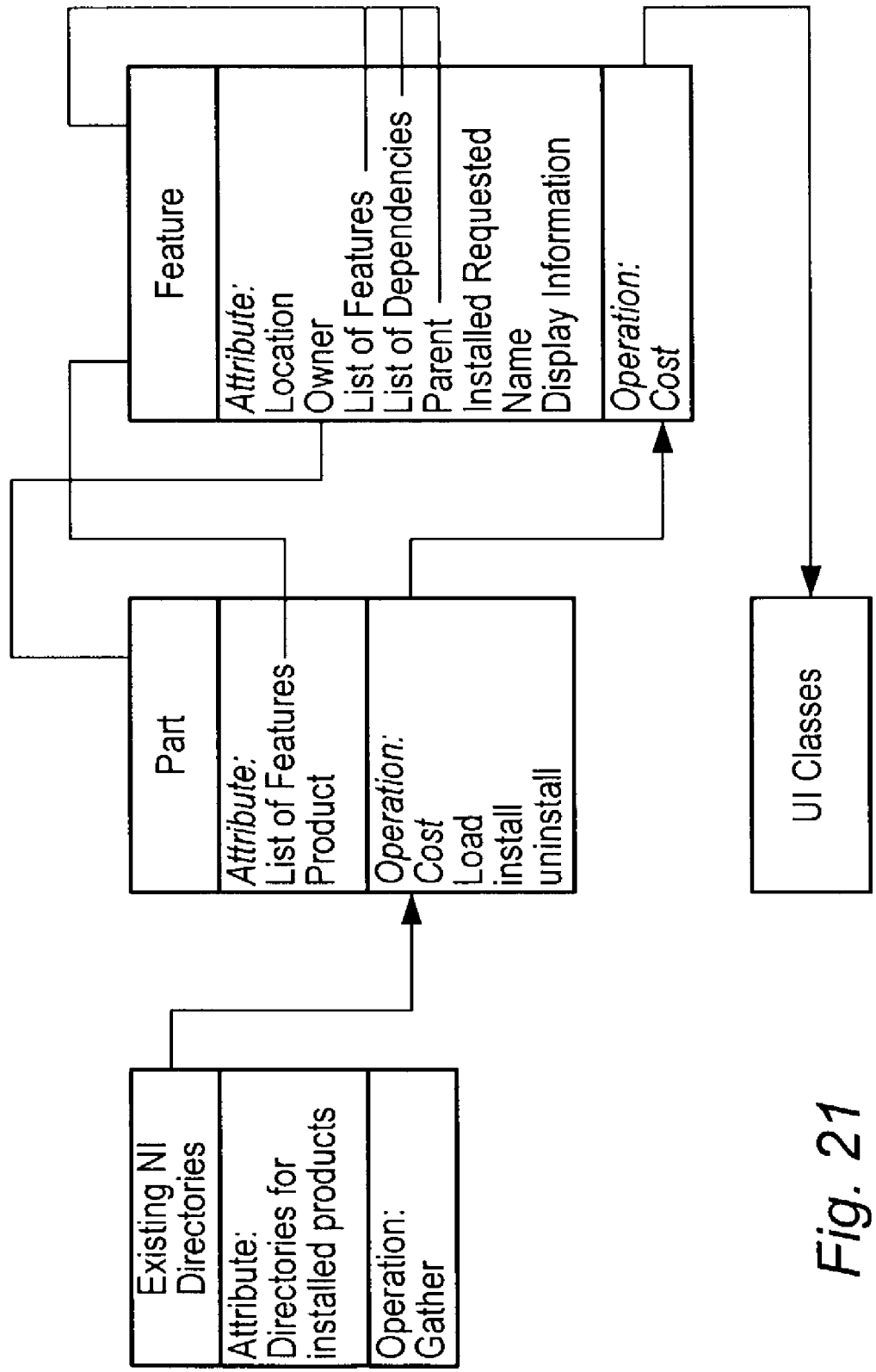
Figure 22:
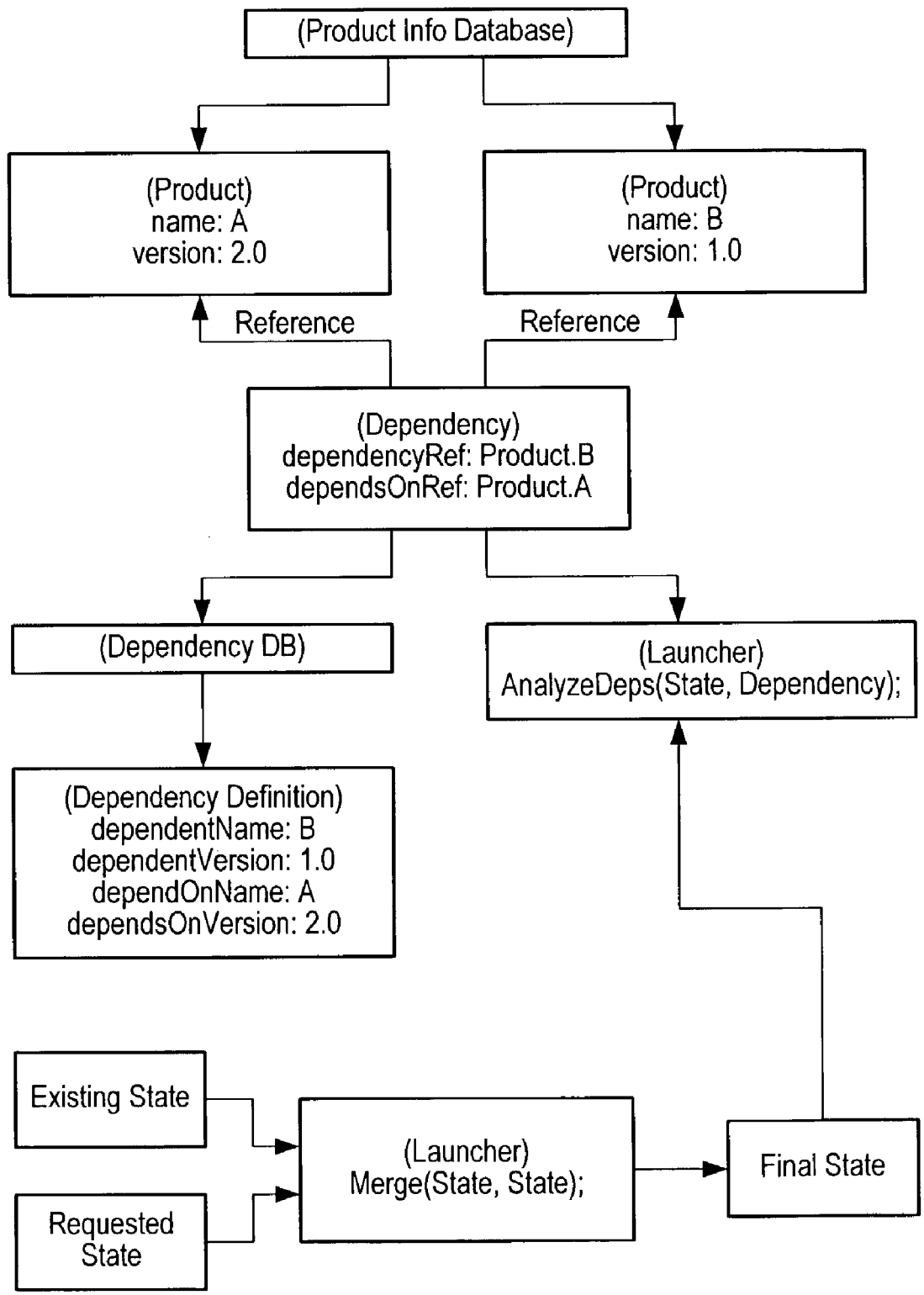
Figure 24:
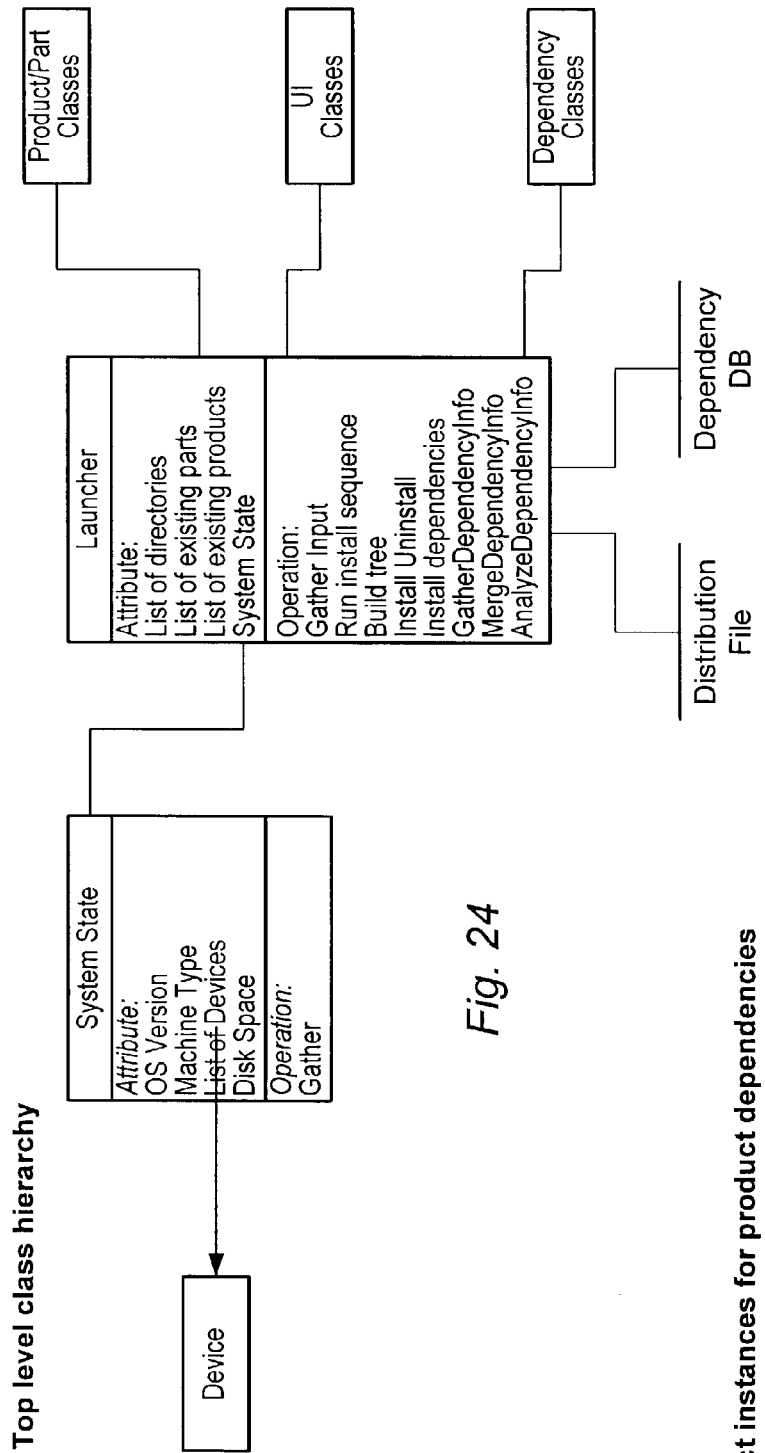
Figure 23:
Figure 25:
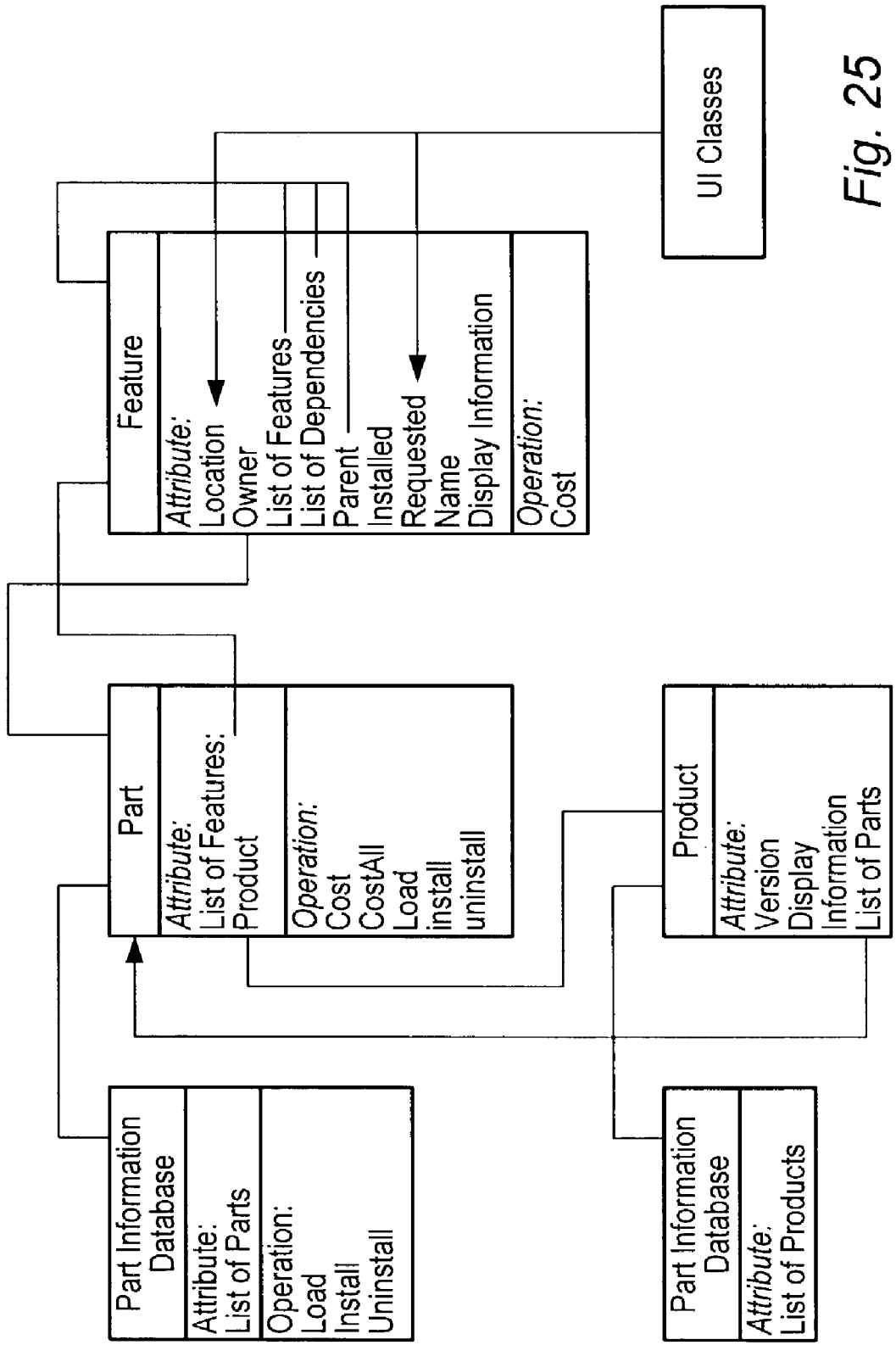
Figure 26:
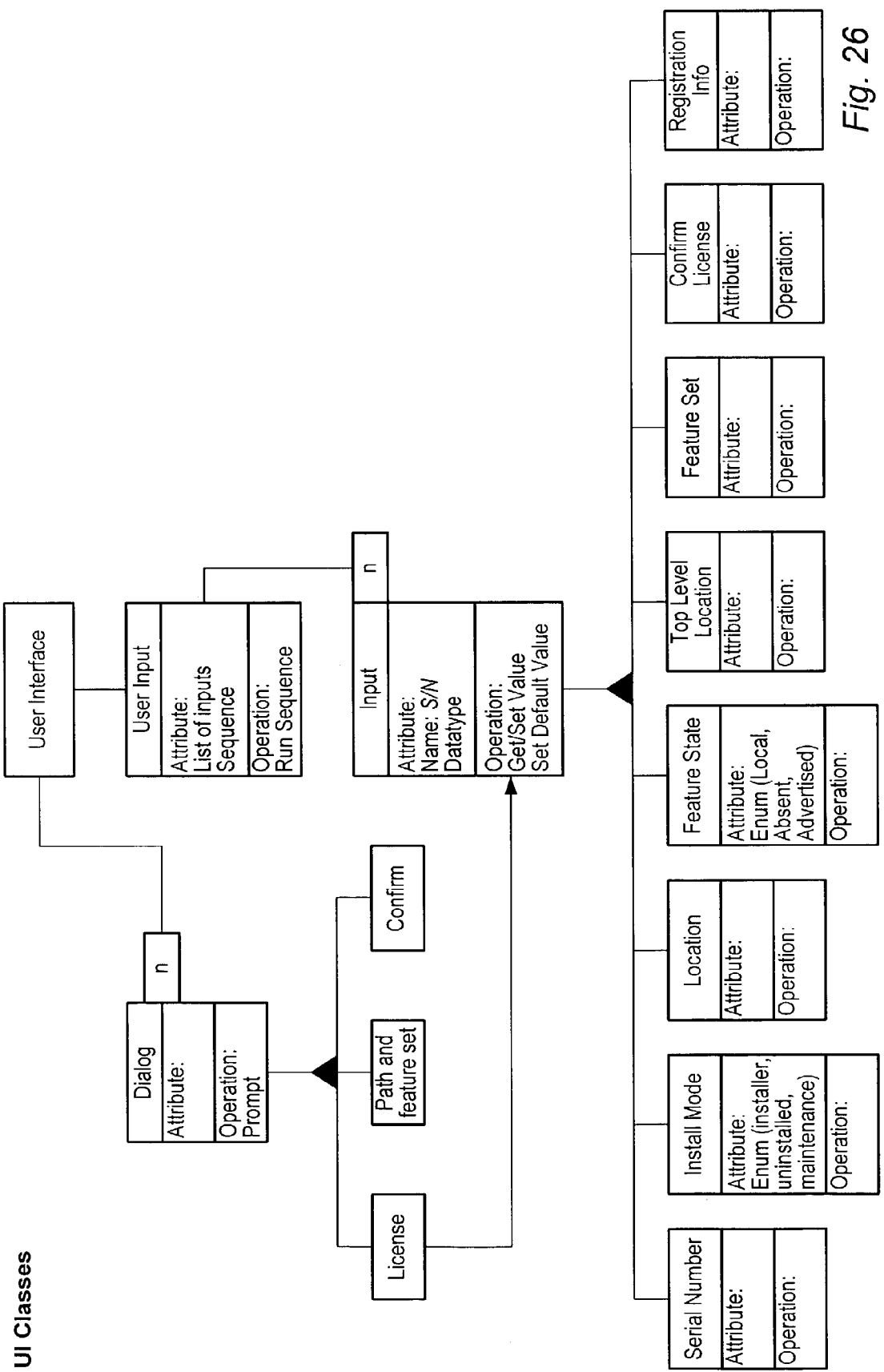
Figure 27:
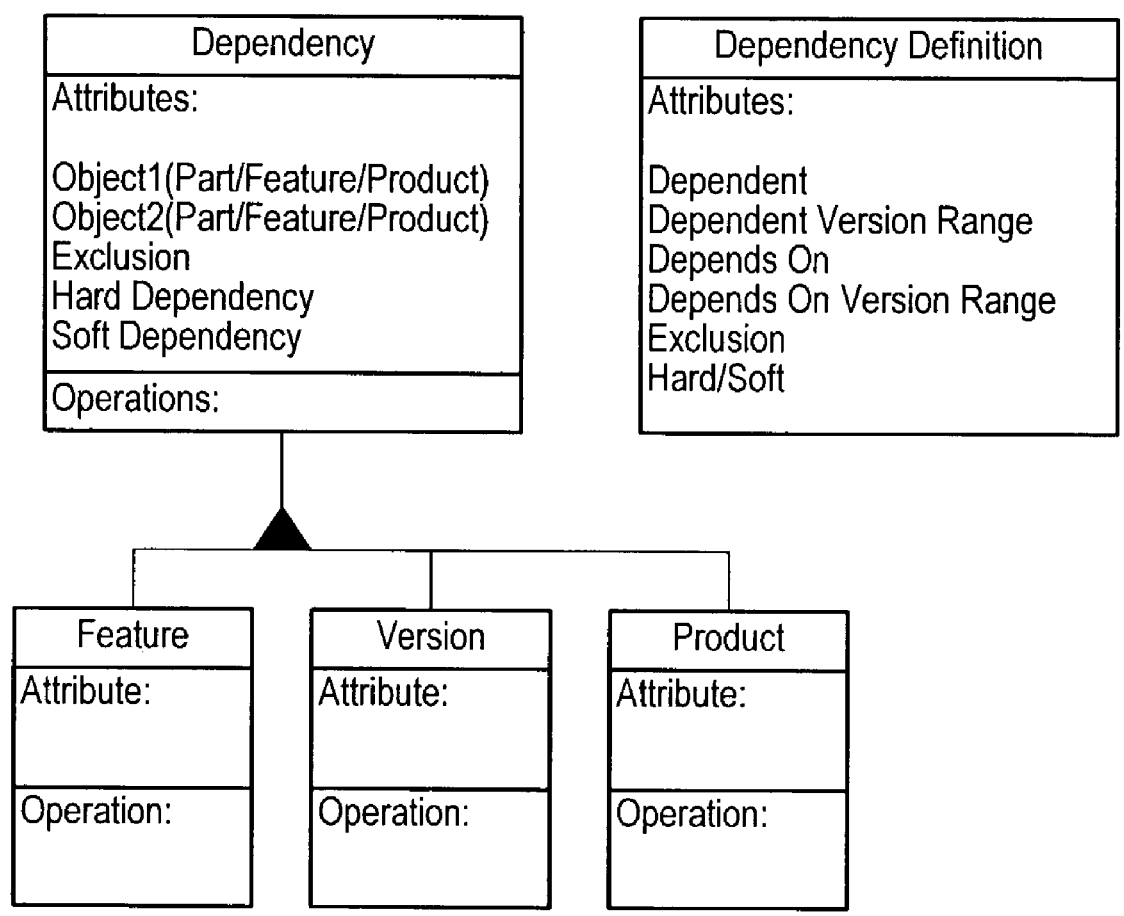

FIGS. 17–27 present an exemplary implementation of one embodiment of the systems and methods described above. More specifically, FIG. 17 illustrates one embodiment of a system state object instance; FIG. 18 illustrates one embodiment of product/part/feature object instances; FIG. 19 illustrates one embodiment of UI object instances; FIG. 20 flowcharts one embodiment of a method for gathering input; FIG. 21 illustrates one embodiment of object instances for disk space costing; FIG. 22 illustrates one embodiment of object instances for merging dependencies; FIG. 23 illustrates one embodiment of object instances for product dependencies; FIG. 24 illustrates one embodiment of a top level class hierarchy; FIG. 25 illustrates one embodiment of product/part/feature classes; FIG. 26 illustrates one embodiment of UI classes; and FIG. 27 illustrates one embodiment of dependency classes.

In the description that follows, the following terms and definitions apply. It is noted that in the following description, the term "part" is used to refer to one embodiment of a sub-installer, as described above. A detailed description of this implementation is provided below in the section titled Installer Launcher Analysis.

Glossary

Dependency—A version of a feature requires a specific version of another feature in order to operate properly. Dependency is further characterized by whether it is a hard or soft dependency.

Distribution—The entire software contents delivered to a customer, but installs as if it were one product. This may include one or more products and be delivered via CD or the Internet. For example, the LabVIEW CD distribution contains DAQ, VISA, IVI, IMAQ, Motion, DataSocket, and NI Reports, in addition to the LabVIEW application.

Distribution Family—A collection of distributions with related attributes and settings. For example, the LabVIEW distribution family would be a collection of the Base, FDS, and PDS distributions.

Exclusion—An anti-dependency; or a explicit statement that two features will not work together. Exclusions usually occur because of changes in interfaces or behavior that cause a specific version of a feature to no longer work with a specific version of another feature.

Feature—The smallest user selectable option in an installation. Distributions represent products that contain parts that have features. At installation time, the user has control down to the feature level of what the distribution will install.

Flavor—A particular instance of a distribution inside the distribution family. For example, PDS is a flavor of the LabVIEW distribution family.

Groups—An internal collection of reusable and indivisible files in the installation. These groups are characterized by common versioning and file locations and would never be separated. During installer development, the developer maps groups to features.

Hard Dependency—A feature must have another feature present in order to operate correctly. If the dependent feature is removed, the main feature will no longer work. This is related, but different than a soft dependency.

Installable—Any file, registry entry, or shortcut that is placed on the target machine. An Installable is placed in groups that users select by choosing features in a part that is a member of a distribution.

MSI—Another term for the "Microsoft Windows Installer Technology". It is Microsoft's installation and configuration service that is available for all Windows9x/NT/2000 based operating systems. This technology defines the format and interaction of an installer with the operating system.

Part—The smallest unit the installer needs to track by version or the largest grouping of features that is not considered divisible. The existence of a part may be required to install a portion of an application with other products. Parts contain features. For example, the LabVIEW FDS distribution would contain parts representing the following: the core LabVIEW, LabVIEW advanced analysis, core DAQ, LabVIEW DAQ, VISA, IVI, GPIB, DataSocket and others.

Product—A designation of what features are grouped into a sellable unit. This unit is often equivalent to the distribution, but the distribution may contain multiple products. The LabVIEW FDS distribution contains the LabVIEW FDS product, the DAQ product, the GPIB product, and others.

Soft Dependency—A feature will be enhanced if another feature is present. This feature will be crippled if the soft dependent feature is removed. The feature will work without the other. For example, LabVIEW has a soft dependency on DAQ.

The primary components of the implementation described below include:

The Part and Part Database

A part is the smallest unit the installer needs to track versions. A product may be distributed as one part or a series of parts. A part may contain features and may not be visible to the installer user. For example, DataSocket is one part and probably will have only one feature, while LabVIEW could be more than 5 parts. Each part is developed as an independent MSI installer whose installation is managed by the Installer Launcher.

Each part created is stored in a database of parts that the Build Installer Tool and the Build Distribution Tool use to create a product distribution.

Dependency Database

Once a product has been broken into parts, the relationship between these parts is tracked through the dependency database. This database contains a listing of dependent parts, their features, and the versions needed when selected for installation. These relationships also map exclusions that will indicate if two parts are incompatible. The central database is managed at National Instruments and images of it are sent with a product at the time of release. At installation time, the database is used to determine which components are needed or in conflict with the target system.

Build Installer Tool

The first step to creating an installer is to divide the product into parts and create each part. The Build Installer Tool allows the developer to build parts by selecting the files needed, associate them with features; implement installation logic, and create MSI packages. This tool interacts with the Parts Database and allows the developer to define dependencies for their part. This tool is designed to strictly enforce installation standards needed to increase consistency and reduce installation problems.

Build Distribution Tool

A distribution is the sum of all the software National Instruments delivers on CD to the customer. This often includes parts from multiple teams. The Build Distribution Tool gathers all the parts needed for the distribution, produces an image of the dependency database, and collects common installer files and the Installer Launcher. These components are gathered and prepared into a media ready image.

Installer Launcher

All National Instruments software will use the Installer Launcher. This software is distributed to the user with the product and manages installation and relationship between the parts. This application will be common across all National Instruments products and offers both maintenance and uninstall modes. This application serves to interrogate the user machine and verify its contents against the information in the distribution and the information stored in the dependency database.

Shared Information Storage

Throughout the development process, the Shared Information Storage provides developers with access to common files (like license agreements) and saved projects.

Other Features

While not explicitly stated, each of these tools will support the localization of the installer and installation of localized products. Additionally, the tools include testing and verification features. The presented implementation is a Windows only solution, but the same approach could be extended to other platforms. Every effort has been made to isolate platform specific functionality.

Installer Launcher Analysis

The following is an object-oriented analysis of the composition and behaviors of the installer launcher henceforth known as just the launcher. The launcher is intended to be used to install all NI applications. It gathers the state of the target system, gathers input from the user and based on these inputs, sets up and launches the required part installers to perform product installation. The part installers are referenced from a single distribution file and can be used to install either a single NI product or multiple NI products at the same time. The distribution file is created by a separate set of build tools to be described in another document.

This analysis first presents a narrative of the main actions of the launcher along with object instance diagrams and then presents a set of class diagrams that describe the composition of the launcher. Finally a class dictionary is provided which lists out the classes identified.

Narrative of Installer Actions

Steps in launcher

1. Gather OS and machine information—OS version, language, free disk space, standard folder locations, etc.
2. Get NI Information—currently installed NI hardware and software, including versions and locations
3. Gather per part information and build into parts database—In this step information about the part installers included in the distribution is loaded into memory.
4. Generate dependency information—Information about the dependency between our products will be stored in 'dependency database' that will be shipped along with every distribution that we ship. This database will be installed on the user's system and updated by any future installations made on the system. In this step the database information is loaded into memory.
5. Get input—Using the information gathered in steps 3 and 4, the launcher will present the parts available for installation to the user. The user will be able to select the features that they want to be installed, updated or removed.

The user can also select other configuration information pertaining to the features, such as installation location.

6. Determine what must be installed—This decision is made based on features the user requested, what parts are already on the system and the dependency between features, parts and products.
7. Install Parts—The launcher launches the part installers to perform the installation of the features selected for installation in step 6.

Details of Step 5. Gather Input

This sections details the input gathering action of the launcher. The steps are not listed in the order of execution.

5.1 Ask user where he wants to install high-level location and offer a default location. All parts will use this folder as the default location under which products will be installed in separate folders.

5.2 Ask user which feature set they want to install—the available choices will be 'Typical', 'Complete' and 'Custom'.

5.3 Ask user to confirm license agreement 5.4 Ask user for registration and serial number. Some processing of the serial number may be done as soon as the user selects the 'next' button. Other dialogs may be displayed or skipped based on the serial number. We may also choose different feature sets to be installed based on the serial number.

5.5 If user selected the custom feature set,
Ask what features to install
Location of features and offer default 5.6 Ask user to confirm install or cancel 5.7 Gather tree of features from the part info database using the feature set and build 'tree with ropes' by supplying:
System info (OS, Machine, list of cards)
NI directory and registry information
Feature set
Install mode (install, uninstall, maintenance)

5.8 Query system info for how much space is available 5.9 Query the selected parts to find disk space required by supplying:
List of common directories that could be modified by the part (VISADIR)
List of directories the user can modify 5.10 Gather and process dependency information
Get product dependencies
Get version dependencies
Get feature dependencies
Parent/child
Cross parts
Within a part
Determine order dependency Details of Step 7. Install Parts This sections details the install parts action of the launcher. The steps are not listed in the order of execution.

7.1 Confirm if user wants to install
7.2 Step through list of products
Display overall progress
Tell part what features to install/uninstall
Set directories
Install
Display individual progress
Verify result
If user cancels, rollback current, uninstall previous parts
7.3 Send registration
7.4 Reboot if necessary Thus, the parts database may be used to track product dependencies and exclusions (i.e., anti-dependencies). The installer launcher may track versions by using the data provided by parts. Each part may be developed as an independent installable unit (e.g., an MSI installer) whose installation may be managed by the installer launcher. Each part created may be stored in the parts database that the build installer tool and the build distribution tool may use to create a product distribution (e.g., on a CD).

Once a product has been broken into parts, the relationships between these parts may be tracked through the dependency database. The dependency database may include a listing of dependent parts, their features, and the versions needed when selected for installation. These relationships may also map exclusions that may indicate if two parts are incompatible. A central parts database may be managed at a remote site (e.g., the software vendor's location) and images of the central parts database may be sent with a product at the time of a release. At installation time, the parts database may be used to determine which components are needed or which components are in conflict with the target computer system.

In one embodiment, an installer launcher may be created by dividing the software product into parts and creating each part. The build installer tool may allow the user or developer to build parts by selecting the files needed, associating the files with features, implementing installation logic, and creating installer packages. The build installer tool may interact with the parts database and may allow the developer to define dependencies for any chosen part. The build installer tool may be designed to strictly enforce pre-defined installation standards, thereby increasing consistency and reducing installation problems.

The build distribution tool may gather all the parts needed for the distribution (e.g., parts from multiple teams throughout a software development organization), may produce an image of the dependency database, and may collect common installer files and the installer launcher. These components may be gathered and prepared into a media ready image (e.g., a CD).

The installer launcher may be distributed to the user with the software product and may manage installation and relationship between parts. By standardizing or making common use of the installer launcher across all software products developed by a software development organization, offering various modes (e.g., install, maintenance/ update, and uninstall modes) for the installer launcher, the software development organization may increase consistency in their product line and reduce installation problems. As an extension of this idea, software products developed outside of a given software development organization (e.g., by a third party software vendor) may also be integrated into this model, as desired. The target computer system (e.g., the user machine) may be interrogated or queried in various ways to verify the contents of various software products within the target computer system against the information about the software products that is stored in the distribution and the information about the software products that is stored in the dependency database.

Throughout software development, the shared information storage may provide developers with access to common files (e.g., license agreements) and saved projects, thus increasing efficiency.

Although not shown, each of these tools may support localization of the installer and installation of localized products. Additionally, the tools may include testing and verification features not described. By isolation of platform specific functionality, this method may be utilized on various software platforms (e.g., Windows-based, Unix-based), as desired.

FIG. 20—Example: Gathering User Input

FIG. 20 is one embodiment of a flowchart for gathering user input on an installation. The launcher may initiate the steps shown in FIG. 20.

The welcome and introduction step may prompt the user for an installation location (e.g., a directory path). A default installation location may be pre-filled. The chosen installation location (either a user specified location or the default location) may be used by all parts as the default location under which products will be installed in separate folders.

The user may be asked to confirm their license agreement in the license step. The user may be asked for registration, key code, and serial number in the following step. Some processing of the serial number may be done, followed by other dialogs being displayed or skipped, based on the serial number. Different feature sets may be installed, based on the serial number.

The user may then be asked to choose a feature set to be installed (e.g., typical, complete, custom). If the user selects the custom feature set, a custom dialog may open in which features are presented to the user for selection. For the user-selected features, an installation location may be specified by the user. Typically, a default installation location will be presented. If the user selects the typical feature set, a custom dialog may open in which typical features are pre-selected for the user. The user may modify the list of pre-selected features, if desired.

A "feature tree" may be gathered from the parts database, using the feature set selected by the user. A check may be made for whether the files to be installed are currently in use. If the files to be installed are currently in use, an alert message may be presented to the user to close the application.

Following completion of the installation, a summary of the installation may be presented to the user. Certain installations may require a reboot of the system after the installation, in order to allow changes to take effect.

It is noted that the flowchart of FIG. 20 is exemplary only. Further, various steps in the flowchart of FIG. 20 may occur concurrently or in a different order than that shown, or may not be performed, as desired. Also, various steps may be added to FIG. 20, as desired.

Class Diagrams

FIGS. 17–19 and FIGS. 21–23 illustrate various classes used to implement one embodiment of the present invention. FIGS. 24–27 represent a class hierarchy derived from the narrative above by first extracting nouns from the narrative as objects and verbs as methods on those objects. Then some discussion and re-factoring occurs before the final result is achieved. It is noted that the object instances of FIGS. 17–19 and 21–27 are exemplary only.

FIG. 17 illustrates a system state object instance, according to one embodiment.

FIG. 18 illustrates product/part/feature object instances, according to one embodiment. As shown, a part information database, or part database, may include a list of parts. Similarly, a product information database, or product database, may include a list of products. The product information database may also be referred to as a dependency database. A detailed view of an individual product, an individual part, and an individual feature, along with lines and/or arrows indicating the relationships between these elements, is also shown.

FIG. 19 illustrates UI object instances, according to one embodiment. The user interface may include an instance of a dialog and an instance of user input. Both the dialog instance and the user input instance may contain attributes and operations. The user input instance refers to a list of inputs. An example of a sample individual input of the list of inputs is shown in FIG. 19. Below the sample individual input is a series of possible inputs (i.e., serial number, install mode, location, feature state, top level location, feature set, confirm license, registration info). For each input in the series of possible inputs there are attributes and operations shown. Additional possible inputs may exist, and/or one or more of the inputs in the series of possible inputs shown in FIG. 9 may not exist for a given user interface, as desired.

FIG. 21 illustrates object instances for disk space costing, according to one embodiment. A detailed view of existing directories, an individual part, an individual feature, and UI (user interface) classes, along with lines and/or arrows indicating the relationships between these elements, is shown.

FIGS. 22 and 23 illustrate object instance for merging product dependencies, according to one embodiment. Two products are shown, product A and product B. Product A is shown as having a version number 2.0; product B is shown as having a version number 1.0. Two dependency entries from the dependency database are shown. The first dependency entry shows a dependentRef attribute with a value of Product.B and a dependsOnRef attribute with a value of Product.A. The second dependency entry shows a depends On attribute with a value of A and a dependsOnVersion attribute with a value of 2.0. The Launcher, through use of the function call AnalyzeDeps, refers to the first dependency entry and to the final state from the merge function of the Launcher. A dependency definition for the dependency database is shown with attributes dependentName, dependentVersion, dependOnName, and dependsOnVersion. The merge function of the Launcher takes as input the existing state and the requested state of a given product.

FIG. 24 illustrates one embodiment of a top level class hierarchy. A detailed view of the system state and the launcher, along with lines and/or arrows indicating the relationships between these elements, is shown. Various classes (e.g., product/part classes, UI classes, dependency classes) are identified as parts of the launcher. Additionally, a distribution file and the dependency database are shown as interacting with the launcher.

FIG. 25 illustrates a relationship between the product/part/feature classes of FIG. 18, described above, and UI classes. As FIG. 25 shows, the part information database, or part database, may include a list of parts. Similarly, the product information database, or product database, may include a list of products. The product information database may also be referred to as a dependency database. A detailed view of an individual product, an individual part, and an individual feature, along with lines and/or arrows indicating the relationships between these elements, is also shown. As shown, the UI classes may be used to ascertain various attributes of the feature, e.g., the location, and whether the feature has been requested for inclusion in the installation.

FIG. 26 illustrates one embodiment of UI classes. The user interface may include an instance of a dialog and an instance of user input. Both the dialog instance and the user input instance may contain attributes and operations. The user input instance refers to a list of inputs.

FIG. 27 illustrates dependency classes, according to one embodiment. The dependency classes may be used, e.g., by the installer launcher, to determine dependencies among products, parts, and features.

Object Dictionary

The object dictionary is a listing of all the classes identified for the launcher. It can be used later as a cross-reference and checklist during the design and implementation to make sure that all aspects of the problem are being addressed. The classes include:

Device:

A class representing physical I/O hardware present on the target machine. We will query pre-existing software to perform this operation—we will not create this software.

Confirm: Public Dialog

Confirm: public Dialog object is a specific instance of a dialog inherited from the Dialog class. The intent of this class is to create a dialog that will summarize all parts, features, the locations where they are to be installed, and disk cost. This dialog will serve as the final confirmation dialog before the Installer Launcher begins transferring files to the users system. This dialog will allow the user to scroll through the summary of information and select either "Install" or "Back" as represented in the typical installer wizard screen.

Confirm License: Public Input

The actual response the user gives to the question of whether or not he/she agrees to the terms of the license agreement.

Dependency

This class contains the attributes which store the dependency information between two elements? (Part, Feature, or Product). This class is used to represent dependencies of interest during the current install.

Attributes:

Object1 (Part/Feature/Product)/Object2 (Part/Feature/Product)

A product's dependency is via the list of parts it contains. A part is dependent via the list of features that it contains. A feature can be dependent on one or more other features (through a parent or peer relationship) This dependency decision is made based on features the user requested, what parts are already on the system and the dependency between features, parts, and products.

Exclusion

Any element (part, feature, or product) that cannot be installed concurrently with another element.

Hard Dependency

Any element (part, feature, or product) that requires another element to be present in order to operate. For example, IVI has a hard dependency on VISA.

Soft Dependency

Any element (part, feature, or product) that increases the functionality of another part, but is not required to execute. For example, LabVIEW has a soft dependency on DAQ.

Dependency Definition:

An entry in the dependency database that describes the requirements one part has for another. Definitions exist in the database for all NI products. A given definition may not be used during any given install.

Attributes:

Dependent:
The part that requires another part.

Dependent Version Range:
The range of version of the dependent for which this definition is valid.

DependsOn:
List of the parts required representing an OR relationship. (ANDS are represented by multiple dependency definitions.)

Dependency Version Range:
The list of version ranges of DependsOn that will satisfy the dependency relationship. One for each part.

Exclusion:
The dependent must not be installed with the dependency on (as opposed to the normal, "must be installed with the dependency").

Hard Dependency:
The dependency relationship must be fulfilled for the installation to proceed, i.e. NI-IVI is hard dependent on NI-VISA Soft Dependency:
The products work together, but the dependent will work without the dependency as well, i.e. LabVIEW is soft dependent on NM-DAQ.

Dependency Database:
This holds onto either a text file or a collection of registry entries installed on the users target system. These entries specify the dependencies between NI's product parts or the dependency of an OEM application on NI parts. Dependencies can be specified as a range of part versions or as an exclusion. Dependency information is entered along with the part installer specification at the time of its creation. Every distribution that we ship will include a comprehensive list of all dependency information. There may be multiple data stores containing NI info and what is present on the target machine including third party info.

Operations:

Merge
OEMs may update the dependency information on the user's system; therefore the dependency information we install must be merged with the existing information on the system.

Dialog:
A base class for the predefined dialogs that an installer developer can choose from. Hides Win32 functionality.

Directory:
The Directory object is designed to represent a particular file path location. This is intended primarily to share directory path info between parts, but is not limited to that use. The Directory class has an attribute pair, variable and value.

Attributes:

Variable
Variable refers to a reference name or alias to indicate a particular directory location. For example, NIDIR would refer to the root location where all National Instruments applications are installed.

Value
Value is the specific location for this instance of the directory object. For example, the value of NIDIR would typically contain C:\Program Files\National Instruments.

Operations:
Resolve to full path
Works out what the actual directory path will be.

Distribution:
The distribution is the primary input to the launcher and consists of one or more parts and files .A distribution does not reside on the target system but on some media such as a CD. Users receive all installers as distributions.

Feature:
A feature is a piece of a part that is the smallest user visible item that can be installed. Instances might include docs are examples.

Attributes:
Location (Location)
location (on disk) to where the objects in this feature will be installed.
Owner (Part)
name of the part that contains this feature
Parent (Feature)
Represents parent/child relationship between features
list of child features (Feature)
Represents parent/child relationship between features
list of Dependencies (Feature Dependency)
Non hierarchical dependencies between features
Installed state (Feature state)
Is this feature already installed on the system
Requested state (Feature state)
Has the user asked for this feature to be installed
Title
What is the displayable name of the feature
Display Information
Is this feature initially hidden, expanded, or collapsed.

Operations:
Cost
disk space costing. Report how much total disk space is required by all of the objects in this feature.

Feature Dependency: Public Dependency
A dependency relationship between features within a part that cannot be handled by the normal feature parent-child relationship within the feature tree. For instance, simulated DAQ VIs are mutually exclusive with the real DAQ VIs, and thus this is a dependency relationship between features (with the exclusion flag marked).

Feature Set: Public Input
This input from the user selects one of three possible pre-canned sets of features—Typical, Complete or Custom. If the user selects Custom, the feature selection dialog will be displayed next.

Feature State: Public Input

Attributes:
enum(local, from media, absent, advertised)

Input:
The Input object contains information the user has provided via different dialogs, like the license confirmation or the serial number they entered. This class access information primarily gathered from the Top Level Location, Feature Set, Confirm License, Registration Information, Serial Number, Install Mode, Location, and Feature State dialog classes.

It includes the name, data type, type, and value attributes and has three methods: Get Attribute, Set Attribute, and Set Default Value.

Attributes:
Name
The name of the user input
Datatype
The datatype assigned to that name
value
Reported value of the input Operations:
Get Value
Method to retrieve the latest value for that input. This could be the user entered value or the default value if the user did not change the default.
Set Value
Method to set the latest value for that input.
Set Default Value
Method to set the default value shown in that input.

Install Mode: Public Input
This UI class will store what mode of the install that the user selected.

Attributes:
enum(installed, uninstalled, maintenance)
These are the three possible modes of an install.
An install means that we will need to do an upgrade or new install (the installer will determine which of these in it investigation phase).
An uninstall means that the product will need to be uninstalled (the installer will consider the dependencies to determine which features can be safely uninstalled—possible user prompting for soft dependencies)
A maintenance mode means that we will need to display the UI that will allow the user to add/remove features.

Launcher:
The Launcher is the actual installer that the user sees. It is responsible for getting whatever information it needs to know about the system, running the sequence of dialogs that will query for information from the user, storing that information and making intelligent decisions based on it, communicating with the dependency database to verify that the target system will be in a good state following the install, and invoking the various part installers to install their part.

Attributes:
list of Directories (Directory)
List of directories that (1) the user can modify and (2) that could be modified by the part.
list of existing Parts
List of currently installed NI Parts on the target system.
list of existing Products
List of currently installed NI Products on the target system.

Operations:
Gather Input
Requests information from the user, and retrieves information from the system and stores it. This information will be used to make decisions when the actual installation takes place
Run Sequence
Runs the sequence of dialogs that will query the user for information needed during the install.

Build Tree
Dynamically builds up the Feature tree based on whatever features are present in the distribution being installed. This involves querying all of the present parts which features they contain, as well as presenting only the visible parts in the feature tree.
Install
This is what actually performs the install, which means that this function puts Installables on the target machine.
Install Dependency DB
Uninstall
Removes the Installable(s) associated with the Product/Part/Feature to be removed.
AnalyzeDependencyInfo
Loop through all of the products that are to be installed and make sure that their dependency requirements are either met by what is already installed on the system, or by what will be installed by the current install process. If there needs to be something else installed that is shipped by this distribution, mark it to be installed, and also check its dependency requirements in the same manner. If there are any errors along the way, report them to the customer and ask them what they would like to do. Some errors or issues to notify the customer about could include:
installing Part A 2.0 will break currently installed Product B 1.5
Part A version 1.0 is installed and compatible with everything that is either on the system or will be installed; Part A version 2.0 is also compatible with everything and could potentially be installed, would you like to install it?
installing Part A version 3.0 may force removal of Part B version 1.5 from the system, is this o.k.?
GatherDependencyInfo
Read Dependency Definitions out of the Dependency Database and into memory. Also gather a list of currently installed parts, as well as a list of parts that have been selected to be installed. This information will be used by the AnalyzeDependencyInfo function.
MergeDependencyInfo
Combine the information stored in the Dependency Database stored on the user's system (there will be one there if the user has installed previous NI products with the Launcher before) with the Dependency Database that is shipped with the distribution. The Dependency Database will be versioned, so there are a few different cases to consider:
If the Dependency Database that ships with the distribution is newer than the one on the target system, then merging the information will involve adding new records to the Dependency Database on the system, as well as correcting any errors with the version on the system.
If a version of this database does not exist on the system, then just copy the database from the distribution onto the target machine.
If the version that ships with the distribution is the same or older, don't modify the database on the target system at all.
License: Public Dialog,
The dialog that will display the license agreement to the user during the installation process.

Location: Public Input
If allowed by the installer developer, users may change the install location of certain features from their defaults.

Attributes:

Variable
Variable refers to a reference name or alias to indicate a particular directory location. For example, NIDIR would refer to the root location where all National Instruments applications are installed.

Value
Value is the specific location for this instance of the directory object. For example, the value of NIDIR would typically contain C:\Program Files\National Instruments.

NI Information:
The products that are installed on the target system.

Attributes:
List of Products
The list of product names that are already present on the target system.
List of parts
The list of parts that are already present on the target system.
NI Paths
The settings for NI path variables that have been used in previous installs.

Operations:
Gather
A method which populates the list of products.

Path and Feature Set: Public Dialog
This object represents the dialog for entering the National Instruments path or product path for the installation as well as the feature set to use for the installation. The feature set includes Complete, Typical, and Custom options. This is a traditional installation dialog with radio buttons to represent the feature set and a string input and browse button to select the Path. This dialog allows the user to select either "Continue" or "Back" as represented in the typical installer wizard screen.

Part:
A product is made up of one or more parts that may be shared with other products. The launcher operates directly on parts which can be standalone and be upgraded separately.

Attributes:
list of Features (Feature)
the list of features or feature that comprise this part.
product
what product or products this part is a member of Operations:
Cost (Feature)
disk space costing. Report how much total disk space is required by a feature in this part.
CostAll
disk space costing. Report how much total disk space is required by all of the features in this part.
Load
information about these part installers included in the distribution are loaded into memory. This information will later be compared to the "dependency database" to determine the inter-part relationships.
Install
call each of the features and request them to install.

Uninstall
call each of the features and request them to uninstall.

Part List:
This database contains various information about the Parts that are located in the distribution that is being installed, as well as on the system.

Attributes:
list of Parts
List of parts currently installed on the target system, as well as parts that are in the distribution Operations:
Load
Go through the list calling load on each item.
Install
Go through the list calling install on each item.
Uninstall
Go through the list calling uninstall on each item.

Product:
A collection of one or more related parts that comprise the minimum set of items that would ever be packaged as a distribution. E.g. NI-DAQ or LabVIEW.

Attributes:
Version
The version of the product, i.e. 6.0.2.1432.
Title
The name of the product, i.e. LabVIEW.
Default installation directory
The default directory into which the parts of the product are installed on the user's machine.
Display information
The default manner in which the product appears in the feature tree of the Uber-Installer, i.e. hidden, collapsed, expanded. May be overridden by the distribution developer.
list of Parts
The parts that comprise the product.

Product Dependency: Public Dependency
An object of this type will hold information regarding an instance of the general dependency between two products. For example, the dependency database may contain an entry that said that Product A depended on version 1.0 to 3.0 of Product B. If Product A and Product B v3.0 were present in the current distribution a product dependency object shall be created to specify the dependency between these products.

Product Information Database:
A list of products combining those products already present on the system and those about to be installed.

Attributes:
list of Products
Combined list of products.

Registration Information: Public Input
This object collects the registration information from the user. The information collected is accessed through the Input object. This information would be either be immediately communicated to the installed base registration application on ni.com, it would allow the user to email this information to National Instruments, or it would instruct the user to complete the product registration card included with the product.

Registration Information: Public Dialog
Registration Information is a dialog that collects common user registration information and at a minimum will collect the name and email address, but may also include other user information like address and phone numbers. This installation dialog would be implemented using the appropriate data fields for collecting this information and allows the user to select either "Continue" or "Back" as represented in the typical installer wizard screen.

Serial Number: Public Input

In the UI, the user will be prompted for serial number information. Some processing of the serial number may be done as soon as the user selects the "next" button. Other dialogs may be displayed or skipped based on the serial number. We may also choose different feature sets to be installed based on the serial number.

System State:

This class contains information about the target system which will be queried at runtime. This information will be used at various points throughout the installation process.

Attributes:
 OS Version
  Win95, Win2K, etc. This will be used during the actual Install to install different parts based on different OS Versions.
 Machine Type
 Intel PIII 600
 List of Devices
 PCI-MIO-16E-1, NI-5411, etc.
 Disk Space
 C: 1 GB, D: 500 MB, etc.

Operations:
 Gather
 Populates the attributes by querying the system.

Primary Installation Directory: Public Input

The only directory that users can control if they do not choose a custom installation type. This directory does not restrict parts from installing outside that path, but should cause most of the parts to install underneath it. This directory will typically be <NIDIR> for large distributions, and <ProductDir> for single product distributions.

User Input:

If the installer is run in interactive mode (non-silent) the user may change various options that will determine what gets installed and where. This is the collection of all these inputs.

Attributes:
 list of inputs
  The collection of all the user inputs. This list will be passed on to the part installers.
 Sequence
  The order in which the inputs are to be obtained from the user.

Operations:
 Run Sequence
 Execute the sequence of dialogs.

User Interface:

Represents the Win32 code etc. that is assumed in this analysis and not modeled.

Version Dependency: Public Dependency

This object represents a type of dependencies between products based on their versions. Other dependency types include Feature and product. This includes the version ranges of the dependent and version ranges of what it is dependent on. This object inherits from the Dependency object and its attributes.

The above implementation describes one embodiment of the present invention in the form of class objects, e.g., as may be implemented in an object-oriented programming language. It is noted that the above embodiment is meant to be exemplary only, and is not intended to limit the architecture, design, functionality, or form to any particular type.

Various embodiments further include receiving or storing instructions and/or data implemented in accordance with the foregoing descriptions upon a carrier medium. Suitable carrier media include a memory medium as described above, as well as signals such as electrical, electromagnetic, or digital signals, conveyed via a communication medium such as networks and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for creating an application system installer, the method comprising:
 receiving a root deployable for an application system, wherein the application system is operable to perform a function;
 programmatically analyzing the root deployable to determine a root deployer for the root deployable;
 the root deployer programmatically analyzing the root deployable to determine:
  one or more deployables, wherein each of the one or more deployables is operable to perform a respective portion of the function; and
  one or more files to install;
 for each respective deployable of the one or more deployables,
  programmatically determining a respective deployer corresponding to the respective deployable;
  the respective deployer analyzing the respective deployable to determine:
   one or more further deployables, wherein each of the one or more further deployables is operable to perform a respective portion of the function; and
   one or more further files to install;
  repeating said programmatically determining and said analyzing for each of the one or more further deployables until all deployables for the respective deployable of the one or more deployables have been determined and analyzed, and all files to install for the respective deployable of the one or more deployables have been determined;
 programmatically generating the application system installer using the determined files to install;
 wherein the application system installer is operable to programmatically deploy the application system onto a target system to perform the function.

2. The method of claim 1,
 wherein said analyzing the root deployable to determine one or more deployables further comprises analyzing the root deployable to determine one or more supporting sub-installers;
 wherein said analyzing the respective deployable to determine one or more further deployables further comprises analyzing the respective deployable to determine one or more further supporting sub-installers; and wherein said programmatically generating the application system installer using the determined files to install comprises:
programmatically generating the application system installer using the determined files to install and the determined supporting sub-installers.

3. The method of claim 2, wherein said programmatically generating the application system installer using the determined files to install and the determined supporting sub-installers comprises:
an installer builder generating a user files sub-installer based on the determined files to install; and
the installer builder generating the application system installer based on the user files sub-installer and the determined supporting sub-installers.

4. The method of claim 3, wherein the installer builder comprises:
a component distribution service, wherein the component distribution service performs said generating the user files sub-installer based on the determined files to install; and
a build distribution service, wherein the build distribution service performs said generating the application system installer based on the user files sub-installer and the determined supporting sub-installers.

5. The method of claim 3, wherein said installer builder generating the application system installer based on the user files sub-installer and the determined supporting sub-installers comprises:
the installer builder analyzing each of the determined sub-installers to determine one or more additional sub-installers; and
the installer builder generating the application system installer based on the user files sub-installer, the determined sub-installers, and the one or more additional sub-installers.

6. The method of claim 1,
wherein said analyzing the root deployable to determine one or more deployables comprises analyzing dependencies of the root deployable to determine the one or more deployables; and
wherein said analyzing the respective deployable to determine one or more further deployables comprises analyzing dependencies of the respective deployable to determine the one or more further deployables.

7. The method of claim 1, wherein at least one of the determined deployables includes a deployment specification.

8. The method of claim 7, wherein the deployment specification includes one or more of:
dependencies for the deployable; and
information indicating a platform for the deployable.

9. The method of claim 1, wherein said deployables comprise one or more of:
an execution engine and one or more associated components;
one or more user-defined application system components;
one or more code modules;
one or more libraries;
one or more operating system components;
one or more instrument drivers;
one or more hardware drivers;
one or more project files;
one or more workspace files; and
one or more data files.

10. The method of claim 1, wherein the application system comprises one or more of:
a measurement system;
a test system;
an automation system;
a control system;
a simulation system; and
a network system.

11. The method of claim 1, further comprising:
executing the application system installer to programmatically deploy the application system onto a target system;
wherein after the application system is deployed on the target system, the target system is operable to perform the function.

12. The method of claim 11,
wherein the target system comprises a target computer and at least one device coupled to the target computer; and
wherein programmatically deploying the application system onto the target system comprises one or more of:
programmatically deploying one or more programs onto the target computer, wherein the target computer is operable to execute the one or more programs to perform at least a portion of the function;
programmatically deploying at least one program onto the at least one device, wherein the at least one device is operable to execute the at least one program to perform at least another portion of the function;
programmatically configuring target computer hardware and/or the at least one device hardware in accordance with one or more hardware configuration files; and
programmatically configuring a program on the target computer and/or a program on the at least one device in accordance with one or more program configuration files.

13. The method of claim 1, further comprising:
the root deployer programmatically performing a build operation on the root deployable; and
at least one respective deployer programmatically performing a build operation on the respective deployable.

14. The method of claim 13, wherein said performing build operations comprises determining one or more additional files to install.

15. A system for creating an application system installer, comprising:
a processor; and
a memory medium, coupled to the processor;
wherein the memory medium stores program instructions which implement:
a deployment manager;
a plurality of deployers; and
an installer builder;
wherein the deployment manager is operable to:
receive a root deployable for an application system, wherein the application system is operable to perform a function;
programmatically analyze the root deployable to determine a root deployer for the root deployable;
invoke the root deployer, wherein the root deployer is operable to:
programmatically analyze the root deployable to determine:
one or more deployables, wherein each of the one or more deployables is operable to perform a respective portion of the function; and one or more files to install;
wherein the deployment manager is further operable to:
for each respective deployable of the one or more deployables,
programmatically determine a respective deployer corresponding to the respective deployable;
invoke the respective deployer, wherein the respective deployer is operable to analyze the respective deployable to determine:
one or more further deployables, wherein each of the one or more further deployables is operable, to perform a respective portion of the function; and
one or more files to install;
repeat said programmatically determining and said invoking the respective deployers for each of the one or more further deployables until all deployables for the respective deployable of the one or more deployables have been determined and analyzed, and all files to install for the respective deployable of the one or more deployables have been determined; and
wherein the installer builder is operable to:
programmatically generate the application system installer using the determined files to install;
wherein the application system installer is operable to programmatically deploy the application system onto a target system to perform the function.

16. The system of claim 15,
wherein, in analyzing the root deployable to determine one or more deployables, the root deployer is operable to analyze the root deployable to determine one or more supporting sub-installers;
wherein, in analyzing the respective deployable to determine one or more further deployables, each respective deployer is further operable to analyze the respective deployable to determine one or more further supporting sub-installers; and
wherein, in programmatically generating the application system installer using the determined files to install, the installer builder is further operable to:
programmatically generate the application system installer using the determined files to install and the determined supporting sub-installers.

17. A computer-readable memory medium which stores program instructions for creating an application system installer, wherein the Program instructions are executable to perform:
receiving a root deployable for an application system, wherein the application system is operable to perform a function;
programmatically analyzing the root deployable to determine a root deployer for the root deployable;
invoking the root deployer to programmatically analyze the root deployable to determine one or more deployables, wherein each of the one or more deployables is operable to perform a respective portion of the function, and to determine one or more files to install based on said analyzing the root deployable;
for each respective deployable of the one or more deployables,
programmatically determining a respective deployer corresponding to the respective deployable;
invoking the respective deployer to programmatically analyze the respective deployable to determine one or more further deployables, wherein each of the one or more further deployables is operable to perform a respective portion of the function, and to programmatically determine one or more further files to install based on said analyzing the respective deployable;
repeating said programmatically determining and said invoking for each of the one or more further deployables until all deployables for the respective deployable of the one or more deployables have been determined and analyzed, and all files to install for the respective deployable of the one or more deployables have been determined;
programmatically generating the application system installer using the determined deployables;
wherein the application system installer is operable to programmatically deploy the application system onto a target system to perform the function.

18. The computer-readable memory medium of claim 17,
wherein said analyzing the root deployable to determine one or more deployables further comprises analyzing the root deployable to determine one or more supporting sub-installers;
wherein said analyzing the respective deployable to determine one or more further deployables further comprises analyzing the respective deployable to determine one or more further supporting sub-installers; and
wherein said programmatically generating the application system installer using the determined deployables further comprises:
programmatically generating the application system installer using the determined files to install and the determined supporting sub-installers.

19. A computer-implemented method for creating an application system installer, the method comprising:
receiving a root deployable for an application system, wherein the application system is operable to perform a function;
adding the root deployable to a deployables list;
retrieving a next deployable from the deployables list;
programmatically analyzing the next deployable to determine a respective deployer for the next deployable;
invoking the respective deployer to programmatically analyze the next deployable to determine one or more further deployables, wherein each of the one or more deployables is operable to perform a respective portion of the function, and to determine one or more files to install;
removing the next deployable from the deployables list;
adding the determined one or more deployables to the deployables list;
adding the determined one or more files to install to a files to install list;
repeating said retrieving a next deployable, said programmatically analyzing the next deployable, said invoking the next deployer, said adding deployables, and said adding files to install, until all deployables on the deployables list have been analyzed, thereby determining all of the files to install for the application system; and
programmatically generating the application system installer using the determined files to install;
wherein the application system installer is operable to programmatically deploy the application system onto a target system to perform the function.

20. The method of claim 19,
wherein said programmatically analyzing the next deployable to determine one or more further deployables further comprises programmatically analyzing the next deployable to determine one or more supporting sub-installers; and
wherein said programmatically generating the application system installer using the determined files to install further comprises:
programmatically generating the application system installer using the determined files to install and the determined supporting sub-installers.

21. A system for creating an application system installer, comprising:
a processor; and
a memory medium, coupled to the processor;
wherein the memory medium stores program instructions which implement:
a deployment manager;
a plurality of deployers; and
an installer builder;
wherein the program instructions are executable by the processor to:
receive a root deployable for an application system, wherein the application system is operable to perform a function;
add the root deployable to a deployables list;
wherein the deployment manager is operable to:
retrieve a next deployable from the deployables list;
programmatically analyze the next deployable to determine a respective deployer for the next deployable;
invoke the next deployer, wherein the next deployer is operable to:
programmatically analyze the next deployable to determine:
one or more further deployables, wherein each of the one or more deployables is operable to perform a respective portion of the function; and
one or more files to install;
add the determined one or more deployables to the deployables list;
add the one or more files to install to a files to install list; and
remove the next deployable from the deployables list; and
repeat said retrieving a next deployable, said programmatically analyzing the next deployable to determine a respective deployer, said invoking the next deployer, said programmatically analyzing the next deployable to determine one or more further deployables and one or more files to install, said adding the determined deployables and said adding the one or more files to install, until all deployables on the deployables list have been analyzed, thereby determining all of the files to install for the application system;
wherein the installer builder is operable to:
programmatically generate the application system installer using the determined files to install; and
wherein the application system installer is operable to programmatically deploy the application system onto a target system to perform the function.

22. The system of claim 21,
wherein, in analyzing the next deployable to determine one or more further deployables, each respective deployer is further operable to analyze the respective deployable to determine one or more supporting sub-installers; and wherein, in programmatically generating the application system installer using the determined files to install, the installer builder is further operable to:
programmatically generate the application system installer using the determined files to install and the determined supporting sub-installers.

23. A computer-readable memory medium which stores program instructions for creating an application system installer, wherein the program instructions are executable to perform:
receiving a root deployable for an application system, wherein the application system is operable to perform a function;
adding the root deployable to a deployables list;
retrieving a next deployable from the deployables list;
programmatically analyzing the next deployable to determine a respective deployer for the next deployable;
invoking the respective deployer to programmatically analyze the next deployable to determine one or more further deployables, wherein each of the one or more deployables is operable to perform a respective portion of the function, and to determine one or more files to install;
removing the next deployable from the deployables list;
adding the determined one or more deployables to the deployables list;
adding the determined one or more files to install to a files to install list;
repeating said retrieving a next deployable, said programmatically analyzing the next deployable, said invoking the next deployer, said adding deployables, and said adding files to install, until all deployables on the deployables list have been analyzed, thereby determining all of the files to install for the application system; and
programmatically generating the application system installer using the determined files to install;
wherein the application system installer is operable to programmatically deploy the application system onto a target system to perform the function.

24. The computer-readable memory medium of claim 23,
wherein said programmatically analyzing the next deployable to determine one or more further deployables further comprises programmatically analyzing the next deployable to determine one or more supporting sub-installers; and
wherein said programmatically generating the application system installer using the determined files to install further comprises:
programmatically generating the application system installer using the determined files to install and the determined supporting sub-installers.

25. A computer-implemented method for creating a system installer for a program, wherein the program comprises a root deployable and one or more sub deployables, the method comprising:
for each of the root deployable and the one or more sub deployables,
programmatically analyzing the respective deployable to determine a respective deployer;
the respective deployer analyzing the respective deployable to determine:
one or more further deployables, wherein each of the one or more further deployables is operable to perform a respective portion of the function; and
one or more files to install;

repeating said steps of analyzing for each of the one or more further deployables until all deployables for the respective deployable of the one or more deployables have been analyzed to determine all files to install for the respective deployable;

programmatically generating the system installer using the determined files to install;

wherein the application system installer is operable to programmatically deploy the application system onto a target system to perform the function.

26. A system for creating a system installer for a program, wherein the program comprises a root deployable and one or more sub deployables, the system comprising:

a processor; and a memory medium, coupled to the processor;

wherein the memory medium stores program instructions which are executable by the processor to:

for each of the root deployable and the one or more sub deployables, programmatically analyze the respective deployable to determine a respective deployer, wherein the respective deployer is operable to analyze the respective deployable to determine:

one or more further deployables, wherein each of the one or more further deployables is operable to perform a respective portion of the function; and one or more files to install;

repeat said analyzing for each of the one or more further deployables until all deployables for the respective deployable of the one or more deployables have been analyzed to determine all files to install for the respective deployable; and programmatically generate the system installer using the determined files to install;

wherein the system installer is operable to programmatically deploy the application system onto a target system to perform the function.

27. A computer-readable memory medium which stores program instructions for creating an application system installer, wherein the program comprises a root deployable and one or more sub deployables, wherein the program instructions are executable to perform:

for each of the root deployable and the one or more sub deployables, programmatically analyzing the respective deployable to determine a respective deployer;

the respective deployer programmatically analyzing the respective deployable to determine:

one or more further deployables, wherein each of the one or more further deployables is operable to perform a respective portion of the function; and one or more files to install;

repeating said steps of analyzing for each of the one or more further deployables until all deployables for the respective deployable of the one or more deployables have been analyzed to determine all files to install for the respective deployable; and programmatically generating the system installer using the determined files to install;

wherein the application system installer is operable to programmatically deploy the application system onto a target system to perform the function.

* * * * *